United States Patent
Kimura et al.

(10) Patent No.: US 6,447,184 B2
(45) Date of Patent: *Sep. 10, 2002

(54) METHOD AND APPARATUS FOR CONTROLLING A PRINTING OPERATION

(75) Inventors: Yoshio Kimura, Kawasaki; Akihiko Noda, Hino, both of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/126,387

(22) Filed: Jul. 30, 1998

(30) Foreign Application Priority Data

Jul. 30, 1997 (JP) ............................................. 9-204281

(51) Int. Cl.⁷ ................................................. B41J 13/00
(52) U.S. Cl. ....................................... 400/578; 400/582
(58) Field of Search .................................. 400/578, 582

(56) References Cited

U.S. PATENT DOCUMENTS 5,706,411 A * 1/1998 McCormick et al. ....... 395/113
5,790,767 A * 8/1998 Nishihara et al. ........... 395/115
5,878,197 A * 3/1999 Miyahara ..................... 395/115
5,906,442 A * 5/1999 Kishida ........................ 400/61
5,991,846 A * 11/1999 Ooki ............................ 710/241

* cited by examiner

*Primary Examiner*—John S. Hilten
*Assistant Examiner*—Charles H. Nolan, Jr.
(74) *Attorney, Agent, or Firm*—Fitzpatrick, Cella, Harper & Scinto

(57) ABSTRACT

A networked printing system has the capability of selecting a particular paper feeding slot of a printer by designating a paper name assigned to that particular paper feeding slot. Thus, an optimum printing operation is performed by the printer assigned that paper name. A controller communicates with the respective printers and produces a paper name information table. A paper name list is then produced according to this paper name information table. In accordance with the paper name list, a list of selectable paper names is displayed on a printing operation control screen. If a particular paper name is selected by a user from this list, then a printer assigned the selected paper name is retrieved from the paper name information table, and the retrieve printer is employed as the destination to which printing information is output.

19 Claims, 19 Drawing Sheets

| PRINTER MNAME | PHYSICAL PROPERTY OF PRINTER | LOGICAL PROPERTY OF PAPER FEEDING SLOT |
|---|---|---|
| PRINTER 2 | • NAME : "PRINTER 2" | • PAPER NAME ASSIGNED TO THE TOP CASSETTE : "NOTICE" |
|  | • TYPE : MONOCHROME | • PAPER NAME ASSIGNED TO THE MIDDLE CASSETTE : "SCHEDULE" |
|  | • XXX : xxxx | • PAPER NAME ASSIGNED TO THE BOTTOM CASSETTE : "REPORT" |
|  | • YYY : yyyy |  |
| PRINTER 3 | • NAME : PRINTER 3" | • PAPER NAME ASSIGNED TO THE UPPER CASSETTE : "ESTIMATE" |
|  | • TYPE : MONOCHROME | • PAPER NAME ASSIGNED TO THE LOWER CASSETTE : "ACCOUNT" |
|  | • XXX : xxxx |  |
|  | • YYY : yyyy |  |
| PRINTER 4 | • NAME : "PRINTER 4" | • PAPER NAME ASSIGNED TO THE UPPER CASSETTE : "PLAN" |
|  | • TYPE : COLOR | • PAPER NAME ASSIGNED TO THE LOWER CASSETTE : "PRESENTATION" |
|  | • XXX : xxxx |  |
|  | • YYY : yyyy |  |
| PRINTER 5 | • NAME : "PRINTER 5" | • NOT SUPPORTED |
|  | • TYPE : MONOCHROME |  |
|  | • XXX : xxxx |  |
|  | • YYY : yyyy |  |

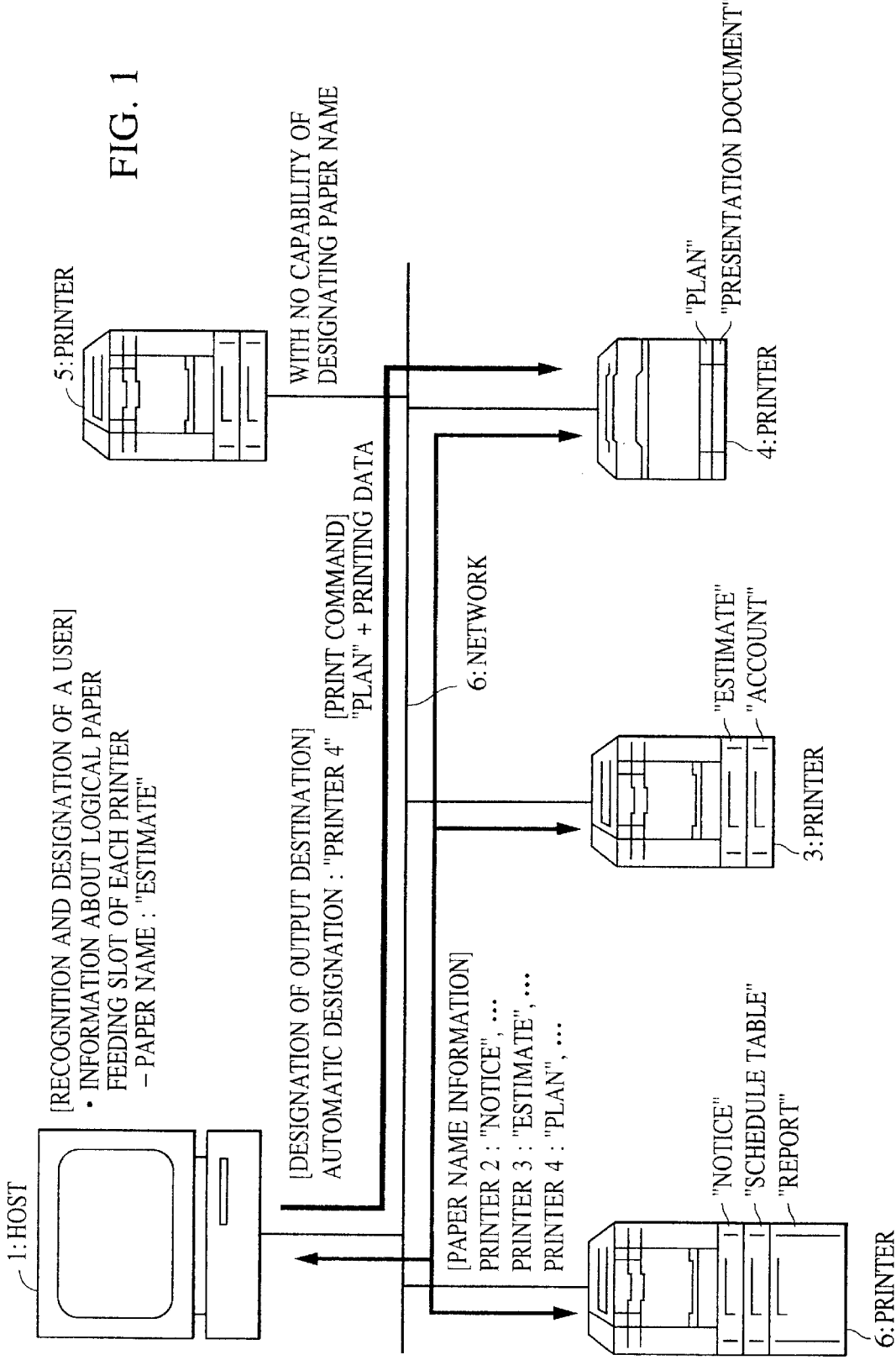

FIG. 2

| PRINTER MNAME | PHYSICAL PROPERTY OF PRINTER | LOGICAL PROPERTY OF PAPER FEEDING SLOT |
|---|---|---|
| PRINTER 2 | • NAME : "PRINTER 2" | • PAPER NAME ASSIGNED TO THE TOP CASSETTE : "NOTICE" |
| | • TYPE : MONOCHROME | • PAPER NAME ASSIGNED TO THE MIDDLE CASSETTE : "SCHEDULE" |
| | • XXX : xxxx | • PAPER NAME ASSIGNED TO THE BOTTOM CASSETTE : "REPORT" |
| | • YYY : yyyy | |
| PRINTER 3 | • NAME : PRINTER 3" | • PAPER NAME ASSIGNED TO THE UPPER CASSETTE : "ESTIMATE" |
| | • TYPE : MONOCHROME | • PAPER NAME ASSIGNED TO THE LOWER CASSETTE : "ACCOUNT" |
| | • XXX : xxxx | |
| | • YYY : yyyy | |
| PRINTER 4 | • NAME : "PRINTER 4" | • PAPER NAME ASSIGNED TO THE UPPER CASSETTE : "PLAN" |
| | • TYPE : COLOR | • PAPER NAME ASSIGNED TO THE LOWER CASSETTE : "PRESENTATION" |
| | • XXX : xxxx | |
| | • YYY : yyyy | |
| PRINTER 5 | • NAME : "PRINTER 5" | • NOT SUPPORTED |
| | • TYPE : MONOCHROME | |
| | • XXX : xxxx | |
| | • YYY : yyyy | |

FIG. 7

| ID | PRINTER NAME | ADDRESS |
|---|---|---|
| 1 | PRINTER 2 | 80 : 11 : 22 : 33 : 44 : 01 |
| 2 | PRINTER 3 | 80 : 11 : 22 : 33 : 44 : 02 |
| 3 | PRINTER 4 | 80 : 11 : 22 : 33 : 44 : 03 |
| 4 | PRINTER 5 | 80 : 11 : 22 : 33 : 44 : 04 |

FIG. 8

| PRINTER NAME | PAPER NAME |
|---|---|
| PRINTER 2 | NOTICE, SCHEDULE, REPORT |
| PRINTER 3 | ESTIMATE, ACCOUNT |
| PRINTER 4 | PLAN, PRESENTATION DOCUMENT |

FIG. 9A

| |
|---|
| NOTICE |
| SCHEDULE |
| REPORT |
| |
| |
| |
| |
| |

| |
|---|
| NOTICE |
| SCHEDULE |
| REPORT |
| ESTIMATE |
| ACCOUNT |
| |
| |
| |

| |
|---|
| NOTICE |
| SCHEDULE |
| REPORT |
| ESTIMATE |
| ACCOUNT |
| PLAN |
| PRESENTATION DOCUMENT |
| |

```
PRINT                                          [PRINT]  BT1
NUMBER OF COPIES: [1]  PAGES:
W                                       BT2—[CANCEL]
        ⦿ ALL PAGES  ○ [  ] ←→ [  ]
PAPER NAME: [NOTICE ▼]                  BT3—[OPTION]
              BT5                       BT4—[HELP]
```

```
PRINT                                          [PRINT]  BT1
NUMBER OF COPIES: [1]  PAGES:
W                                       BT2—[CANCEL]
        ⦿ ALL PAGES  ○ [  ] ←→ [  ]
PAPER NAME: [PLAN ▼]                    BT3—[OPTION]
              BT5                       BT4—[HELP]
```

SCHEDULE
REPORT
ESTIMATE
ACCOUNT
PLAN
PRESENTATION DOCUMENT

FIG. 22

STORAGE MEDIUM SUCH AS AN FD OR CD-ROM

| DIRECTORY INFORMATION |
|---|
| FIRST DATA PROCESSING PROGRAM<br>SET OF PROGRAM CODES CORRESPONDING TO THE<br>STEPS SHOWN IN THE FLOWCHART OF FIG. 13 |
| SECOND DATA PROCESSING PROGRAM<br>SET OF PROGRAM CODES CORRESPONDING TO THE<br>STEPS SHOWN IN THE FLOWCHART OF FIG. 14 |
| THIRD DATA PROCESSING PROGRAM<br>SET OF PROGRAM CODES CORRESPONDING TO THE<br>STEPS SHOWN IN THE FLOWCHART OF FIG. 15 |
| FOURTH DATA PROCESSING PROGRAM<br>SET OF PROGRAM CODES CORRESPONDING TO THE<br>STEPS SHOWN IN THE FLOWCHART OF FIG. 18 |
| FIFTH DATA PROCESSING PROGRAM<br>SET OF PROGRAM CODES CORRESPONDING TO THE<br>STEPS SHOWN IN THE FLOWCHART OF FIG. 20 |

MEMORY MAP OF THE STORAGE MEDIUM

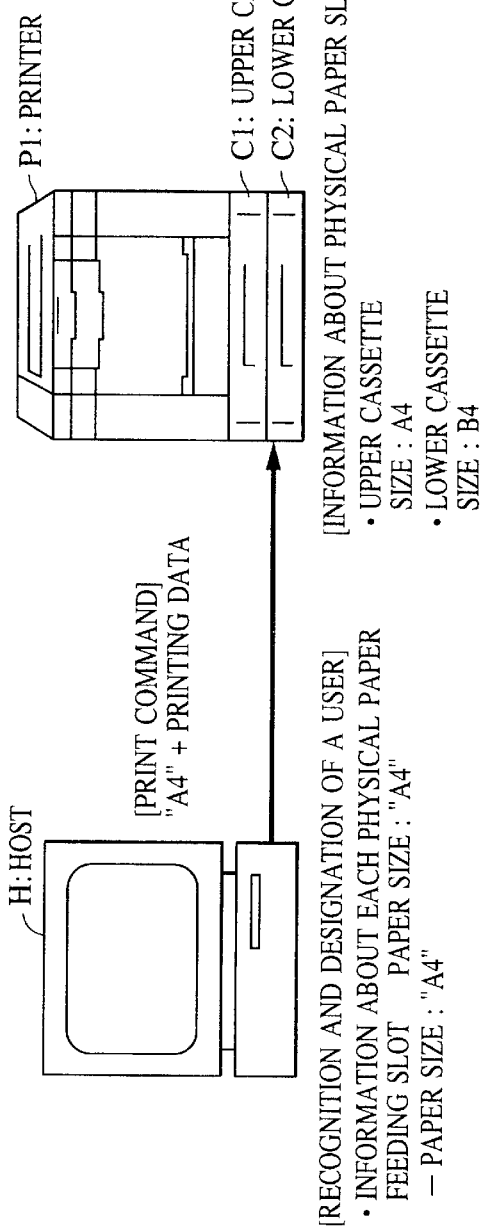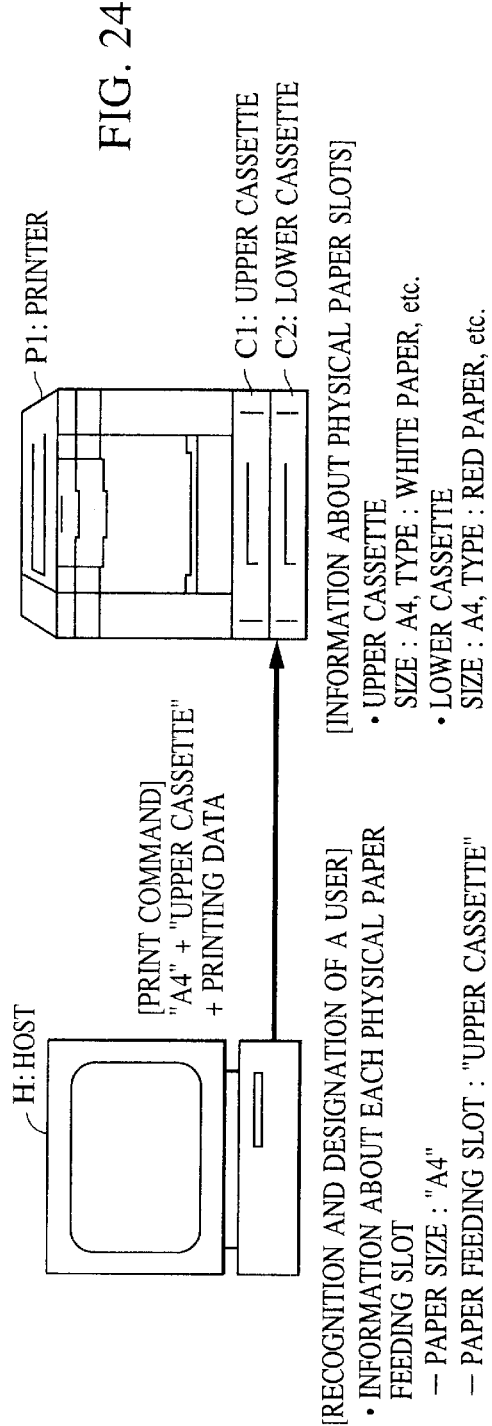

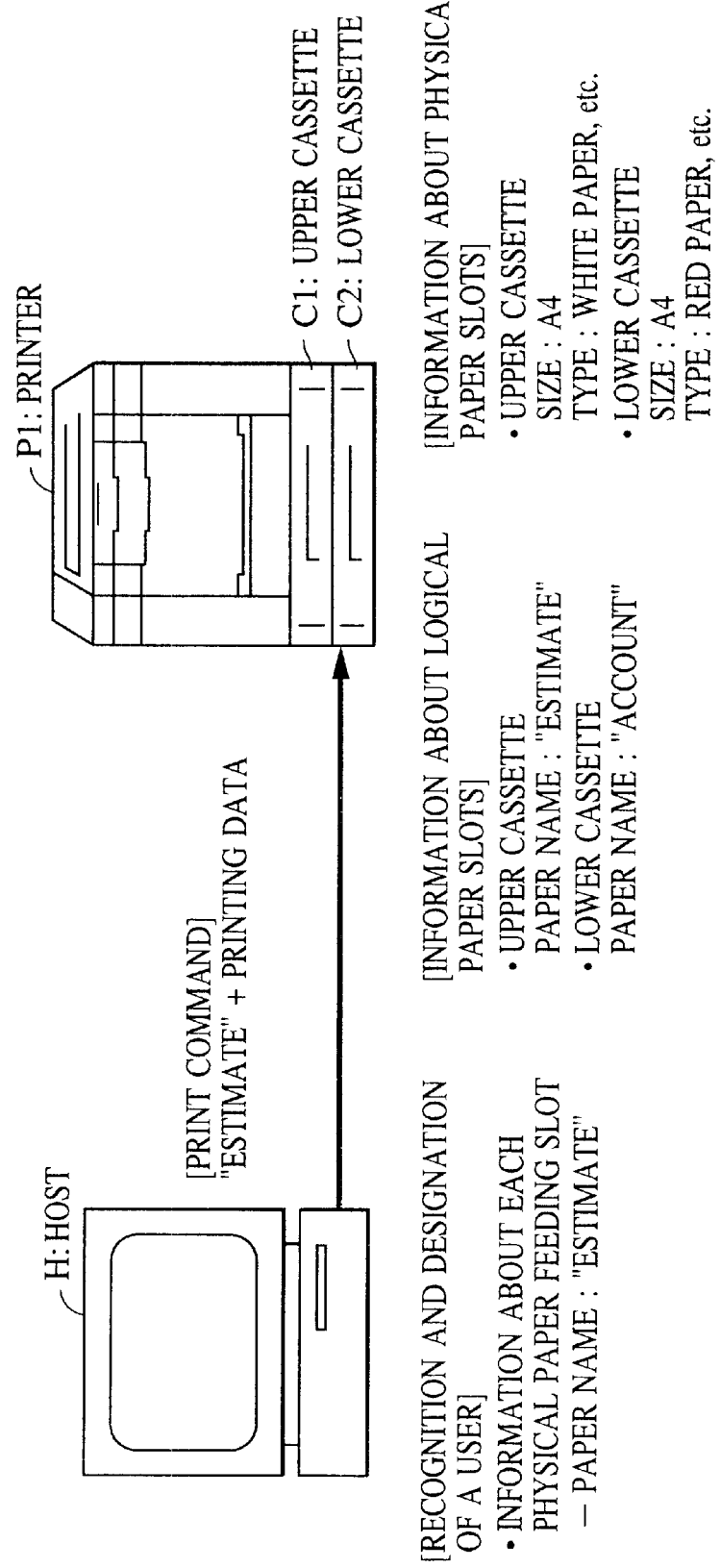

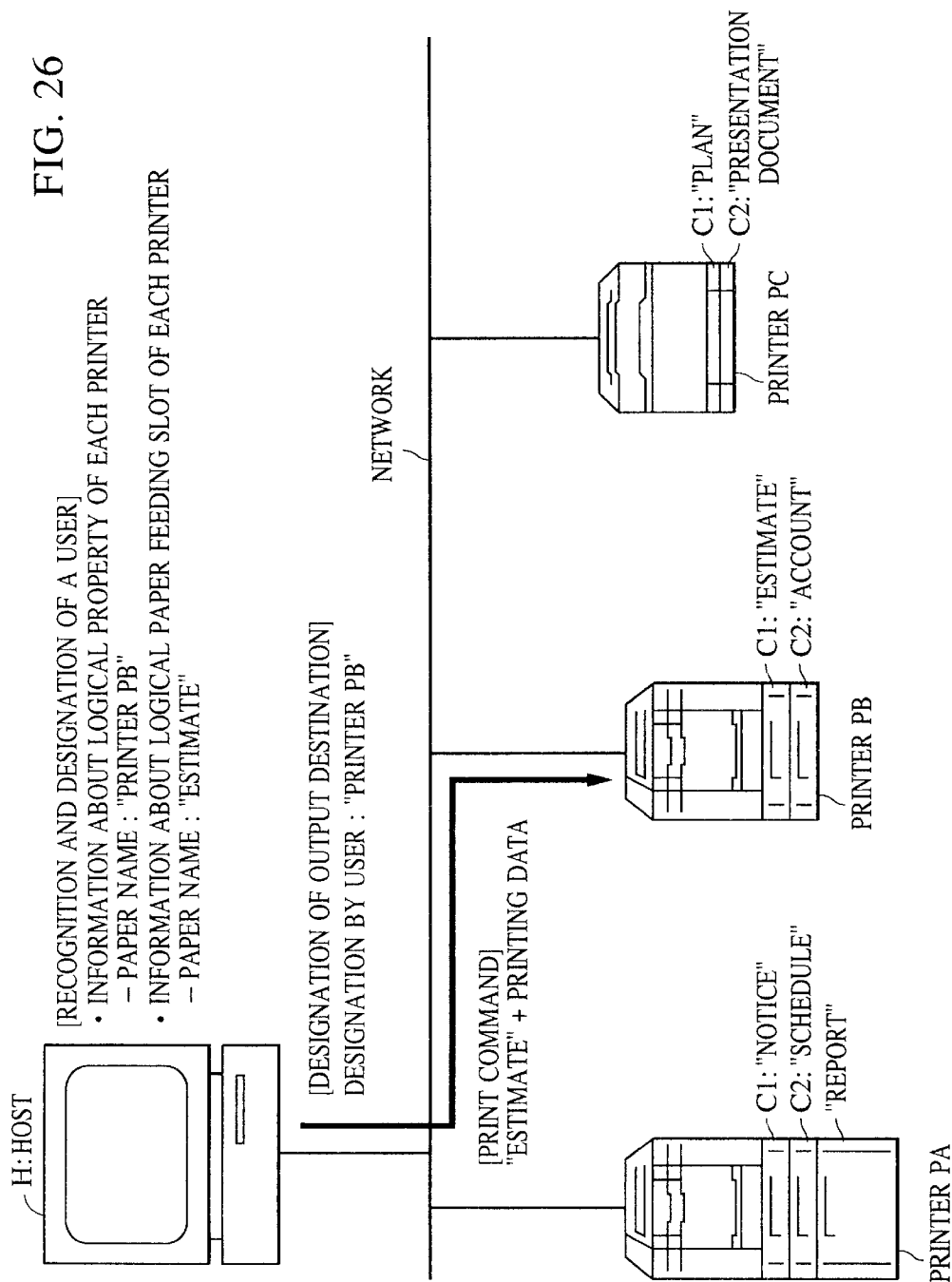

METHOD AND APPARATUS FOR CONTROLLING A PRINTING OPERATION

BACKGROUND OF THE INVENTION

1. Field of the Invention

The present invention relates to a printing apparatus, a printing system, a method of processing data with a printing apparatus, a method of processing data in a printing system, a printing operation controller, a method of controlling a printing operation, and storage medium on which a computer-readable program is stored, for controlling the operation of transferring printing information by communicating via a predetermined communication medium with a plurality of printing apparatus each having a paper feeding slot to which a paper name may be assigned.

2. Description of the Related Art

FIGS. 23–26 illustrate printing systems to which the printing operation controller of the above-described type may be applied. In these printing systems, a data processing apparatus (host computer) is adapted to communicate with a printing apparatus (printer) via a predetermined communication medium.

In these figures, a host computer H includes a controller which executes various application programs in response to a command input via an input device (such as a keyboard) not shown in the figures, and a memory resource for storing various application programs and a system program. The host computer H is adapted to communicate with a printer P1 or other printers PA-PC via a predetermined communication medium. Each printer includes an upper cassette C1 and a lower cassette C2.

In some printing systems having a system configuration such as that shown in FIG. 23, when data produced and managed by the host computer H is output to the printer P1 having a plurality of paper feeding slots, if a desired paper size is designated via the printing operation control screen displayed on the display device of the host computer H, then the printer P1 automatically selects a paper feeding slot in which paper with the designated size is set.

In such a printing system, when A4-size paper and B4-size paper are set in an upper cassette C1 and lower cassette C2, respectively, of the printer shown in FIG. 23, if printing data and control data designating A4 as the paper size are transmitted to the printer from the host computer, then paper is automatically fed from the upper cassette C1, and thus designation of a physical paper feeding slot is not required. On the other hand, if B4 is designated, paper is automatically fed from the lower cassette C2.

However, in the case where paper with the same size but with a different color is set in the upper cassette C1 and the lower cassette C2 of the printer P1 as shown in FIG. 24 (white A4-size paper is set in the upper cassette C1 and red A4-size paper is set in the lower cassette), it is uncertain whether white or red paper is selected when A4 is designated as the paper size. That is, in this printing system, it is impossible to designate paper with a desired color.

Therefore, a user has to designate a physical paper feeding mechanism. More specifically, the user has to designate, for example, A4-size paper in the upper cassette. To select a desired type of paper, the user has to have knowledge about which type of paper is set in which physical paper feeding slot of the printer and the user has to designate a desired physical paper feeding slot in accordance with the above knowledge. This is inconvenient for the user.

FIG. 25 illustrates a printing system having the capability of designating a desired type of paper by a paper name, which has been proposed to avoid the above problem. In this printing system, a paper name is assigned as an attribute to each paper feeding slot of the printer P1 so that if the host computer H designates a particular paper name of those assigned to the printer P1, then paper is fed from the paper feeding slot corresponding to the designated paper name. Hereinafter this capability is referred to as a paper name designation capability.

In the specific example shown in FIG. 25, "Estimate" and "Account" are assigned as logical paper names to the upper cassette C1 and the lower cassette C2, respectively. When a printing operation is performed, the host computer H transmits control data designating a logical paper name (for example, "Estimate") together with printing data to the printer, without designating a physical paper feeding slot.

In the printer P1, printing is performed on paper fed from the paper feeding slot corresponding to the designated paper name "Estimate". This paper name designation capability allows the user to easily designate a desired type of paper without having to know various physical properties (such as a paper size, color, relationship between the paper type and the paper feeding slot). This is very convenient for the user.

In conventional printers with a plurality paper feeding slots, selection of a paper feeding slot used in a printing operation is made either in such a manner that a user designates a particular paper feeding slot (for example, upper cassette) via a host computer or in such a manner that the printer determines a proper paper size and employs a paper feeding slot in which paper with the selected size is set.

In some cases, a particular type of paper called a preprinted sheet on which a particular form has been printed is set in a paper feeding slot. In this case, desired paper cannot be selected by designating only the paper size. The user has to designate a physical paper feeding slot in which desired paper is set and thus the user has to know which paper is set in which paper feeding slot.

Some printers have the capability of selecting optimum printing conditions such as the paper feeding speed and the fixing mode depending on the type of paper employed (for example, thick paper, transparency sheet, etc.) thereby forming a visible image with improved quality. However, in this case, the user himself/herself has to determine the type of paper and notify the printer of the type of paper. As described above, the selection of paper feeding slots in practical printing applications is becoming more complex.

More specifically, in a networked system including a plurality of printers PA-PC each having the paper name designation capability as shown in FIG. 26, a user has to know the relationship between the physical printer names and the logical paper names.

That is, to use the paper name designation capability in a networked system, the user is required to have knowledge about physical printer names and designate a desired physical printer name on the basis of the knowledge. This makes the system inconvenient.

For example, in the printing system shown in FIG. 26, when the host computer H prints an estimate, the host computer H has to know that the paper name "Estimate" is assigned to a "printer B" of a plurality of printers on the network. The user designates the "printer B" as the output destination and further designates the "estimate" as the paper name via the host computer H. Then the user issues a print start command. In such a networked printing system including a plurality of printers PA-PC, the advantages of the paper name designation capability are not well exploited. On the contrary, even a reduction in utility can occur.

SUMMARY OF THE INVENTION

In view of the above problems, it is an object of the present invention to provide a printing apparatus, a printing system, a method of processing data with a printing apparatus, a method of processing data in a printing system, a printing operation control apparatus, a method of controlling a printing operation, and a storage medium on which a computer-readable program is stored, whereby a networked printing environment having the paper name designation capability is realized in which paper names assigned to respective printers on the network are acquired and displayed in the form of a list on a printing operation control screen so that if a user designates a particular paper name then printing information is sent to a printer assigned the designated paper name thus making it possible to build a networked printing system having the paper name designation capability in which it is possible to perform an optimum printing operation on desired paper using a printer in which the desired paper is available simply by designating a desired paper name in a similar manner to that employed in the conventional paper name designation technique, without having to know which paper name is assigned to which printer on the network.

According to an aspect of the present invention, there is provided a printing apparatus capable of communicating with a data processing apparatus via a predetermined communication medium, the printing apparatus comprising: a plurality of paper feeding mechanisms for feeding a recording medium; definition means for defining paper feeding slot data for each paper feeding slot of each paper feeding mechanism; storage means for storing the paper feeding slot data defined by the definition means for each paper feeding slot; acquisition means for acquiring the paper feeding slot data associated with each paper feeding slot stored in the storage means; and notification means for sending the paper feeding slot data acquired by the acquisition means to the data processing apparatus.

Preferably, the notification means sends the paper feeding slot data stored in the storage means to the data processing apparatus, in response to an acquisition request from the data processing apparatus.

According to another aspect of the present invention, there is provided a data processing apparatus capable of communicating with a printing apparatus via a predetermined communication medium, the data processing apparatus comprising: issuing means for issuing an acquisition request to the printing apparatus to acquire the paper feeding slot data defined for the paper feeding mechanism of the printing apparatus; and control means for analyzing the paper feeding slot data transferred from the printing apparatus in response to the request for acquisition of the paper feeding slot data issued by the issuing means, and displaying paper resource information on a display device.

Preferably, the paper resource information includes paper name data and paper attribute data defined for each paper feeding slot.

According to still another aspect of the present invention, there is provided a printing system including a data processing apparatus and a printing apparatus capable of communicating with each other via a predetermined communication medium, the printing apparatus comprising: a plurality of paper feeding mechanisms for feeding a recording medium; definition means for defining paper feeding slot data for each paper feeding slot of each paper feeding mechanism; storage means for storing the paper feeding slot data defined by the definition means for each paper feeding slot; acquisition means for acquiring the paper feeding slot data associated with each paper feeding slot stored in the storage means; and notification means for sending each paper feeding slot data acquired by the acquisition means to the data processing apparatus in response to the acquisition request issued by the data processing apparatus, the data processing apparatus comprising: issuing means for issuing an acquisition request to the printing apparatus to acquire the paper feeding slot data defined for the paper feeding mechanism of the printing apparatus; and control means for analyzing the paper feeding slot data transferred from the printing apparatus in response to the request for acquisition of the paper feeding slot data issued by the issuing means, and displaying paper resource information on a display device.

According to still another aspect of the present invention, there is provided a printing system including a data processing apparatus, a printing apparatus, and a printer server, the data processing apparatus being capable of communicating with the printing apparatus via the printer server, the printing apparatus comprising: a plurality of paper feeding mechanisms for feeding a recording medium; definition means for defining paper feeding slot data for each paper feeding slot of each paper feeding mechanism; storage means for storing the paper feeding slot data defined by the definition means for each paper feeding slot; acquisition means for acquiring the paper feeding slot data associated with each paper feeding slot stored in the storage means; and notification means for sending the paper feeding slot data acquired by the acquisition means to the printer server in response to the acquisition request issued by the printer server, the printer server comprising: storage means for storing the paper feeding slot data received from the printing apparatus; judgment means for judging whether there is an updating request to update the paper feeding slot data stored in the storage means, when the request for acquisition of the paper feeding slot data is issued by the data processing apparatus; and returning means for returning the updated paper feeding slot data to the data processing apparatus, depending on the result of judgment made by the judgment means in terms of whether there is an updating request, the data processing apparatus comprising: issuing means for issuing an acquisition request to the printer server to acquire the paper feeding slot data defined for the paper feeding mechanism of the printing apparatus; and control means for analyzing the paper feeding slot data transferred from the printer server in response to the request for acquisition of the paper feeding slot data issued by the issuing means, and displaying paper resource information on a display device.

According to still another aspect of the present invention, there is provided a printing system including a data processing apparatus and a plurality of printing apparatus, the data processing apparatus being capable of communicating with the plurality of printing apparatus via a predetermined communication medium, each printing apparatus comprising: a plurality of paper feeding mechanisms for feeding a recording medium; definition means for defining paper feeding slot data for each paper feeding slot of each paper feeding mechanism; storage means for storing the paper feeding slot data defined by the definition means for each paper feeding slot; acquisition means for acquiring the paper feeding slot data associated with each paper feeding slot stored in the storage means; and notification means for sending each paper feeding slot data acquired by the acquisition means to the data processing apparatus in response to the acquisition request issued by the data processing apparatus, the data processing apparatus comprising: issuing means for issuing an acquisition request to the printing apparatus to acquire the paper feeding slot data defined for the paper feeding mechanism of each printing apparatus; and control means for analyzing the paper feeding slot data transferred from each printing apparatus in response to the request for acquisition of the paper feeding slot data issued by the issuing means, and displaying paper resource information on a display device.

According to still another aspect of the present invention, there is provided a printing system including a data processing apparatus, a plurality of printing apparatus, and a printer server, the data processing apparatus being capable of communicating via the printer server with the plurality of printing apparatus via a predetermined communication medium, each printing apparatus comprising: a plurality of paper feeding mechanisms for feeding a recording medium; definition means for defining paper feeding slot data for each paper feeding slot of each paper feeding mechanism; storage means for storing the paper feeding slot data defined by the definition means for each paper feeding slot; acquisition means for acquiring the paper feeding slot data associated with each paper feeding slot stored in the storage means; and notification means for sending the paper feeding slot data acquired by the acquisition means to the printer server in response to the acquisition request issued by the printer server, the printer server comprising: storage means for storing the paper feeding slot data received from each printing apparatus judgment means for judging whether there is an updating request to update the paper feeding slot data stored in the storage means, when the request for acquisition of the paper feeding slot data is issued by the data processing apparatus; and returning means for returning the updated paper feeding slot data to the data processing apparatus, depending on the result of judgment made by the judgment means in terms of whether there is an updating request, the data processing apparatus comprising: issuing means for issuing an acquisition request to the printer server to acquire the paper feeding slot data defined for the paper feeding mechanism of each printing apparatus; and control means for analyzing the paper feeding slot data transferred from the printer server in response to the request for acquisition of the paper feeding slot data issued by the issuing means, and displaying paper resource information on a display device.

Preferably, the printer server comprises updating means for, when the judgment means judges that there is an updating request, acquiring the newest paper feeding slot data from each printing apparatus and updating the paper feeding slot data stored in the storage means.

Furthermore, the paper resource information includes paper name data and paper attribute data defined for each paper feeding slot.

According to still another aspect of the present invention, there is provided a method of processing data in a printing apparatus capable of communicating with a data processing apparatus via a predetermined communication medium, the method comprising: a definition step in which paper feeding slot data is defined for each paper feeding slot of a plurality of paper feeding mechanisms for feeding a recording medium; a storage step in which the paper feeding slot data defined in the definition step for each paper feeding slot is stored into a memory; an acquisition step in which the paper feeding slot data of each paper feeding slot stored in the storage step is acquired; and a notification step in which the paper feeding slot data acquired in the acquisition step is sent to the data processing apparatus.

Preferably, in the notification step, the paper feeding slot data stored in the storage step is sent to the data processing apparatus in response to an acquisition request from the data processing apparatus.

According to still another aspect of the present invention, there is provided a method of processing data in a data processing apparatus capable of communicating with a printing apparatus via a predetermined communication medium, the method comprising: an issuing step in which an acquisition request is issued to the printing apparatus to acquire the paper feeding slot data defined for the paper feeding mechanism of the printing apparatus; and a display step in which an analysis is made on the paper feeding slot data transferred from the printing apparatus in response to the request of acquisition of the paper feeding slot data issued in the issuing step, and paper resource information is displayed on a display device.

Preferably, the paper resource information includes paper name data and paper attribute data defined for each paper feeding slot.

According to still another aspect of the present invention, there is provided a method of processing data in a printing system including a data processing apparatus and a printing apparatus capable of communicating with each other via a predetermined communication medium, the method comprising: a definition step in which paper feeding slot data is defined for each paper feeding slot of a plurality of paper feeding mechanisms for feeding a recording medium; a storage step in which the paper feeding slot data defined in the definition step for each paper feeding slot is stored into a memory; an issuing step in which an acquisition request is issued to the printing apparatus to acquire the paper feeding slot data defined for the paper feeding mechanism of the printing apparatus; an acquisition step in which the paper feeding slot data of each paper feeding slot stored into the memory in the storage step is acquired; a notification step in which the paper feeding slot data acquired in the acquisition step is sent to the data processing apparatus, in response to the acquisition request issued in the issuing step; and a displaying step in which an analysis is made on the paper feeding slot data supplied in the notification step and paper resource information is displayed on a display device.

According to still another aspect of the present invention, there is provided a method of processing data in a printing system including a data processing apparatus, a printing apparatus, and a printer server, the data processing apparatus being capable of communicating via the printer server with the printing apparatus via a predetermined communication medium, the method comprising: a definition step in which paper feeding slot data is defined for each paper feeding slot of a plurality of paper feeding mechanisms for feeding a recording medium; a storage step in which the paper feeding slot data defined in the definition step for each paper feeding slot is stored into a memory; an acquisition step in which the paper feeding slot data of each paper feeding slot stored into the memory in the storage step is acquired; a notification step in which the paper feeding slot data acquired in the acquisition step is sent to the data processing apparatus in response to the acquisition request issued via the printer server; a storage step in which the paper feeding slot data returned from the printing apparatus is stored into a memory; an issuing step in which an acquisition request is issued to the printer server to acquire the paper feeding slot data defined for the paper feeding mechanism of the printing apparatus; a judgment step in which when the request for acquisition of the paper feeding slot data is issued in the issuing step, a judgment is made as to whether there is an updating request to update the paper feeding slot data stored in the memory in the storage step; a returning step in which the newest paper feeding slot data is returned to the data processing apparatus via the printer server, depending on the result of the judgment made in the judgment step as to whether there is an updating request; and a display step in which paper feeding slot data returned in the returning step is analyzed and paper resource information is displayed on a display device provided in the data processing apparatus.

According to still another aspect of the present invention, there is provided a method of processing data in a printing system including a data processing apparatus and a plurality of printing apparatus, the data processing apparatus being capable of communicating with the plurality of printing apparatus via a predetermined communication medium, the method comprising: a definition step in which paper feeding slot data is defined for each paper feeding slot of a plurality of paper feeding mechanisms for feeding a recording medium; a storage step in which the paper feeding slot data defined in the definition step for each paper feeding slot is stored into a memory; an acquisition step in which the paper feeding slot data of each paper feeding slot stored into the memory in the storage step is acquired; an issuing step in which an acquisition request is issued to each printing apparatus to acquire the paper feeding slot data defined for the paper feeding mechanism of each printing apparatus; a notification step in which the paper feeding slot data of each paper feeding slot acquired in the acquisition step is sent to the data processing apparatus in response to the acquisition request issued in the issuing step; and a display step in which the paper feeding slot data supplied in the notification step is analyzed and paper resource information is displayed on a display device of the data processing apparatus.

According to still another aspect of the present invention, there is provided a method of processing data in a printing system including a data processing apparatus, a plurality of printing apparatus, and a printer server, the data processing apparatus being capable of communicating via the printer server with the plurality of printing apparatus via a predetermined communication medium, the method comprising: a definition step in which paper feeding slot data is defined for each paper feeding slot of a plurality of paper feeding mechanisms for feeding a recording medium; a storage step in which the paper feeding slot data defined in the definition step for each paper feeding slot is stored into a memory; an acquisition step in which the paper feeding slot data of each paper feeding slot stored into the memory in the storage step is acquired; a notification step in which the paper feeding slot data acquired in the acquisition step is sent to the data processing apparatus in response to the acquisition request issued via the printer server; a storage step in which the paper feeding slot data returned from each printing apparatus is stored into a memory; an issuing step in which an acquisition request is issued to the printer server to acquire the paper feeding slot data defined for the paper feeding mechanism of each printing apparatus; a judgment step in which when the request for acquisition of the paper feeding slot data is issued in the issuing step, a judgment is made as to whether there is an updating request to update the paper feeding slot data stored in the memory in the storage step; a returning step in which the newest paper feeding slot data is returned to the data processing apparatus via the printer server, depending on the result of the judgment made in the judgment step as to whether there is an updating request; and a display step in which paper feeding slot data returned in the returning step is analyzed and paper resource information is displayed on a display device provided in the data processing apparatus.

Preferably, the printer server comprises updating means for, when the judgment means judges that there is an updating request, acquiring the newest paper feeding slot data from each printing apparatus and updating the paper feeding slot data stored in the storage means.

Furthermore, the paper resource information includes paper name data and paper attribute data defined for each paper feeding slot.

According to still another aspect of the present invention, there is provided a storage medium on which a program readable by a computer is stored, the computer being responsible for controlling a printing apparatus capable of communicating with a data processing apparatus via a predetermined communication medium, the program comprising: a definition step in which paper feeding slot data is defined for each paper feeding slot of a plurality of paper feeding mechanisms for feeding a recording medium; a storage step in which the paper feeding slot data defined in the definition step for each paper feeding slot is stored into a memory; an acquisition step in which the paper feeding slot data of each paper feeding slot stored in the storage step is acquired; and a notification step in which the paper feeding slot data acquired in the acquisition step is sent to the data processing apparatus.

In the notification step, the paper feeding slot data stored in the storage step is sent to the data processing apparatus in response to an acquisition request from the data processing apparatus.

According to still another aspect of the present invention, there is provided a storage medium on which a program readable by a computer is stored, the computer being responsible for controlling a data processing apparatus capable of communicating with a printing apparatus via a predetermined communication medium, the program comprising: an issuing step in which an acquisition request is issued to the printing apparatus to acquire the paper feeding slot data defined for the paper feeding mechanism of the printing apparatus; and a display step in which an analysis is made on the paper feeding slot data transferred from the printing apparatus in response to the request of acquisition of the paper feeding slot data issued in the issuing step, and paper resource information is displayed on a display device.

Preferably, the paper resource information includes paper name data and paper attribute data defined for each paper feeding slot.

According to still another aspect of the present invention, there is provided a storage medium on which a program readable by a computer is stored, the computer being responsible for controlling a printing system including a data processing apparatus and a printing apparatus capable of communicating with each other via a predetermined communication medium, the program comprising: a definition step in which paper feeding slot data is defined for each paper feeding slot of a plurality of paper feeding mechanisms for feeding recording medium; a storage step in which the paper feeding slot data defined in the definition step for each paper feeding slot is stored into a memory; an issuing step in which an acquisition request is issued to the printing apparatus to acquire the paper feeding slot data defined for the paper feeding mechanism of the printing apparatus; an acquisition step in which the paper feeding slot data of each paper feeding slot stored into the memory in the storage step is acquired; a notification step in which the paper feeding slot data acquired in the acquisition step is sent to the data processing apparatus, in response to the acquisition request issued in the issuing step; and a displaying step in which an analysis is made on the paper feeding slot data supplied in the notification step and paper resource information is displayed on a display device.

According to still another aspect of the present invention, there is provided a storage medium on which a program readable by a computer is stored, the computer being responsible for controlling a printing system including a data processing apparatus, a printing apparatus, and a printer server, the data processing apparatus being capable of communicating via the printer server with the printing apparatus via a predetermined communication medium, the program comprising: a definition step in which paper feeding slot data is defined for each paper feeding slot of a plurality of paper feeding mechanisms for feeding a recording medium; a storage step in which the paper feeding slot data defined in the definition step for each paper feeding slot is stored into a memory; an acquisition step in which the paper feeding slot data of each paper feeding slot stored into the memory in the storage step is acquired; a notification step in which the paper feeding slot data acquired in the acquisition step is sent to the data processing apparatus in response to the acquisition request issued via the printer server; a storage step in which the paper feeding slot data returned from the printing apparatus is stored into a memory; an issuing step in which an acquisition request is issued to the printer server to acquire the paper feeding slot data defined for the paper feeding mechanism of the printing apparatus; a judgment step in which when the request for acquisition of the paper feeding slot data is issued in the issuing step, a judgment is made as to whether there is an updating request to update the paper feeding slot data stored in the memory in the storage step; a returning step in which the newest paper feeding slot data is returned to the data processing apparatus via the printer server, depending on the result of the judgment made in the judgment step as to whether there is an updating request; and a display step in which paper feeding slot data returned in the returning step is analyzed and paper resource information is displayed on a display device provided in the data processing apparatus.

According to still another aspect of the present invention, there is provided a storage medium on which a program readable by a computer is stored, the computer being responsible for controlling a printing system including a data processing apparatus and a plurality of printing apparatus, the data processing apparatus being capable of communicating with the plurality of printing apparatus via a predetermined communication medium, the program comprising: a definition step in which paper feeding slot data is defined for each paper feeding slot of a plurality of paper feeding mechanisms for feeding a recording medium; a storage step in which the paper feeding slot data defined in the definition step for each paper feeding slot is stored into a memory; an acquisition step in which the paper feeding slot data of each paper feeding slot stored into the memory in the storage step is acquired; an issuing step in which an acquisition request is issued to each printing apparatus to acquire the paper feeding slot data defined for the paper feeding mechanism of each printing apparatus; a notification step in which the paper feeding slot data of each paper feeding slot acquired in the acquisition step is sent to the data processing apparatus in response to the acquisition request issued in the issuing step; and a display step in which the paper feeding slot data supplied in the notification step is analyzed and paper resource information is displayed on a display device of the data processing apparatus.

According to still another aspect of the present invention, there is provided a storage medium on which a program readable by a computer is stored, the computer being responsible for controlling a printing system including a data processing apparatus, a plurality of printing apparatus, and a printer server, the data processing apparatus being capable of communicating via the printer server with the plurality of printing apparatus via a predetermined communication medium, the program comprising: a definition step in which paper feeding slot data is defined for each paper feeding slot of a plurality of paper feeding mechanisms for feeding a recording medium; a storage step in which the paper feeding slot data defined in the definition step for each paper feeding slot is stored into a memory; an acquisition step in which the paper feeding slot data of each paper feeding slot stored into the memory in the storage step is acquired; a notification step in which the paper feeding slot data acquired in the acquisition step is sent to the data processing apparatus in response to the acquisition request issued via the printer server; a storage step in which the paper feeding slot data returned from each printing apparatus is stored into a memory; an issuing step in which an acquisition request is issued to the printer server to acquire the paper feeding slot data defined for the paper feeding mechanism of each printing apparatus; a judgment step in which when the request for acquisition of the paper feeding slot data is issued in the issuing step, a judgment is made as to whether there is an updating request to update the paper feeding slot data stored in the memory in the storage step; a returning step in which the newest paper feeding slot data is returned to the data processing apparatus via the printer server, depending on the result of the judgment made in the judgment step as to whether there is an updating request; and a display step in which paper feeding slot data returned in the returning step is analyzed and paper resource information is displayed on a display device provided in the data processing apparatus.

Preferably, the printer server comprises updating means for, when the judgment means judges that there is an updating request, acquiring the newest paper feeding slot data from each printing apparatus and updating the paper feeding slot data stored in the storage means.

Furthermore, the paper resource information includes paper name data and paper attribute data defined for each paper feeding slot.

According to still another aspect of the present invention, there is provided a printing operation control apparatus for controlling the operation of transferring printing information by communicating via a predetermined communication medium with a plurality of printing apparatus each having a paper feeding slot to which a paper name may be assigned, the printing operation control apparatus comprising: first display control means for displaying, on a display device, a printing operation control screen including a paper name selection box used to select a paper name; acquisition means for examining and acquiring information about available resources of the printing apparatus, in response to a print request from an application program; first generation means for generating a paper name information table by analyzing the information of resources of each printing apparatus acquired by the acquisition means; second generation means for generating a paper name list to be displayed on the printing operation control screen in accordance with the paper name information table generated by the first generation means; second display control means for displaying, on the printing operation control screen, a list of selectable paper names according to the paper name list generated by the second generation means, in response to indication of the paper name selection box displayed on the printing operation control screen; and setting means for retrieving, from the paper name information table, a printing apparatus assigned the desired paper name selected from the list of selectable paper names and setting the retrieved printing apparatus as the designation to which the printing information is output.

Preferably, the second display control means displays, on the printing operation control screen, the paper name located at the top of the paper name list as a current paper name.

Preferably, the printing operation control apparatus further comprises: designation means for designating a selection rule of selecting a printing apparatus from a plurality of printing apparatus assigned the same paper name in a competitive fashion; judgment means for judging whether a paper name is a competitive paper name assigned to a plurality of printing apparatus in a competitive fashion; and determination means that, when the judgment means judges that the selected paper name is a competitive paper name, determines a printing apparatus which should be set by the setting means as the destination to which the printing information is output, in accordance with the selection rule designated by the designation means.

Preferably, the plurality of printing apparatus include a printing apparatus connected in an one-to-one fashion to a particular data processing apparatus.

According to still another aspect of the present invention, there is provided a printing operation controlling method of controlling the operation of transferring printing information by communicating via a predetermined communication medium with a plurality of printing apparatus each having a paper feeding slot to which a paper name may be assigned, the method comprising: a first displaying step in which a printing operation control screen is displayed on a display device, the printing operation control screen including a paper name selection box used to select a paper name; an acquisition step in which in response to a print request from an application program, information about available resources of the printing apparatus is examined and acquired; a first generation step in which a paper name information table is generated by analyzing the acquired information about resources of each printing apparatus; a second generation step in which a paper name list to be displayed on the printing operation control screen is generated in accordance with the generated paper name information table; a second display step in which a list of selectable paper names generated according to the paper name list is displayed on the printing operation control screen in response to indication of the paper name selection box displayed on the printing operation control screen; and a setting step in which a printing apparatus assigned the desired paper name selected from the list of selectable paper names is retrieved from the paper name information table, and the retrieved printing apparatus is set as the designation to which the printing information is output.

According to still another aspect of the present invention, there is provided a storage medium on which a program readable by a computer is stored, the computer being responsible for controlling the operation of transferring printing information by communicating via a predetermined communication medium with a plurality of printing apparatus each having a paper feeding slot to which a paper name may be assigned, the program comprising: a first displaying step in which a printing operation control screen is displayed on a display device, the printing operation control screen including a paper name selection box used to select a paper name; an acquisition step in which in response to a print request from an application program, information about available resources of the printing apparatus is examined and acquired; a first generation step in which a paper name information table is generated by analyzing the acquired information about resources of each printing apparatus; a second generation step in which a paper name list to be displayed on the printing operation control screen is generated in accordance with the generated paper name information table; a second display step in which a list of selectable paper names generated according to the paper name list is displayed on the printing operation control screen in response to indication of the paper name selection box displayed on the printing operation control screen; and a setting step in which a printing apparatus assigned the desired paper name selected from the list of selectable paper names is retrieved from the paper name information table, and the retrieved printing apparatus is set as the designation to which the printing information is output.

According to still another aspect of the present invention, there is provided a printing operation controlling method of controlling the operation of transferring printing information by communicating via a predetermined communication medium with a plurality of printing apparatus each having a paper feeding slot to which a paper name may be assigned, the method comprising: a judgment step in which, in response to a print request from an application program, a judgment is made as to whether there is an available printing apparatus connected to the predetermined communication medium; a first storage step in which the network information about the available printing apparatus obtained in the judgment step is stored in a memory; a setting step in which the network information stored in the memory is analyzed and the number of printing apparatus with the paper name designation capability to be examined is set; an examination step in which an examination is made on as many printing apparatus as the number set in the setting step as to whether each the printing apparatus has the capability of selecting a paper feeding slot in accordance with a paper name; and a second storage step in which if the examination step concludes that the printing apparatus has the capability of selecting a paper feeding slot in accordance with a paper name, the paper name assigned to each paper feeding slot is acquired and stored in the memory.

According to still another aspect of the present invention, there is provided a storage medium on which a program readable by a computer is stored, the computer being responsible for controlling the operation of transferring printing information by communicating via a predetermined communication medium with a plurality of printing apparatus each having a paper feeding slot to which a paper name may be assigned, the program comprising: a judgment step in which, in response to a print request from an application program, a judgment is made as to whether there is an available printing apparatus connected to the predetermined communication medium; a first storage step in which the network information about the available printing apparatus obtained in the judgment step is stored in a memory; a setting step in which the network information stored in the memory is analyzed and the number of printing apparatus with the paper name designation capability to be examined is set; an examination step in which an examination is made on as many printing apparatus as the number set in the setting step as to whether each the printing apparatus has the capability of selecting a paper feeding slot in accordance with a paper name; and a second storage step in which if the examination step concludes that the printing apparatus has the capability of selecting a paper feeding slot in accordance with a paper name, the paper name assigned to each paper feeding slot is acquired and stored in the memory.

According to still another aspect of the present invention, there is provided a printing operation controlling method of controlling the operation of transferring printing information by communicating via a predetermined communication medium with a plurality of printing apparatus each having a paper feeding slot to which a paper name may be assigned, the method comprising: a judgment step in which a judgment is made as to whether the data stored in a memory includes a paper name acquired from a printing apparatus having the capability of selecting a paper feeding slot according to a paper name; a generation step in which if the judgment step concludes that the paper name is included in the data stored in the memory, the memory is searched to generate a paper name list to be displayed in the paper name selection box of the printing operation control screen displayed on a display device; and a displaying step in which a current paper name is displayed in the paper name selection box in accordance with the generated paper name list.

According to still another aspect of the present invention, there is provided a storage medium on which a program readable by a computer is stored, the computer being responsible for controlling the operation of transferring printing information by communicating via a predetermined communication medium with a plurality of printing apparatus each having a paper feeding slot to which a paper name may be assigned, the program comprising: a judgment step in which a judgment is made as to whether the data stored in a memory includes a paper name acquired from a printing apparatus having the capability of selecting a paper feeding slot according to a paper name; a generation step in which if the judgment step concludes that the paper name is included in the data stored in the memory, the memory is searched to generate a paper name list to be displayed in the paper name selection box of the printing operation control screen displayed on a display device; and a displaying step in which a current paper name is displayed in the paper name selection box in accordance with the generated paper name list.

According to still another aspect of the present invention, there is provided a printing operation controlling method of controlling the operation of transferring printing information by communicating via a predetermined communication medium with a plurality of printing apparatus each having a paper feeding slot to which a paper name may be assigned, the method comprising: a first judgment step in which a judgment is made as to the selection status of the paper name selection box of the printing operation control screen displayed on a display device; a displaying step in which if the first judgment step concludes that the paper name selection box of the printing operation control screen displayed on the display device is selected, a paper name list is displayed on the printing operation control screen of the display device in accordance with the paper name list stored in a memory; a second judgment step in which a judgment is made as to whether a paper name different from the current paper name is selected from the displayed paper name list; a first setting step in which if the second judgment step concludes that a paper name different from the current paper name is selected from the displayed paper name list, the selected paper name is set as the current paper name; a third judgment step in which a judgment is made as to whether a print start command or a print cancel command is issued; a second setting step in which if the third judgment step concludes that a print start command has been issued, the destination to which printing information is output is set by referring to the paper name information stored in the memory corresponding to the current paper name; and a transmission step in which the printing information is transmitted to the printing apparatus set as the output destination in the second setting step.

According to still another aspect of the present invention, there is provided a storage medium on which a program readable by a computer is stored, the computer being responsible for controlling the operation of transferring printing information by communicating via a predetermined communication medium with a plurality of printing apparatus each having a paper feeding slot to which a paper name may be assigned, the program comprising: a first judgment step in which a judgment is made as to the selection status of the paper name selection box of the printing operation control screen displayed on a display device; a displaying step in which if the first judgment step concludes that the paper name selection box of the printing operation control screen displayed on the display device is selected, a paper name list is displayed on the printing operation control screen of the display device in accordance with the paper name list stored in a memory; a second judgment step in which a judgment is made as to whether a paper name different from the current paper name is selected from the displayed paper name list; a first setting step in which if the second judgment step concludes that a paper name different from the current paper name is selected from the displayed paper name list, the selected paper name is set as the current paper name; a third judgment step in which a judgment is made as to whether a print start command or a print cancel command is issued; a second setting step in which if the third judgment step concludes that a print start command has been issued, the destination to which printing information is output is set by referring to the paper name information stored in the memory corresponding to the current paper name; and a transmission step in which the printing information is transmitted to the printing apparatus set as the output destination in the second setting step.

BRIEF DESCRIPTION OF THE DRAWINGS

FIG. 1 is a block diagram illustrating a printing system including a printing operation controller according to a first embodiment of the invention;

FIG. 2 illustrates an example of a printer resource management table managed by the host computer shown in FIG. 1;

FIG. 7 is a schematic diagram illustrating an example of a network information table produced in accordance with network information acquired by the host computer shown in FIG. 1 via a network;

FIG. 8 is a schematic diagram illustrating an example of a paper name designation table associated with networked printers, acquired by the host computer shown in FIG. 1 via the network;

FIG. 9, consisting of FIGS. 9A, 9B and 9C, is a schematic diagram illustrating an example of a paper name list produced in accordance with the paper name designation table shown in FIG. 8;

FIG. 22 is a schematic representation of a memory map of a storage medium for storing various data processing programs readable by a printing system including a data processing apparatus according to the present invention;

FIG. 23 is a schematic diagram illustrating an example of printing system including a printing operation controller according to a conventional technique;

FIG. 24 is, a schematic diagram illustrating another example of printing system including a printing operation controller according to a conventional technique;

FIG. 25 is a schematic diagram illustrating still another example of printing system including a printing operation controller according to a conventional technique; and FIG. 26 is a schematic diagram illustrating still another example of printing system including a printing operation controller according to a conventional technique.

DESCRIPTION OF THE PREFERRED EMBODIMENTS

First Embodiment

FIG. 1 is a block diagram illustrating a printing system including a printing operation controller according to a first embodiment of the invention. This printing system is based on the above-described aspect of the invention in which a host computer is adapted to communicate with a plurality of printing apparatus via a predetermined communication medium.

In FIG. 1, a host computer 1 is connected to printers 2–5 via a network such as Ethernet 6 so that the host computer 1 and the printers 2–5 can communicate with each other according to a predetermined protocol. Herein, the printers 2–5 are assumed to have the paper name designation capability.

FIG. 2 illustrates an example of a printer resource management table managed by the host computer 1 shown in FIG. 1. An arbitrary logical paper name is assigned to each physical paper feeding slot of each printer 2–5 as shown in FIG. 2 so that the host computer can use these logical paper names. The data representing the printer resource management table is stored in the memory shown in FIG. 3. However, the paper name designation capability is not available in the printer 5. Herein, the printer 3 is assumed to be higher in throughput than the printer 4. Furthermore, the printer 3 is assumed to be of the monochrome type and the printer 4 is assumed to be capable of printing a color image. Still furthermore, the printer 3 is assumed to have a higher paper capacity than the printer 4.

Figure 3:
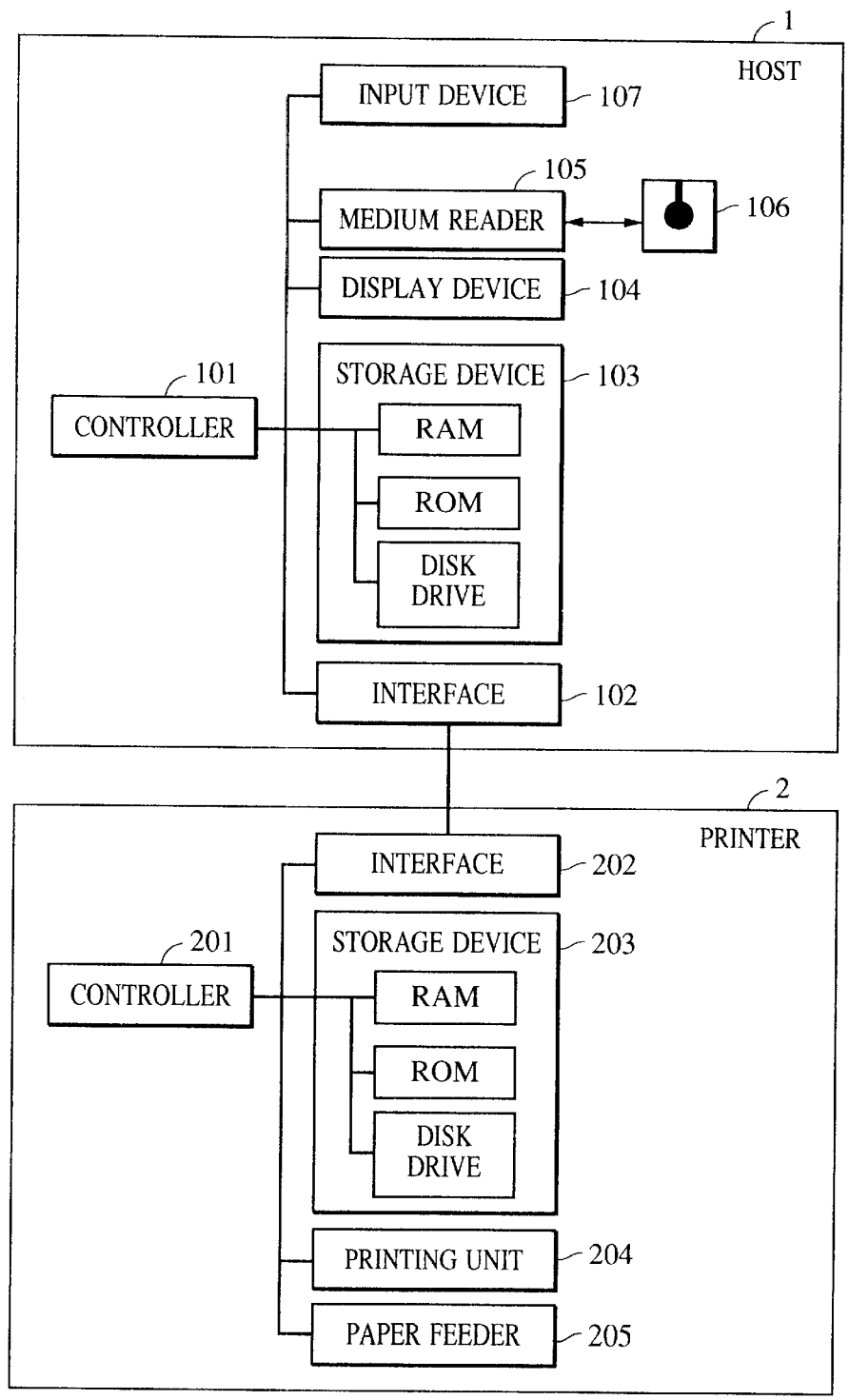
FIG. 3 is a block diagram illustrating main parts of the host computer and one of printers of the printing system shown in FIG. 1.

FIG. 3 is a block diagram illustrating main parts of the host computer and one of printers of the printing system shown in FIG. 1. Herein the host computer 1 may also be a personal computer, work station, or a minicomputer, and the printer 2 may also be a plotter, a digital copying machine, or a facsimile machine.

In the host computer 1, a controller 101 executes a system control program, a print control program, and an application program (such as programs shown in various figures) loaded from a storage device such as a ROM or a storage device 103 onto a RAM thereby generally controlling various data processing operations.

Reference numeral 104 denotes a display device 104 including a CRT, FLC, or LCD. Reference numeral 107 denotes an input device such as a keyboard or a pointing device. Reference numeral 105 denotes a medium reader such as an FD drive, an MO drive, a CD-ROM drive, or an IC memory card reader. The medium reader 105 reads a control program and a data file, as required, from a storage medium such as an FD, an MO, a DVD, a CD-ROM, or an IC memory card. Under the control of the controller 101, the control program or the data file is stored onto the disk drive such as a magnetic disk drive, a magneto-optical disk drive, or a magnetic tape drive, of the storage device 103. Reference numeral 106 denotes a storage medium on which the print control program for controlling the process which will be described later with reference to flowcharts is stored in either a direct form or a compressed form. In the case where the control program is stored in a compressed form, the print control program is first decompressed and then installed at a predetermined address of the storage device 103. After that, the print control program is loaded onto the RAM as required and executed.

Reference numeral 102 denotes an interface device such as a serial interface board, a parallel interface board, or a network interface board.

In the printer 2, reference numeral 201 denotes a controller which executes a system control program stored in a storage device such as a disk drive 203 or downloaded from the host computer 1 thereby generally controlling various operations such as a process of print data received from the host computer 1, the operation of a paper feeder 205, and the operation of driving a printing unit 204. In the present invention, the printing unit 204 may include a printer engine based on any proper technique such as a laser beam, bubble jet, LED, or thermal transfer printing technique. An optional device such as a finisher or a sorter may be connected to the printing unit 204. The paper feeder 205 includes a detector such as a photosensor for detecting the presence of recording media placed in each cassette (not shown). The detection signal is sent to the controller 201.

Figure 4:
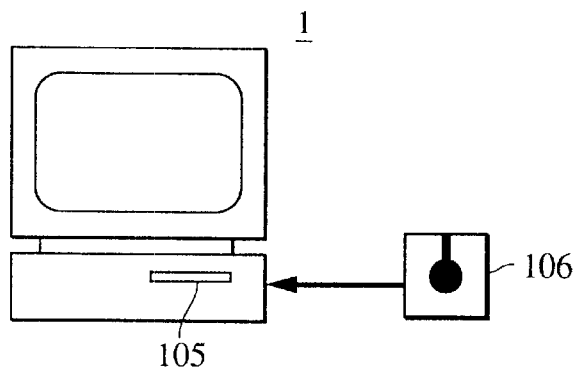
FIG. 4 is a schematic diagram illustrating the operation of inserting a storage medium into the medium reader of the host computer shown in FIG. 3.

FIG. 4 is a schematic diagram illustrating the operation of inserting a storage medium 106 into the medium reader 105 of the host computer 1 shown in FIG. 3.

In FIG. 1, reference numeral 1001 denotes an insertion slot through which the storage medium is set in the medium reader.

Figure 5:
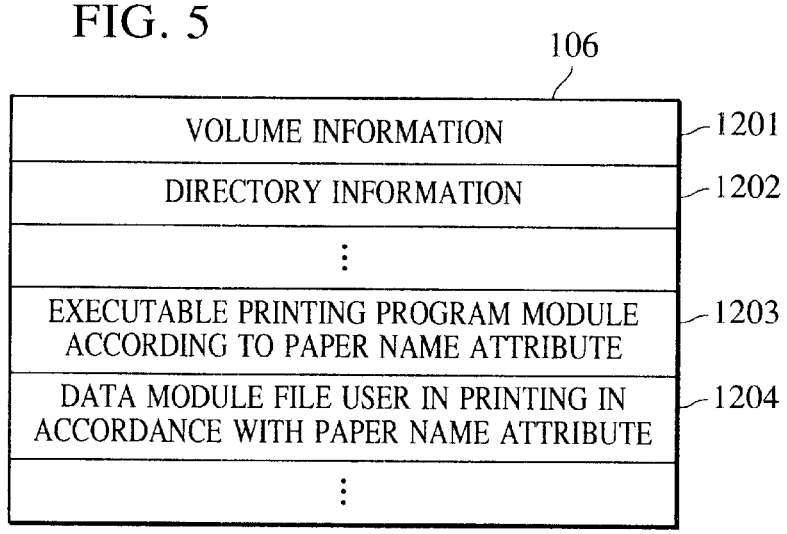
FIG. 5 is a schematic diagram illustrating the memory map of the storage medium shown in FIG. 4.

FIG. 5 is a schematic diagram illustrating the memory map of the storage medium 106 shown in FIG. 4.

In FIG. 1, an area 1202 includes volume information representing the amount of storage area available for writing data and also the name of the storage medium. In an area 1202, directory information is stored. In an area 1203, a program file in an executable module form written in a proper language is stored. An area 1204 is used to store a module data file representing various parameters required to execute the executable module file 1203.

Figure 6:
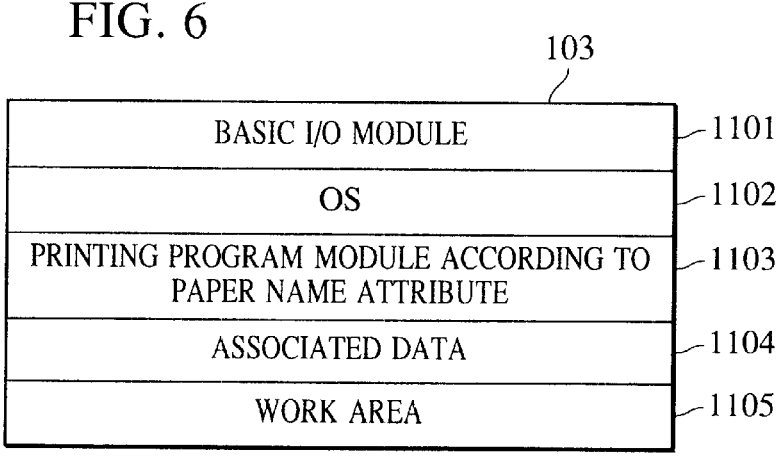
FIG. 6 is a schematic diagram illustrating the memory map of the RAM of the storage device shown in FIG. 3.

FIG. 6 is a schematic diagram illustrating the memory map of the RAM of the storage device 103 shown in FIG. 3.

In FIG. 1, reference numerals 1101 and 1102 denote system module areas wherein a basic I/O module is loaded in the system module area 1101 and an operating system (OS) is loaded in the system module area 1102.

An area 1103 is a system module area in which a printing system module for performing a printing operation based on the paper name attributes is loaded. Other associated data is loaded in a data area 1104. A data area 1105 is used as a work area.

FIG. 7 is a schematic diagram illustrating an example of a network information table produced in accordance with network information acquired by the host computer 1 shown in FIG. 1 via the network. This table is produced in the RAM of the storage device 103. The specific example of the network information table shown in FIG. 7 represents the information about the network used in the printing system shown in FIG. 1.

In the present embodiment, the network information table includes identification (ID) information, printer names, and network addresses.

FIG. 8 is a schematic diagram illustrating an example of a paper name designation table associated with networked printers, acquired by the host computer 1 shown in FIG. 1 via the network. This table is produced in the RAM of the storage device 103. The specific example of the paper name designation table shown in FIG. 8 represents the information about the paper names defined for the networked printers used in the printing system shown in FIG. 1.

FIG. 9 is a schematic diagram illustrating an example of a paper name list produced in accordance with the paper name designation table shown in FIG. 8. This list is produced in the RAM by the controller 101 in accordance with the paper name designation table stored in the storage device 103. The production process of the paper name list is shown in FIGS. 3a to 3c.

Figures 10, 11, 12:
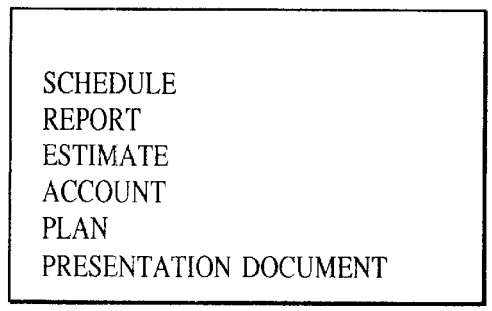
FIG. 10 illustrates a first example of a printing operation control screen displayed on the display device shown in FIG. 3.
FIG. 11 illustrates a second example of a printing operation control screen displayed on the display device shown in FIG. 3.
FIG. 12 illustrates a list of selectable paper names displayed when a button of the printing operation control screen shown in FIG. 10 is clicked.

FIGS. 10 and 11 are schematic diagrams illustrating examples of a first printing operation control screen displayed on the display device 104 shown in FIG. 3. When an application program is being executed, if a print command is selected from a command menu, then the first printing operation control screen is displayed in the form of a pop-up dialog screen W.

In FIG. 1, BT1–BT5 are buttons wherein the button BT1 is used as a print start button. If this button BT1 is clicked with a cursor (not shown), a printing process is started.

When the button BT2 is clicked with the cursor, the printing process is canceled. When various optional functions are desired to be set, the button BT3 is clicked with the cursor. If the button BT4 is clicked with the cursor, a help message is displayed. If the button BT5 is clicked with the cursor, a paper name list is displayed.

FIG. 12 illustrates the list of selectable paper names displayed when the button BT5 in the printing operation control screen shown in FIG. 10 is clicked.

The list of selectable paper names is displayed in accordance with the paper name list shown in FIG. 9. The paper name at the top of the list is displayed as a default paper name on the button BT5. If another paper name is selected from the paper name list which appears when the button BT5 is clicked, the paper name displayed on the button BT5 is changed from a paper name (for example, "Notice" as shown in FIG. 10) to the selected paper name (for example, "Plan" as shown in FIG. 11).

With reference to flowcharts shown in FIGS. 13 to 15, the operation of processing data performed by the printing operation controller according to the present invention is described below.

Steps 1–25 shown in the flowcharts are described in the program module stored on the disk drive of the storage device 103 of the host computer 1. This program module is loaded into the RAM of the storage device 103 of the host computer 1 and executed when the host computer 1 is started.

Alternatively, the program module and associated data may be loaded from the medium reader 105 of the host computer 1 into the RAM of the host computer and executed. In this case, it is required that the program module and the associated data be stored on the storage medium 106 shown in FIG. 4 according to the format shown in FIG. 4. Furthermore, in this case, the program module and the associated data stored on the storage medium 106 according to the present embodiment are loaded onto the host computer 1 via the medium reader 1001 shown in FIG. 4. If the storage medium 106 is set into the medium reader 1001 of the host computer 1, the module and associated data according to the present embodiment are read from the storage medium 106 and loaded into the RAM of the storage device 103 of the host computer 1 under the control of the OS 1102 and the basic I/O module 1101 resident in the RAM of the storage device 103 shown in FIG. 6 thereby making it possible to perform the operation.

Alternatively, the module and associated data embodying the present invention may be read from the storage medium 106 shown in FIG. 4 and temporarily installed on the disk drive of the storage device 103 of the host computer so that when the module is executed using the associated data, the module and associated data are loaded from the disk drive into the RAM of the storage device 103 of the host computer.

The features of the present embodiment is now described below with reference to FIG. 3 and other figures as required.

That is, the present embodiment of the invention provides a printing operation control apparatus for controlling the operation of transferring printing information by communicating via a predetermined communication medium with a plurality of printing apparatus (printers 2–4 shown in FIG. 1) each having a paper feeding slot to which a paper name may be assigned, the printing operation control apparatus comprising: first display control means for displaying, on a display device 104, a printing operation control screen including a paper name selection box used to select a paper name (the control is performed by the controller 101 by executing the control program stored in the memory resource of the storage device 103 (the control program may also be supplied from a storage medium 106 which will be described later)); acquisition means for examining and acquiring information about available resources of the printing apparatus, in response to a print request from an application program (the resource information is acquired via the interface 102 by the controller 101 by executing the control program stored in the memory resource of the storage device 103 (the control program may also be supplied from the storage medium 106 which will be described later)); first generation means for generating a paper name information table by analyzing the information of resources of each printing apparatus acquired by the acquisition means (the generation is performed by the controller 101 by executing the control program stored in the memory resource of the storage device 103 (the control program may also be supplied from the storage medium 106 which will be described later)); second generation means for generating a paper name list (refer to FIG. 9) to be displayed on the printing operation control screen in accordance with the paper name information: table (refer to FIG. 8) generated by the first generation: means (the generation is performed by the controller 101 by executing the control program stored in the memory resource of the storage device 103 (the control program may also be supplied from the storage medium 106 which will be described later)); second display control means for displaying, on the printing operation control screen, a list of selectable paper names according to the paper name list generated by the second generation means, in response to indication of the paper name selection box displayed on the printing operation control screen (the control is performed by the controller 101 by executing the control program stored in the memory resource of the storage device 103 (the control program may also be supplied from a storage medium 106 which will be described later)); and setting means for retrieving, from the paper name information table, a printing apparatus assigned the desired paper name selected from the list of selectable paper names and setting the retrieved printing apparatus as the designation to which the printing information is output (the setting is performed by the controller 101 by executing the control program stored in the memory resource of the storage device 103 (the control program may also be supplied from the storage medium 106 which will be described later)). This technique makes it possible to build a networked printing system having the paper name designation capability in which it is possible to perform a printing operation on desired paper using a printer in which the desired paper is available simply by designating a desired paper name in a similar manner to that employed in the conventional paper name designation technique, without having to know which paper name is assigned to which printer on the network.

The controller 101 employs the paper name at the top of the paper name list as the current paper name and displays it on the printing operation control screen (refer to FIG. 10). Thus, the current paper name is automatically set.

Figure 13:
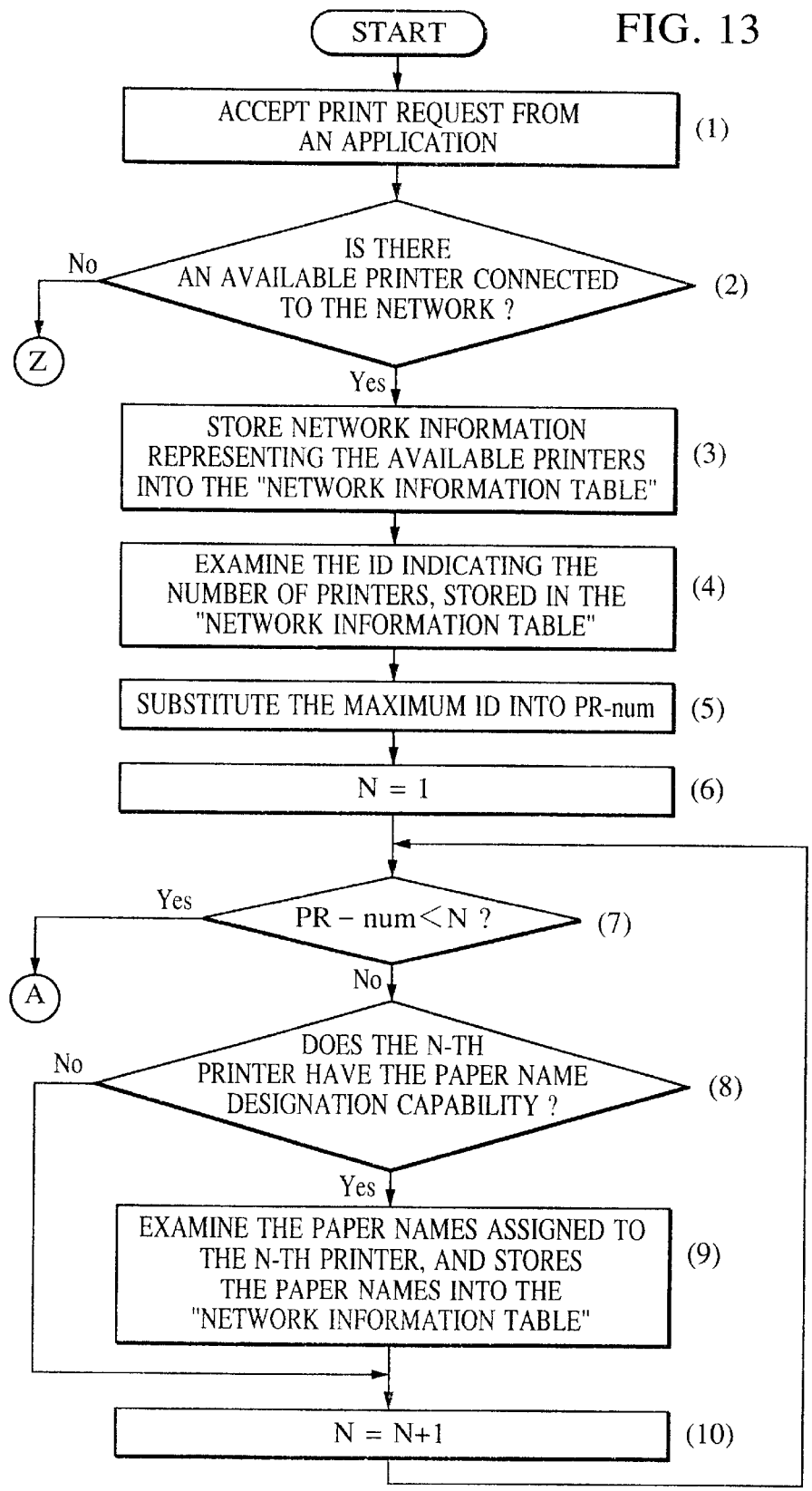
FIG. 13 is a flowchart illustrating an example of a data processing procedure performed by a printing operation controller according to the present invention.
Figure 14:
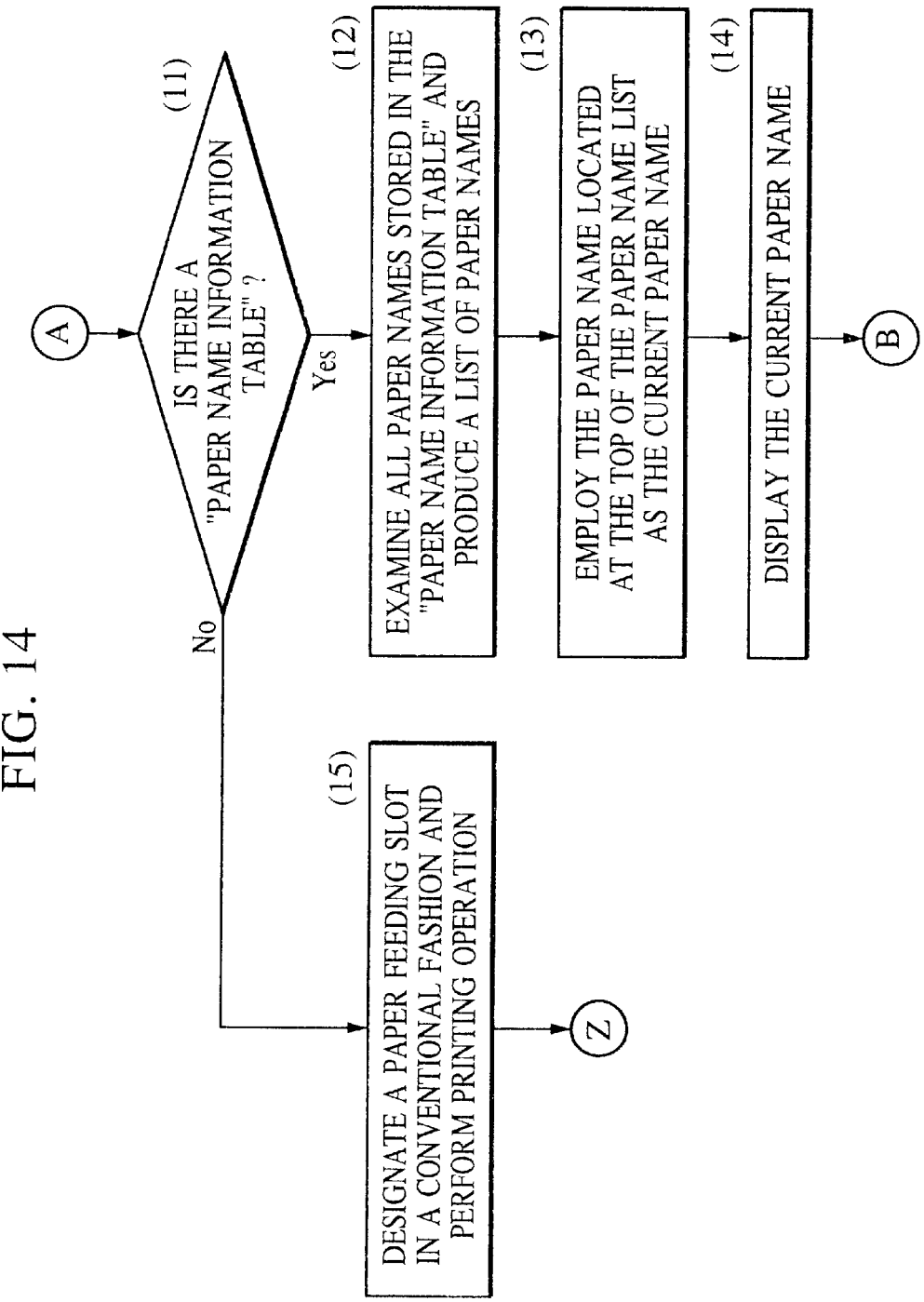
FIG. 14 is a flowchart illustrating an example of a data processing procedure performed by the printing operation controller according to the present invention.
Figure 15:
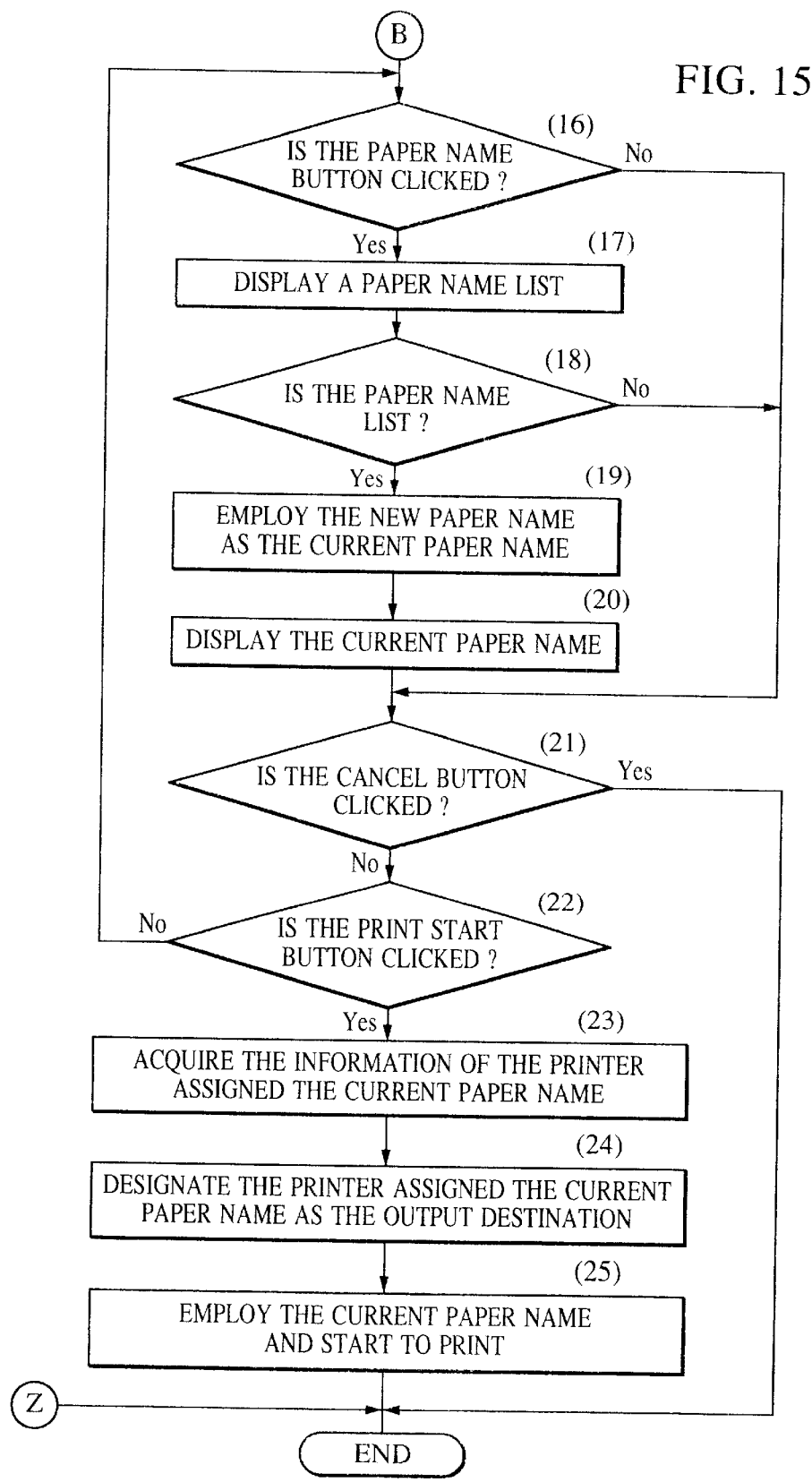
FIG. 15 is a flowchart illustrating an example of a data processing procedure performed by the printing operation controller according to the present invention.

In practice, the modules described in the present embodiment are given in the form of program codes corresponding to the flowcharts shown in FIGS. 13, 14 and 15. Now, details of the data processing according to the present embodiment are described.

First, the controller 101 of the host computer 1 shown in FIG. 3 accepts a print request from an application program and starts a printing process (step 1). The controller 101 checks whether there is an available printer connected to the host computer 1 via an interface 102 and further via a network (step 2). If there is no available printer, the process is terminated.

If it is determined in step 2 that there is an available printer (in the specific example of the printing system shown in FIG. 1, the printers 2–6 connected to the network 6 are available, and thus controller 101 determines that there are available printers connected to the network 6), then the controller 101 stores the obtained network information in terms of the available printers as a "network information table" with the data structure shown in FIG. 7 into a RAM of the storage device 103.

As shown in FIG. 7, the network information table includes identification (ID) data, names of printers connected to the network 6, and the network addresses assigned to the respective printers wherein the identification data not only identifies each printer but also represents the number of printers.

The controller 101 determines the number of identification data present in the "network information table" stored in the RAM of the storage device 103 (step 4), and substitutes the resultant number into a variable PR_num indicating the maximum number of identification data (step 5).

In this specific embodiment, there are four identification data, and thus 4 is substituted into the variable PR_num and stored in the RAM of the storage device 103 of the host computer 1.

The controller 101 sets the value of a variable N used to count the identification data to an initial value of 1 (step 6). The controller 101 then checks whether the variable PR_num is greater than the variable N (step 7).

In the present embodiment, PR_num=4 and N=1 at the beginning. Thus the judgment made by the controller 101 in step 7 is negative, that is, the controller 101 determines that the variable PR_num is not greater than the variable N, and the controller 101 determines whether the printer corresponding to the N-th identification data has the paper name designation capability (step 8). In this process, the controller 101 refers to the "network information table" shown in FIG. 7 and acquires the network address (80:11:22:33:44:01) of the printer (printer 2) with the ID=1 corresponding to the current value of the variable N.

In accordance with the network address, the controller 101 accesses the printer 2 shown in FIG. 1 via the interface 102 and inquires of the controller 201 of the printer 2 shown in FIG. 2 via the interface 202 of the printer 2 whether the printer 2 has the paper name designation capability. The controller 201 notifies the controller 101 via the interfaces 202 and 102 that the printer 2 has the paper name designation capability. From the notification from the controller 201, the controller 101 concludes that the printer 2 has the paper name designation capability.

The controller 101 determines whether the printer corresponding to the N-th identification data has the paper name designation capability and the stores the result as the "paper name information table" having the data structure shown in FIG. 8 into the RAM of the storage device 103 of the host computer 1 (step 9). According to a procedure similar to that employed to determine whether the printer 2 has the paper name designation capability, the controller 101 also acquires paper names "Notice", "Schedule", and "Report" assigned to the printer 2 and stores them in the "paper name information table" in the RAM of the storage device 103 of the host computer 1.

To determine whether the next printer 3 has the paper name designation capability and to acquire the paper names assigned to the printer 3, the variable N is incremented by 1 (step 10) and the process returns to step 7. Thus, the first execution of step 7 causes the variable N to have a value equal to 2 (=1+1).

In the following process, steps 7–10 are performed repeatedly for the variable N with 2 corresponding to the printer 2 and also for the variable N with 3 corresponding to the printer 3. In the above execution of these steps, it is determined that the printers 3 and 4 have the paper name designation capability, and data having the data structure shown in FIG. 8 and representing the paper names assigned to the printers 3 and 4 is stored in the RAM of the storage device 103. At this stage of the process, the variable N comes to have a value equal to 4. The process then returns to step 7 and the controller 101 determines whether the variable PR_num is greater than the variable N. Because PR_num=4 and N=4, the controller 101 determines that PR_num is not greater than N. The controller 101 then determines whether the printer corresponding to the N-th identification (ID) data has the paper name designation capability (step 8).

In this step, the controller 101 refers to the "network information table" and acquires the information about the printer having identification (ID) data=4 corresponding to the current value of the variable N. More specifically, the controller 101 acquires a network address "80:11:22:33:44:04" assigned to that printer. In accordance with the acquired network address, the controller 101 accesses the printer 5 shown in FIG. 1 via the interface 102 and inquires of the controller 201 of the printer via the printer's interface 202 shown in FIG. 3 whether the printer 5 has the paper name designation capability.

In this specific example, the printer 5 does not have the paper name designation capability, and the controller 201 notifies the controller 101 via the interfaces 202 and 102 that the printer 5 does not have the paper name designation capability.

From the notification from the controller 201, the controller 101 concludes that the printer 5 does not have the paper name designation capability. The process then goes to step 10 and the variable N is incremented by 1 so as to determine whether the next printer has the paper name designation. capability and so as to acquire the paper names assigned to that printer.

In this case, when the process returns to step 7, the variable N has a value equal to 5 and thus the controller 101 determines that the variable PR_num is greater than the variable N. That is, the judgment in step 7 is positive, and thus the process goes to step 11. At this stage of the process, the "paper name information table " shown in FIG. 8 has been produced in a complete form in the RAM of the storage device 103.

Then in step 11, to determine whether a printer having the paper name designation capability is included in the available printers, the controller 101 determines whether the "paper name information table" is stored in the storage device 103. If the controller 101 determines in step 11 that the "paper name information table" is not stored in the storage device 103, then the printing operation is performed in the conventional manner in which the paper feeding slot is physically designated (step 15) and the process is completed.

On the other hand, if the controller 101 determines in step 11 that the "paper name information table" is stored in the storage device 103, then the controller 101 examines all paper names stored in the "paper name information table" shown in FIG. 8 and produces a paper name list as shown in FIG. 9 (step 12).

When the paper name list is produced, the controller 101 examines the paper name information table shown in FIG. 8 to determine what paper names are assigned to the printer having a paper name of "printer 2", and produces, as shown in FIG. 9A, the paper name list from the examination result. The resultant paper name list is stored in the RAM of the storage device 103 so that it can be used as displaying data.

The controller further examines the paper name information table shown in FIG. 8 to determine what paper names are assigned to the printer having a paper name of "printer 3", and adds the result to the paper name list shown in FIG. 9A. As a result, a paper name list shown in FIG. 9B is obtained and stored in the RAM of the storage device 103. Furthermore, the controller examines the paper name information table shown in FIG. 8 to determine what paper names are assigned to the printer having a paper name of "printer 4", and adds the result to the paper name list shown in FIG. 9B. As a result, a paper name list shown in FIG. 9C is obtained and stored in the RAM of the storage device 103.

The controller 101 employs the paper name "Notice" located at the top of the paper name list as a paper name to be displayed as the current paper name, and stores the information indicating the current paper name in the RAM of the storage device 103 (step 13). The controller 101 displays a print dialog screen W, including a paper name selection box in which a current paper name "Notice" is displayed, on the display device 104 of the host computer 1 so as to accept a command from a user, such as a print start command, print cancel command, and a paper name designation command (step 14).

The controller 101 determines whether the user selects the paper name selection box on the print dialog screen W by operating the input device 107 of the host computer 1 (step 16). In the case where the controller 101 determines that the paper name selection box is not selected, the process goes to step 21.

On the other hand, if the controller 101 determines in step 16 that the paper name selection box is selected, then the controller 101 reads the data of the paper name list from the RAM of the storage device 103 and displays the paper name list such as that shown in FIG. 12 on the display device 104 of the host computer 1 (step 17).

The controller 101 determines whether the user selects a paper name from the paper name list displayed on the display device 104 of the host computer 1 by operating the input device 107 thereby requesting a change in the paper name from the current paper name to the selected new paper name (step 18). In the case where the controller 101 determines that the change in the paper name is not requested, the process goes to step 21.

On the other hand, if the controller 101 determines in step 18 that a change in the paper name is requested, then the controller 101 employs the selected paper name as the current paper name (step 19) and stores the information indicating the new current paper name into the RAM of the storage device 103.

More specifically, if the user selects, for example, "Plan" from the paper name list by operating the input device 107, then the controller 101 displays the selected paper name on the display device 104 of the host computer as shown in FIG. 11 (step 20).

The controller 101 then determines whether a print cancel command is issued by the user via the print dialog screen W (by pressing a cancel button BT2 shown in FIG. 10 or 11) (step 21). If the controller 101 determines that a print cancel command is issued, the controller 101 cancels the printing operation and terminates the process.

On the other hand, if the controller 101 determines in step 21 that a print cancel command is not issued, then the controller 101 further determines whether a print start command is issued by the user via the print dialog screen W by operating the input device 107 of the host computer 1 (more specifically by pressing the print start button BT1 shown in FIGS. 10 and 11) (step 22). If the controller 101 determines that a print start command is not issued, the process returns to step 16.

On the other hand, if the controller 101 determines in step 22 that a print start command is issued, the controller 101 acquires the current paper name from the RAM of the storage device 103 (step 23) and examines the "network information table" shown in FIG. 7 and also the "paper name information table" shown in FIG. 8 both stored in the RAM of the storage device 103 so as to acquire information about the printer assigned the acquired paper name (step 23).

In this specific example, the controller 101 gets to know, from the acquired information, that the current paper name is "Plan", and also gets to know, from the "paper name information table", that the paper name "Plan" is assigned to the printer 4. Furthermore, the controller 101 gets to know, from the "network information table", that the printer 4 assigned the paper name "Plan" has a network address "80:11:22:33:44:03".

The controller 101 then employs the printer 4 assigned the current paper name as the destination to which the printing data is output (step 24). Furthermore, the controller 101 performs setting in terms of other information such as a network address required in the printing operation, and stores the information representing the setting into the RAM of the storage device 103. Thus, the setting in terms of the printer to which the printing data is output is automatically performed on the basis of the paper name selected by the user.

The controller 101 adds paper designation data indicating that the selected paper name is "Plan" to the printing data, and transmits it to the controller 202 via the interfaces 102 and 202. The controller 201 temporarily stores the received printing data including the paper selection data into the RAM of the storage device 203. The controller 201 then reads the paper designation data from the RAM of the storage device 203. In this specific example, because "Plan" is designated, paper is fed from the upper cassette of the paper feeder 205 of the printer 2 shown in FIG. 3 and printing is performed in accordance with the received printing data (step 25).

The features of the present embodiment are described in further detail below with reference to the flowcharts shown in FIGS. 13–15.

That is, the present embodiment of the invention provides a printing operation controlling method of controlling the operation of transferring printing information by communicating via a predetermined communication medium with a plurality of printing apparatus each having a paper feeding slot to which a paper name may be assigned, and a storage medium on which a program readable by a computer is stored, the computer being responsible for controlling the operation of transferring printing information by communicating via a predetermined communication medium with a plurality of printing apparatus each having a paper feeding slot to which a paper name may be assigned, the method or program comprising: a first displaying step (first half of step 1 shown in FIG. 14) in which a printing operation control screen (refer to FIG. 10) is displayed on a display device (104), the printing operation control screen including a paper name selection box used to select a paper name; an acquisition step (steps 2 and 3 in FIG. 13) in which in response to a print request from an application program, information about available resources of the printing apparatus is examined and acquired; a first generation step (step 9 in FIG. 13) in which a paper name information table is generated by analyzing the acquired information about resources of each printing apparatus; a second generation step (step 12 in FIG. 14) in which a paper name list to be displayed on the printing operation control screen is generated in accordance with the generated paper name information table; a second display step (step 14 in FIG. 14) in which a list of selectable paper names generated according to the paper name list is displayed on the printing operation control screen in response to indication of the paper name selection box displayed on the printing operation control screen; and a setting step (steps 16–24 in FIG. 15) in which a printing apparatus assigned the desired paper name selected from the list of selectable paper names is retrieved from the paper name information table, and the retrieved printing apparatus is set as the designation to which the printing information is output. This technique makes it possible to build a networked printing system having the paper name designation capability in which it is possible to perform a printing operation on desired paper using a printer in which the desired paper is available simply by designating a desired paper name in a similar manner to that employed in the conventional paper name designation technique, without having to know which paper name is assigned to which printer on the network.

Furthermore, the present embodiment also provides a printing operation controlling method of controlling the operation of transferring printing information by communicating via a predetermined communication medium with a plurality of printing apparatus each having a paper feeding slot to which a paper name may be assigned, and a storage medium on which a program readable by a computer is stored, the computer being responsible for controlling the operation of transferring printing information by communicating via a predetermined communication medium with a plurality of printing apparatus each having a paper feeding slot to which a paper name may be assigned, the method or program comprising: a judgment step (step 2 in FIG. 13) in which, in response to a print request from an application program, a judgment is made as to whether there is an available printing apparatus connected to the predetermined communication medium; a first storage step (step 3 in FIG. 13) in which the network information about the available printing apparatus obtained in the judgment step is stored in a memory; a setting step (step 5 in FIG. 13) in which the network information stored in the memory is analyzed and the number of printing apparatus with the paper name designation capability to be examined is set; an examination step (step 8 in FIG. 13) in which an examination is made on as many printing apparatus as the number set in the setting step as to whether each the printing apparatus has the capability of selecting a paper feeding slot in accordance with a paper name; and a second storage step (step 9 in FIG. 13) in which if the examination step concludes that the printing apparatus has the capability of selecting a paper feeding slot in accordance with a paper name, the paper name assigned to each paper feeding slot is acquired and stored in the memory. This technique makes it possible to automatically acquire, from each available printing apparatus, the paper names to be displayed on the printing operation control screen so as to obtain updated paper names.

Furthermore, the present embodiment also provides a printing operation controlling method of controlling the operation of transferring printing information by communicating via a predetermined communication medium with a plurality of printing apparatus each having a paper feeding slot to which a paper name may be assigned, and a storage medium on which a program readable by a computer is stored, the computer being responsible for controlling the operation of transferring printing information by communicating via a predetermined communication medium with a plurality of printing apparatus each having a paper feeding slot to which a paper name may be assigned, the method or program comprising: a judgment step (step 11 in FIG. 14) in which a judgment is made as to whether the data stored in a memory includes a paper name acquired from a printing apparatus having the capability of selecting a paper feeding slot according to a paper name; a generation step (step 12 in FIG. 14) in which if the judgment step concludes that the paper name is included in the data stored in the memory, the memory is searched to generate a paper name list to be displayed in the paper name selection box of the printing operation control screen displayed on a display device; and a displaying step (step 14 in FIG. 14) in which a current paper name is displayed in the paper name selection box in accordance with the generated paper name list. This technique makes it possible to automatically set the paper name to be displayed as the current paper name.

Still furthermore, the present embodiment of the invention provides a printing operation controlling method of controlling the operation of transferring printing information by communicating via a predetermined communication medium with a plurality of printing apparatus each having a paper feeding slot to which a paper name may be assigned, the method comprising: a first judgment step (step 16 in FIG. 15) in which a judgment is made as to the selection status of the paper name selection box of the printing operation control screen displayed on a display device; a displaying step (step 17 in FIG. 15) in which if the first judgment step concludes that the paper name selection box of the printing operation control screen displayed on the display device is selected, a paper name list is displayed on the printing operation control screen of the display device in accordance with the paper name list stored in a memory; a second judgment step (step 18 in FIG. 15) in which a judgment is made as to whether a paper name different from the current paper name is selected from the displayed paper name list; a first setting step (step 19 in FIG. 15) in which if the second judgment step concludes that a paper name different from the current paper name is selected from the displayed paper name list, the selected paper name is set as the current paper name; a third judgment step (steps 21 and 22 in FIG. 15) in which a judgment is made as to whether a print start command or a print cancel command is issued; a second setting step (step 24 in FIG. 15) in which if the third judgment step concludes that a print start command has been issued, the destination to which printing information is output is set by referring to the paper name information stored in the memory corresponding to the current paper name; and a transmission step (step 25 in FIG. 15) in which the printing information is transmitted to the printing apparatus set as the output destination in the second setting step. Thus it is possible to automatically transmit printing data to a printer corresponding to a selected paper name simply by selecting a desired paper name from the paper name list displayed on the printing operation control screen without having to have knowledge about networked printers.

Second Embodiment

Although in the above-described embodiment, the printers 2–5 connected to the network all serve as networked computers and are capable of communicating with the host computer 1, the present invention may also be applied to a printing system in which a local printer is connected in an one-to-one fashion via for example an I/F cable to a data processing apparatus such as a server so that another host computer can share the printer as a networked printer, as described below in a second embodiment.

Figure 16:
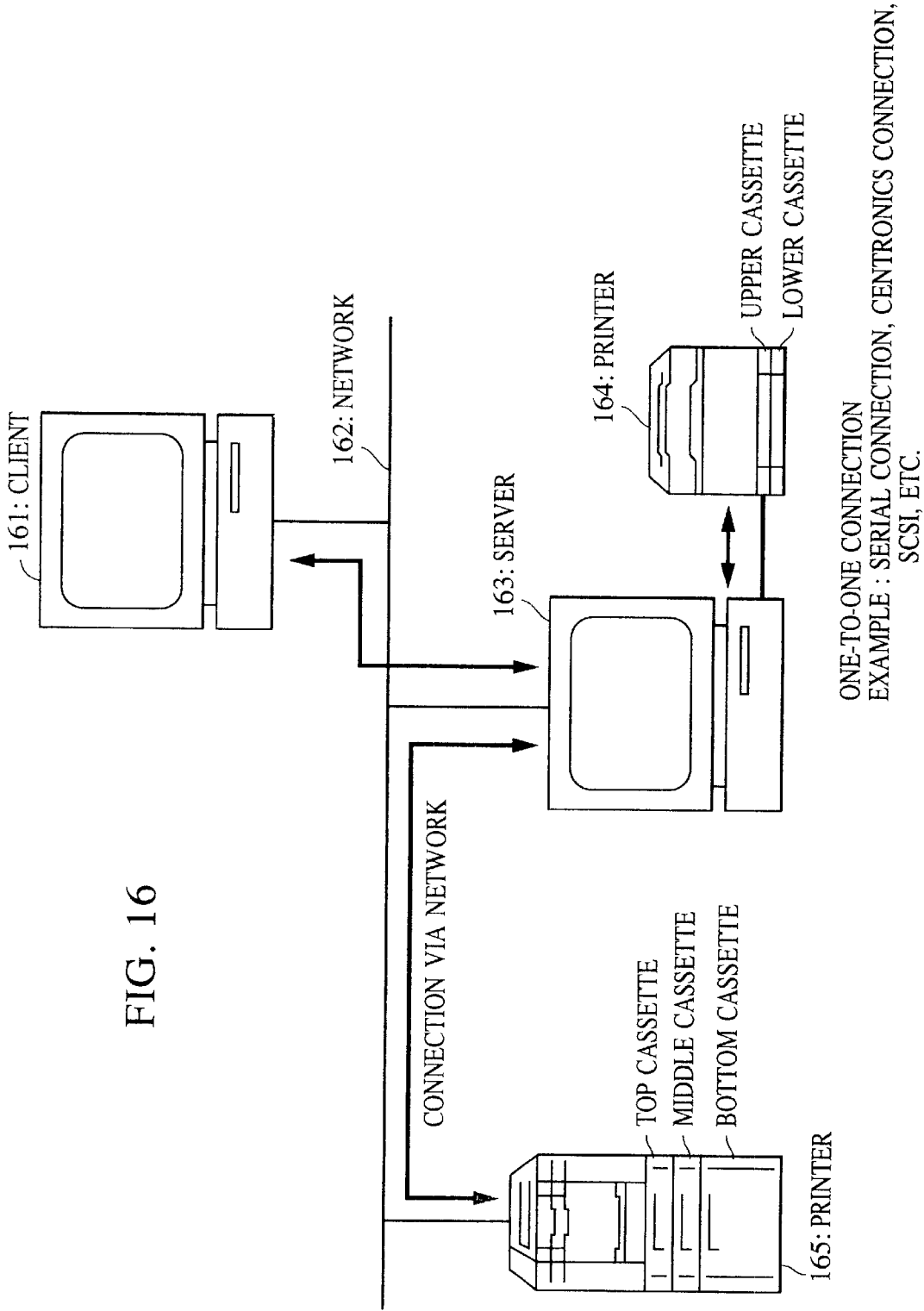
FIG. 16 is a block diagram illustrating a printing system including a printing operation controller according to a second embodiment of the invention.

FIG. 16 is a block diagram illustrating a printing system including a printing operation controller according to a second embodiment of the invention.

In this second embodiment, as opposed to the first embodiment described above, the printing system includes a printer directly connected to a network so that a host computer can communicate indirectly with the printer.

In FIG. 16, reference numeral 161 denotes a personal computer serving as a client. 162 denotes a network such as Ethernet. A server 163 is connected via an I/F cable to a printer 164 serving as a local printer. The printer 164 is designated by the server 163 as a shared printer.

A printer 165 serves as a networked printer capable of communicating with the client 161 and the server 163 via the network 162.

In the first embodiment described above with reference to FIG. 1, printers are connected directly to the network so that the host computer can communicate with the printers via the network. In this second embodiment, as opposed to the first embodiment, the host computer (server 163) connected to the network controls both the printer 165 directly connected to the network 162 and the printer 164 connected in an one-to-one fashion to the server 163 (via a serial interface, a Centronics interface, or a SCSI interface). The configuration of this second embodiment is different from that of the first embodiment in the following points.

In the printing system according to the second embodiment, the server 163 includes a program module which makes it possible to accept a request from the client 161 (steps 2 and 8 in FIG. 13) and respond to it. When a request is received from the client 161, this program module acquires required information from a printer (printer 165 or 164) and returns the information to the client 161. This makes it possible to apply the present invention to a networked printing system in a wide variety of forms.

The program module loaded on the server 163 may periodically acquire information about the printers 164 and 165 and stores it so that when a request from the client 161 is received the stored information can be supplied to the client without having to acquire the information from the printers.

This allows the client 161 to have a quicker response.

Third Embodiment

In the first and second embodiments described above, the status of a printer which does not have the paper name designation capability is not reflected in the printer selection process. However, the present invention may also be applied in an advantageous manner to a printing system including such a printer which does not have the paper name designation capability as disclosed here in a third embodiment.

In the first embodiment described above with reference to FIG. 1, although the printer is connected to the network 6, the printer 5 cannot take advantage of the present invention because it does not have the paper name designation capability. Such a problem can be solved by modifying the second embodiment as follows.

That is, a function is added to the program module of the server 163 of the second embodiment so that the program module becomes capable of registering and storing, in a memory resource (such as a RAM provided in the server), the information about logical and physical attributes of a printer which does not have the paper name designation capability.

More specifically, in the printing system shown in FIG. 16, if the printer 165 does not have the paper name designation capability, the server 163 registers and stores information indicating, for example, that a paper name "Leaflet" is assigned to the top cassette, "Advertisement" to the middle cassette, and "Cover" to the bottom cassette.

When an information acquisition request is received from the client 161, the server 163 returns the stored information (indicating that the paper name "Leaflet" is assigned to the top cassette, "Advertisement" to the middle cassette, and "Cover" to the bottom cassette).

Thus, the paper names assigned to the printer 165 are also displayed in the paper name selection box on the print dialog screen W displayed on the display device of the client 161 so that these paper names can also be selected as paper names assigned to other printers.

If the server 163 receives printing data together with paper name designation data designating, for example, "Leaflet" from the client 161, the program module of the server 163 interprets the paper name "Leaflet" as the "top cassette".

In turn, the server 163 transmits to the printer 165 the printing data together with physical paper feeding slot designation data designating, in this particular example, "top cassette". As described above, the present embodiment of the invention makes it possible that even when a printer itself does not have the paper name designation capability, the printing system including such a printer can have the paper name designation capability according to the present invention. This allows a realization of a printing system which is more convenient for users and which has improved compatibility.

Fourth Embodiment

In the embodiments described above, different printers are assigned different paper names. However, in some printing systems, the same paper name is assigned to two or more different printers. In this fourth embodiment, the present invention is applied to such a printing system in which the same paper name is assigned to different printers connected to a network.

In the fourth embodiment, step 19 shown in the flowchart of FIG. 15 is modified so as to improve the utility.

In FIG. 1, when the same paper name, for example, "Plan" is assigned in a competitive fashion to the upper cassette of the printer 3 and also to the upper cassette of the printer 4, step 19 is modified such that when the same paper name is assigned to a plurality of printers, printer data is analyzed and if the printer data includes only monochrome data then the paper name corresponding to a monochrome printer is employed as the current paper name.

On the other hand, if the printing data includes color data, then the paper name corresponding to a color printer is employed as the current paper name.

That is, when the printing data output from the host computer 1 includes only monochrome data, the printer 3 is employed, while the printer 4 is employed when the printing data includes color data.

This allows the monochrome printer and the color printer to be automatically switched depending on the received printing data. Thus it becomes possible to print in a more efficient and economical fashion.

Step 19 may also be modified as follows. That is, when the same paper name is assigned to a plurality of printers, the printing speed of these printers is examined (not only the processing speed of the engine but also the availability may be examined) and the paper name corresponding to the printer having the highest printing speed is employed as the current paper name.

For example, when printing data together with paper name designation data designating "Plan" is output from the host computer 1, if the printer 3 is determined to have a higher printing speed than the printer 4, printing is performed using the printer 3. This makes it possible to print at a higher speed in a more efficient manner.

Still alternatively, step 19 may be modified as follows. When the same printer name is assigned to a plurality of printers, the number of sheets remaining in the paper feeding slots of the respective printers is examined, and the paper name corresponding to a printer having the greatest number of remaining sheets is employed as the current paper name.

For example, when printing data with paper name designation data designating "Plan" is output from the host computer, if the printer 3 is determined to have a greater number of remaining sheets than the printer 4, then printing is performed using the printer 3.

This prevents a printer from running out paper during a printing operation, and thus it becomes possible to print in a more efficient manner.

The features of the present embodiment are described in further detail below.

That is, the present embodiment provides a printing operation control apparatus comprising: designation means for designating a selection rule of selecting a printing apparatus (on the basis of the number of remaining sheets, the color mode (monochrome/color), the processing speed, etc.) from a plurality of printing apparatus assigned the same paper name in a competitive fashion (the designation is performed by the controller 101 by executing the control program stored in the memory resource of the storage device 103 (the control program may also be supplied from the storage medium 106 which will be described later) in accordance with a command input via the input device 107); judgment means for judging whether a paper name is a competitive paper name assigned to a plurality of printing apparatus in a competitive fashion (the judgment is performed by the controller 101 by executing the control program stored in the memory resource of the storage device 103 (the control program may also be supplied from the storage medium 106 which will be described later)); and determination means that, when the judgment means judges that the selected paper name is a competitive paper name, determines a printing apparatus which should be set by the setting means as the destination to which the printing information is output, in accordance with the selection rule designated by the designation means. (the determination is made by the controller 101 by executing the control program stored in the memory resource of the storage device 103 (the control program may also be supplied from the storage medium 106 which will be described later)). This feature makes it possible to designate an optimum printer satisfying conditions desired by a user as an output destination even in a networked printing system including a plurality of printers assigned the same paper name. That is, printing information is output using the optimum printer and thus printing is performed in a highly efficient manner without performing an useless operation.

In this embodiment of the invention, the plurality of printers in the system may include a printer connected in an one-to-one fashion to a particular data processing apparatus (refer to the printing system shown in FIG. 16). Thus it is possible to realize a printing system having the paper name designation capability even in a networked printing system including a local printer.

Fifth Embodiment

A fifth embodiment of the invention is described below with reference to figures.

Figure 17:
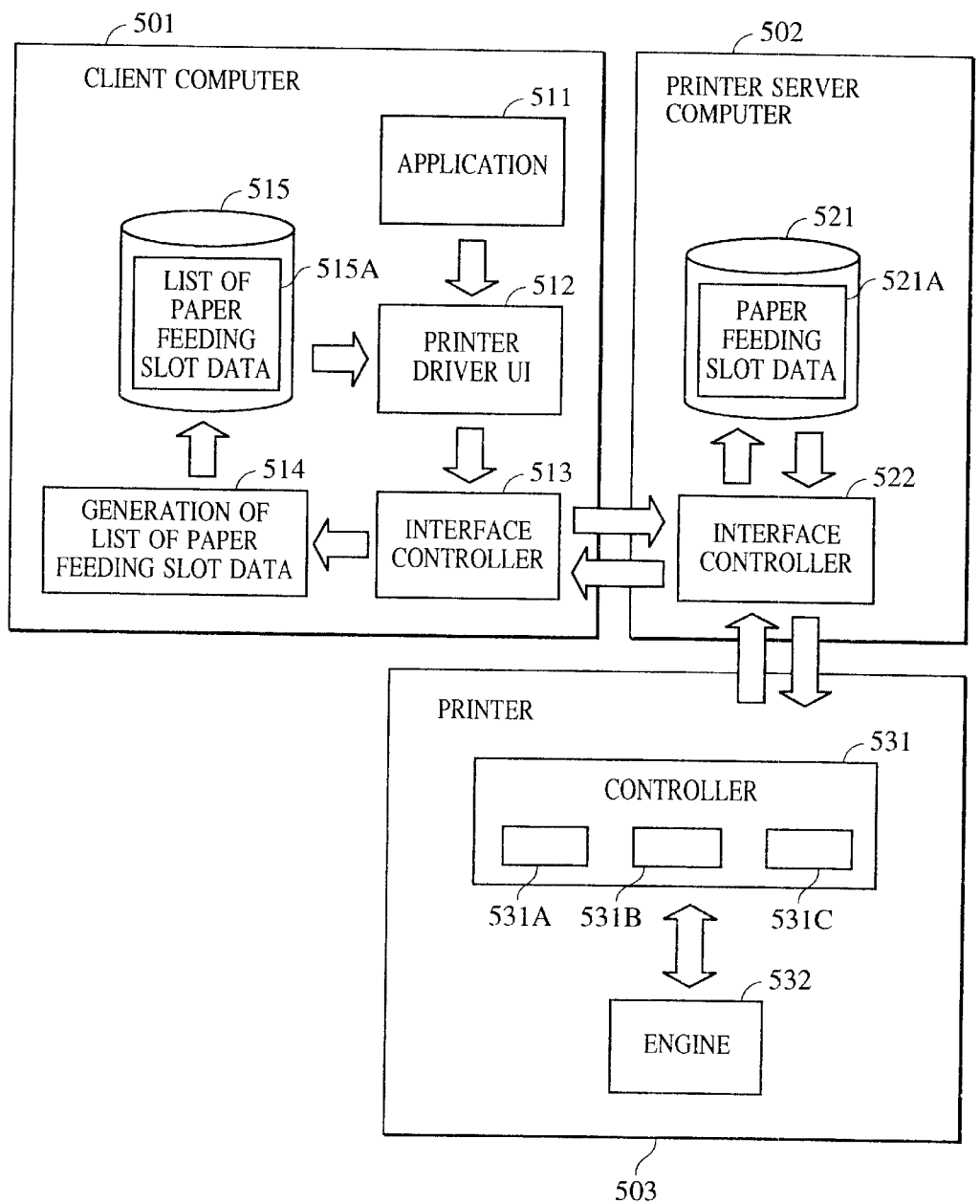
FIG. 17 is a block diagram illustrating a printing system including a printing operation controller according to a fifth embodiment of the invention.

FIG. 17 is a block diagram illustrating a printing system including a printing operation controller according to the fifth embodiment of the invention. This printing system is built as a networked printing system including a data processing apparatus, a printer server computer, a printer, and various modules.

In FIG. 17, a client computer 501 transmits printing information consisting of printing data and control codes to a printer server computer 502. The printer server computer 502 transmits printing information consisting of printing data and control codes to a printer 503.

The client computer 501, the printer server computer 502, and the printer 503 communicate with one another in a bidirectional fashion during various operations such as issuing a command to the printer 503, receiving a request for acquisition of paper feeding slot attribute data, and acquiring paper feeding slot attribute data.

The printer 503 includes a printing mechanism (engine 532) for forming a desired permanent visible image on recording paper, a controller (531) for controlling various operations over the whole printer, a printer controller for controlling the printing mechanism, and an interface controller for controlling interfacing with the computer.

An application program 511 generates data required by the user. In the case where Windows is employed as the operating system in the host computer 501, the application program 511 includes a GDI (graphical device interface).

A printer driver UI 512 sets various conditions such as an output paper size when the application program 511 performs a printing operation. When information about the capabilities of the printer 503 is acquired from the printer 503 and displayed on the display device, the printer driver UI 512 generates a control code required in the operation of acquiring the information from the printer 503.

An interface controller 513 controls interfacing with the printer server computer 502. In response to a request from the user, a paper feeding slot data list generation unit 514 acquires the paper feeding slot data from the storage medium 521 provided in the printer server computer 502, and produces a paper feeding slot data list 515A. A storage medium 515 stores the paper feeding slot data list 515A produced by the paper feeding slot data list generation unit 514.

A hard disk, MO, or other memory media may be employed as the storage medium 515.

The printer driver UI 512 refers to the generated paper feeding slot data list 515A and displays the result on the display device so that the user can select a desired paper feeding slot.

In the printer server computer 502, an interface controller 522 controls interfacing with the printer 503. More specifically, the interface controller 522 controls the operation of transmitting printing information consisting of printing data and control codes to the printer 503 and also controls the operation of receiving information from the printer 503.

In particular, the interface controller 522 serves to store the paper feeding slot data 521A acquired from the printer 503 onto the storage medium (paper feeding slot data storage device 521).

In the printer 503, a controller 531 includes a control unit 531A responsible for the control over the whole printer, a printer controller 531B for controlling a printing mechanism (engine 532), and an interface controller 531C for controlling interfacing with the host computer. The controller 531 serves to transmit paper feeding slot data acquired from the engine 532 to the printer server computer 502.

The engine 532 includes a printing mechanism for forming a permanent visible image on recording paper. In response to a paper feeding slot data acquisition request from the controller 531, the engine 532 outputs the paper feeding slot data stored therein to the printer server computer via the controller 531. The paper feeding slot data may include paper name data and paper attribute data.

Referring now to the flowchart shown in FIG. 18, the operation of acquiring printer resource information in the printing system according to the present invention will be described below.

Figure 18:
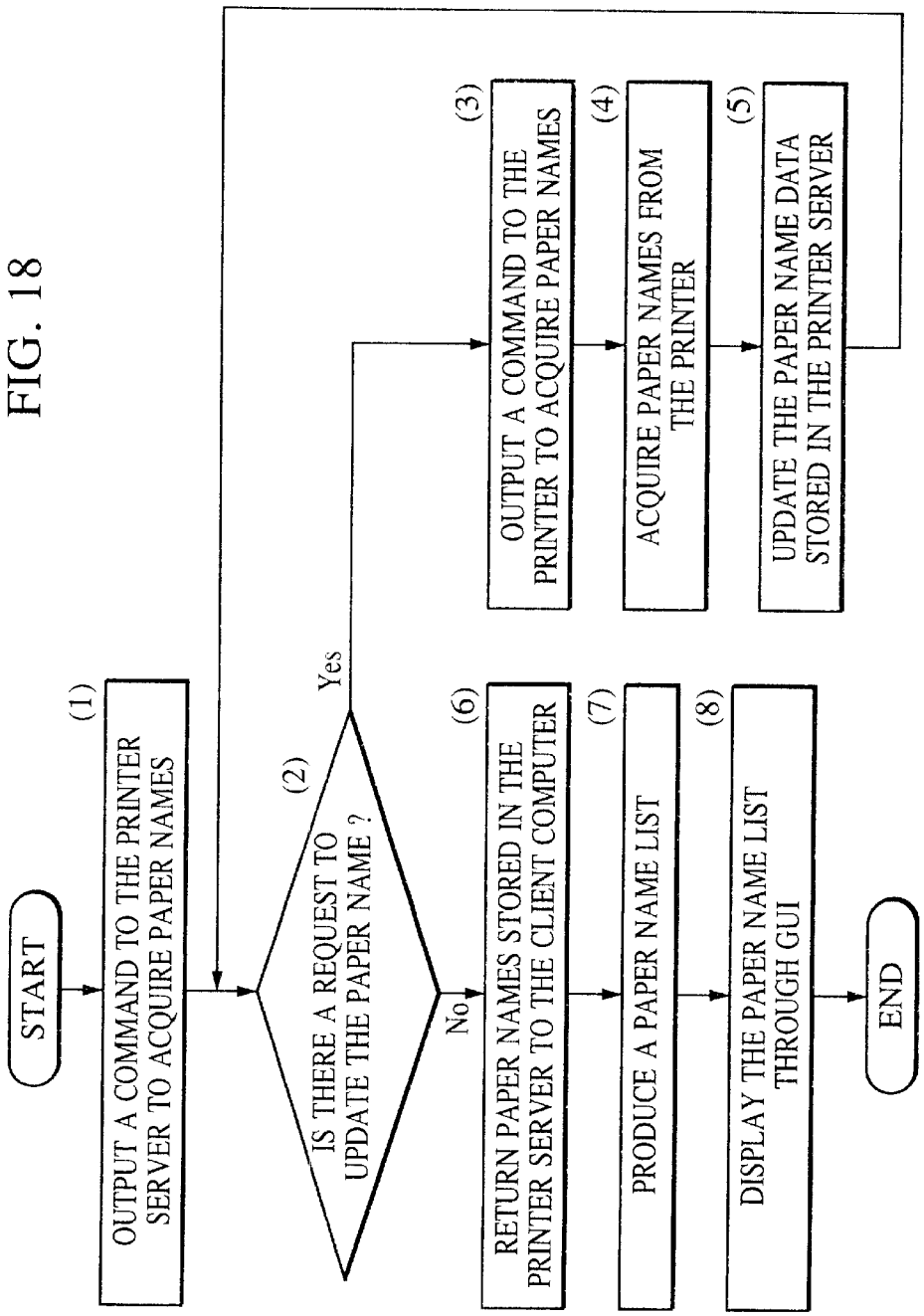
FIG. 18 is a flowchart illustrating an example of a data processing procedure performed by a printing system according to the present invention.

The flowchart shown in FIG. 18 illustrates an example of data processing procedure performed in the printing system according to the present invention, for the case where in response to a request issued by a user operating the client computer 501 shown in FIG. 17, paper feeding slot data is acquired from the printer 503 via the printer server computer 502. The paper feeding slot data obtained herein is used by the client computer 501 to produce a paper feeding slot data list 515A such as a paper name list or a paper attribute list. Numerals (1)–(8) in the flowchart describe step numbers.

If the client computer 501 needs to acquire paper feeding slot data in response to a request issued by a user, the client computer 501 transmits, in step 1, a paper feeding slot data acquisition command to the printer server computer 502 thereby requesting acquisition of the paper feeding slot data stored in the printer server computer 502.

In step 2, on receipt of the paper feeding slot data acquisition command from the client computer 501, the printer server computer 502 determines whether any change has occurred in the paper feeding slot data associated with the printer 503.

The determination as to whether there is a paper feeding slot data updating request in step 2 may be performed by directly inquiring of the printer 503. Alternatively, the printer 503 may notify the printer server computer 502 that there occurs an change in the paper feeding slot data whenever such a change occurs and a history may be produced whenever such a notification is received. Still alternatively, the printer server computer 502 may inquire of the printer 503 at fixed time intervals and the obtained information may be stored in the printer server computer 502. Any other technique may also be employed to improve the performance.

If it is determined in step 2 that there is a page feeding slot data updating request, the process goes to step 3 and a paper feeding slot data acquisition command is issued to the printer 503. On receipt of the paper feeding slot data acquisition command, the printer 503 transmits the paper feeding slot data to the printer server computer 502.

In the above process, the printer server computer 502 may acquire the paper feeding slot data from the printer 503 by inquiring of the printer 503 at fixed time intervals. Alternatively, an interfacing signal responsible for the interfacing operation between the printer server computer 502 and the printer 503 may be generated in response to a request from the printer 503. Any other proper technique may also be employed.

If the printer server computer 502 acquires, in step 4, the paper feeding slot data from the printer 503, then in the following step 5 the printer server computer 502 updates the contents of the paper feeding slot data stored in the paper feeding slot data storage device 521 provided in the printer server computer 502. The process then returns to step 2. In the case where the printer server 502 controls a plurality of printers connected to a network, different paper feeding slot data storage devices are generally provided for respective printers although all paper feeding slot data may be stored in a single paper feeding slot data storage device.

On the other hand, if it is determined in step 2 that there is no paper feeding slot data updating request, then the process goes to step 6 and the printer server computer 502 transmits the paper feeding slot data 521A stored in the paper feeding slot data storage device 521 to the client computer 501. In step 7, the paper feeding slot data list generation unit of the client computer 501 generates a paper feeding slot data list in accordance with the paper feeding slot data 521A.

Then in step 8, the paper feeding slot data list 515A generated and stored, in step 7, on the storage medium 515 is referred to, and the paper feeding slot data is displayed on the screen (not shown) using a graphical user interface (GUI) provided in, for example, a printer driver so that the user can select a desired paper feeding slot and thus printing is properly performed.

Sixth Embodiment

In the fifth embodiment described above, printing data is output from the client computer 501 and paper feeding slot data is supplied to the client computer 501 via the printer server computer 502. Instead, printing data may also be output from a printer server computer as described below in this sixth embodiment.

Figure 19:
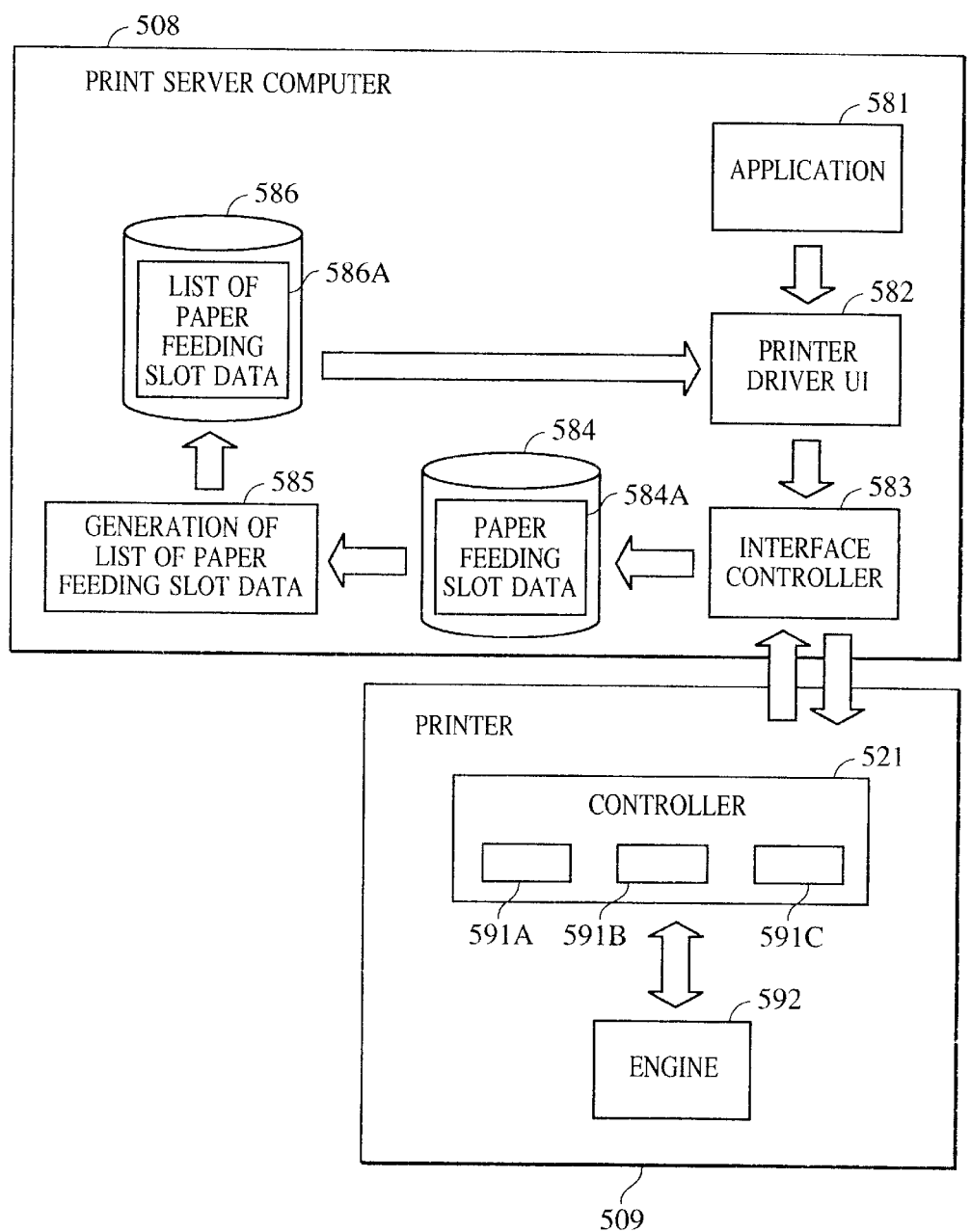
FIG. 19 is a block diagram illustrating a printing system according to a sixth embodiment of the invention.

FIG. 19 is a block diagram illustrating a printing system according to the sixth embodiment of the invention. In this sixth embodiment, the printing system includes a printer server computer, a module, and a printer.

In FIG. 19, reference numeral 508 denotes the printer server computer which executes a printing operation. The printer server computer 508 transmits printing information consisting of printing data and control codes to a printer 509. The printer server computer 508 and the printer 509 perform bidirectional communications with each other during various operations such as issuing a command to the printer 509, receiving a request for acquisition of paper feeding slot attribute data, and acquiring paper feeding slot attribute data.

The printer 509 includes a printing mechanism (engine 592) for forming a desired permanent visible image on recording paper, a control unit 591A responsible for the control over the whole printer, a printer controller 591B for controlling the printing mechanism, and an interface controller 591C for controlling interfacing with the computer.

In the printer server computer 508, an application program 581 generates data required by the user. In the case where Windows (trade name) is employed as the operating system in the printer server computer 508, the application program 581 includes a GDI.

A printer driver UI 582 sets various conditions such as an output paper size when the application program 581 performs a printing operation.

When information about the capabilities of the printer 509 is acquired from the printer 509 and displayed on the display device, the printer driver UI 582 generates a control code required in the operation of acquiring the information from the printer 509.

An interface controller 583 controls interfacing with the printer 509. When a paper feeding slot data acquisition request is issued, the interface controller 583 acquires paper feeding slot data from the printer 509 and stores it on a storage medium 584.

A hard disk, MO, or other memory media may be employed as the storage medium 584.

A paper feeding slot data list generation unit 585 acquires the paper feeding slot data from the paper feeding slot data storage device 584, and produces a paper feeding slot data list 586A. A storage medium 586 stores the paper feeding slot data list 586A produced by the paper feeding slot data list generation unit 585. A printer driver UI 582 refers to the generated paper feeding slot data list 586A and displays the result on a display device so that the user can select a desired paper feeding slot.

In the printer 509, a controller 591 includes a control unit 591A responsible for the control over the whole printer, a printer controller 591B for controlling the printing mechanism, and an interface controller 591C for controlling interfacing with the printer server computer. The controller 591 serves to transmit paper feeding slot data acquired from an engine 592 to the printer server computer 508.

The engine 592 includes a printing mechanism for forming a permanent visible image on recording paper. In response to a paper feeding slot data acquisition request from the controller 591, the engine 592 outputs the paper feeding slot data stored therein to the printer server computer 508 via the controller 591. The paper feeding slot data may include paper name data and paper attribute data.

Referring now to the flowchart shown in FIG. 20, the operation of acquiring printer resource information in the printing system according to the present invention is described below.

Figure 20:
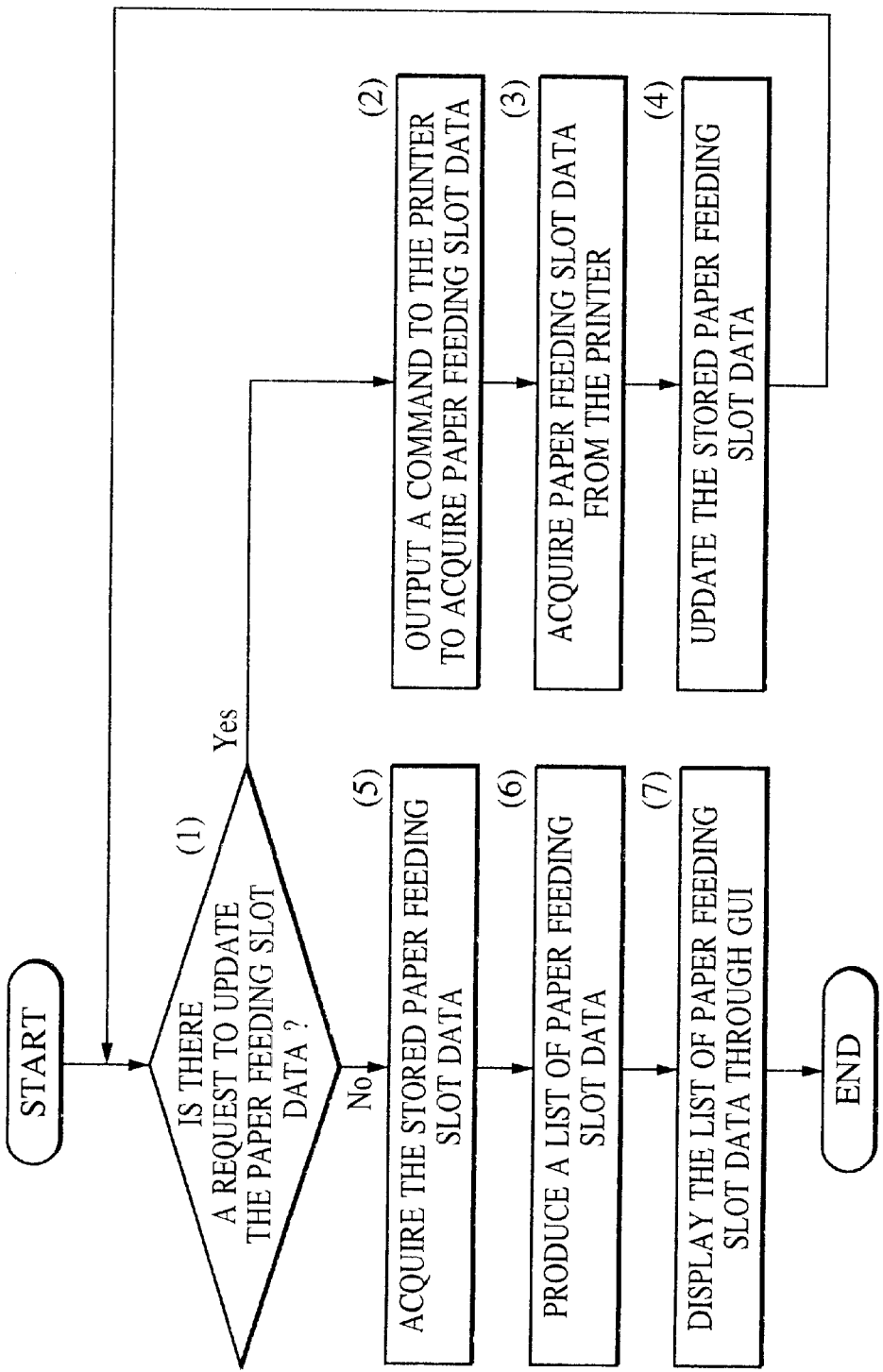
FIG. 20 is a flowchart illustrating an example of a data processing procedure performed by a printing system according to the present invention.

The flowchart shown in FIG. 20 illustrates an example of data processing procedure performed in the printing system according to the present invention, for the case where in response to a request issued by a user operating the printer server computer 508 shown in FIG. 19, paper feeding slot data is acquired from the printer 509. The paper feeding slot data obtained herein is used by the printer server computer 508 to produce a paper feeding slot data list such as a paper name list or a paper attribute list. Numerals (1)–(7) in the flowchart describe step numbers.

If the printer server computer 508 needs to acquire paper feeding slot data in response to a request issued by a user, it is determined in step 1 whether any change has occurred in the paper feeding slot data associated with the printer 509. The determination as to whether there is a paper feeding slot data updating request in step 1 may be performed by directly inquiring of the printer 509. Alternatively, the printer 509 may notify the printer server computer 508 that there occurs an change in the paper feeding slot data whenever such a change occurs and a history may be produced whenever such a notification is received. Still alternatively, the printer server computer 508 may inquire of the printer 509 at fixed time intervals and the obtained information may be stored in the printer server computer 508. Any other technique may also be employed to improve the performance.

If it is determined in step 1 that there is a paper feeding slot data updating request, the process goes to step 2 and a paper feeding slot data acquisition command is issued to the printer 509. On receipt of the paper feeding slot data acquisition command, the printer 509 transmits the paper feeding slot data to the printer server computer 508.

In the above process, the printer server computer 508 may acquire the paper feeding slot data from the printer 509 by inquiring of the printer 509 at fixed time intervals. Alternatively, an interfacing signal responsible for the interfacing operation between the printer server computer 508 and the printer 509 may be generated in response to a request from the printer 509. Any other proper technique may also be employed.

If the printer server computer 508 acquires calibration data (paper feeding slot data) from the printer 509 in step 3, then in the following step 4 the printer server computer 508 updates the contents of the paper feeding slot data storage device (the paper feeding slot data 584 stored on the storage device 584) provided in the printer server computer 508.

On the other hand, if it is determined in step 1 that there is no paper feeding slot data updating request, then the process goes to step 5 and the printer server computer 508 acquires the paper feeding slot data 584A stored on the storage medium 584. Then in step 6, the paper feeding slot data generation unit 585 generates a paper feeding slot data list 586A in accordance with the paper feeding slot data 584A. In the following step 7, the paper feeding slot data list 586A generated in step 6 is referred to, and the selectable paper feeding slot data is displayed on the screen (not shown) using a graphical user interface (GUI) of the printer driver so that the user can select a desired paper feeding slot and thus printing is properly performed. Thus, the process is completed.

Seventh Embodiment

In the fifth and sixth embodiments described above, the printer server computer manages all the paper feeding slot data. Alternatively, paper feeding slot data needed by client computers may be acquired and managed by each client computer as disclosed here in a seventh embodiment.

Although various advantages are obtained if the printer server manages all paper feeding slot data, there are also some disadvantages. For example, in the case of a printing system in which a printer server controls a great number of printers, a great number of storage media are required to entirely store the paper feeding slot data of all printers. Such a problem can be avoided if each client computer stores paper feeding slot data of only those printers used by the respective printers, instead of storing all data. In this case, data may be stored on a reduced number of storage media. Such a printing system may be realized simply by replacing the printer server computer in the sixth embodiment with a client computer.

Eighth Embodiment

In the fifth, sixth, and seventh embodiments described above, the computer stores paper feeding slot data on a storage medium. Alternatively, the paper feeding slot data may also be stored on a storage medium of a printer and the paper feeding slot data stored thereon may be managed, as disclosed herein in an eighth embodiment.

Figure 21:
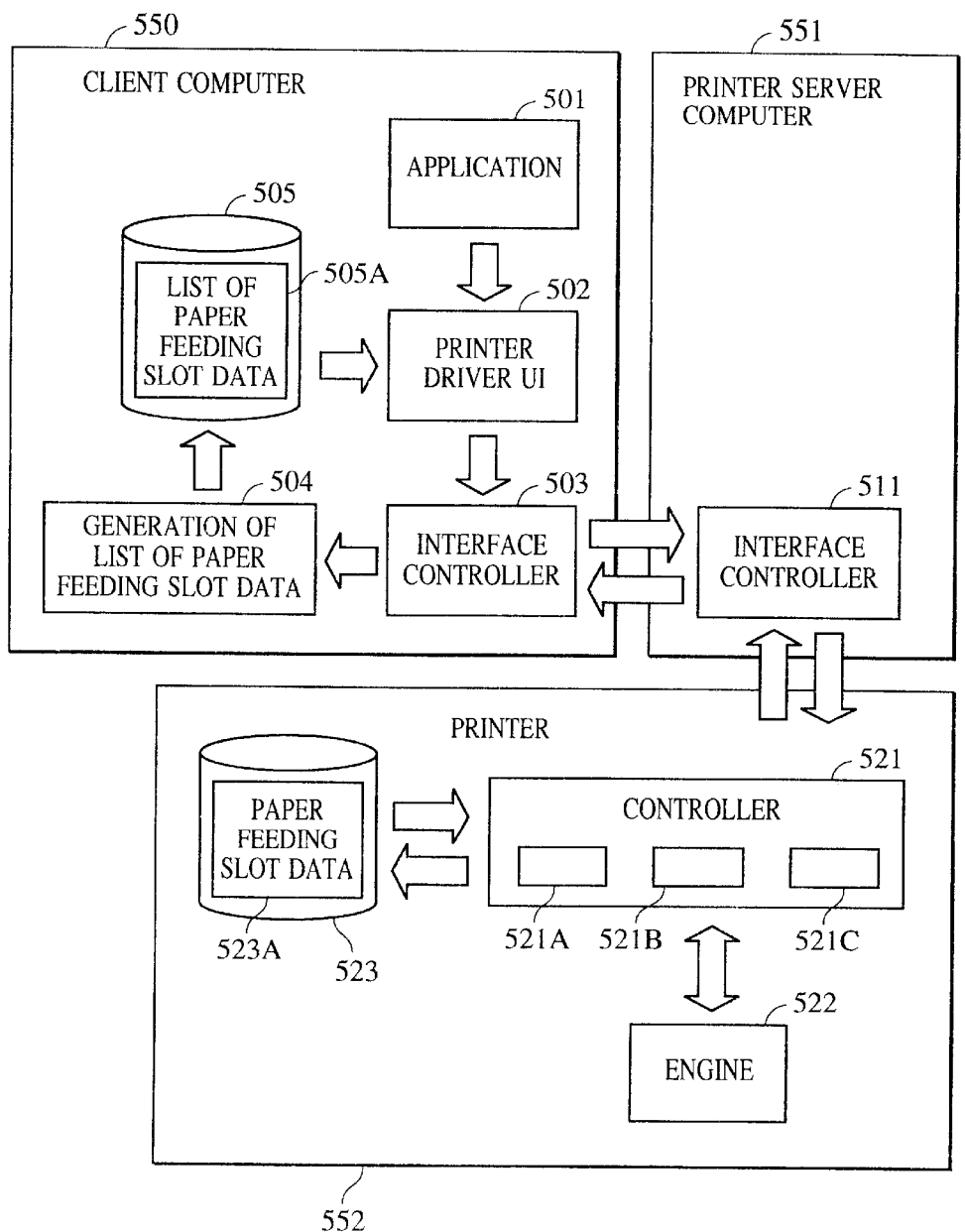
FIG. 21 is a block diagram illustrating a printing system according to an eighth embodiment of the invention.

FIG. 21 is a block diagram illustrating a printing system according to the eighth embodiment of the invention, wherein the printing system includes a printer server computer, a module, and a printer.

In FIG. 21, a client computer 550 transmits printing information consisting of printing data and control codes to a printer server computer 551, in turn the printer server computer 551 transfers the printing information consisting of the printing data and control codes to a printer 552. The client computer 550, the printer server computer 551, and the printer 552 perform bidirectional communications with one another so as to acquire paper feeding slot data from the printer 552.

The printer 552 includes a printing mechanism (engine 522) for forming a desired permanent visible image on recording paper, a control unit 521A responsible for the control over the whole printer, a printer controller 521B for controlling the printing mechanism, and a controller 521 including an interface controller 521C for controlling interfacing with the computer.

In the client computer 550, an application program 501 generates data required by the user. In the case where Windows is employed as the operating system in the host computer 501, the application program 511 includes a GDI. A printer driver UI 502 sets various conditions such as an output paper size when the application program 501 performs a printing operation.

When information about the capabilities of the printer 552 is acquired from the printer 552 and displayed on a display device, the printer driver UI 502 generates a control code required in the operation of acquiring the information from the printer 552. An interface controller 503 controls interfacing with the printer server computer 551.

In response to a request from the user, a paper feeding slot data list generation unit 504 acquires the paper feeding slot data from the printer 552 via the interface controller 503, and produces a paper feeding slot data list in accordance with the acquired data.

A storage medium 505 stores the paper feeding slot data list 505A generated by the paper feeding slot data list generation unit 504.

A hard disk, MO, or other memory media may be employed as the storage medium 505A. The printer driver UI 502 refers to the paper feeding slot data list 505A stored and managed on the storage medium 505, and displays the result on the display device so that the user can select a desired paper feeding slot.

In the printer server computer 551, an interface controller 511 controls interfacing with the printer 552. More specifically, the interface controller 511 controls the operation of transmitting printing information consisting of printing data and control codes to the printer 552 and also controls the operation of receiving information from the printer 552.

In the printer 552, a controller 521 includes a control unit 521A responsible for the control over the whole printer, a printer controller 521B for controlling the printing mechanism, and an interface controller 521C for controlling interfacing with the host computer. The controller 521 serves to store the paper feeding slot data 523A acquired from the engine 522 on storage medium 523 of the printer 552.

The engine 522 includes a printing mechanism for forming a permanent visible image on recording paper. In response to a paper feeding slot data acquisition request, the engine 522 acquires the stored paper feeding slot data and transmits it to the controller 521.

Ninth Embodiment

In the eighth embodiment described above, printing data is output from the client computer 550 and paper feeding slot data is supplied to the client computer 550 via the printer server computer 551. Alternatively, printing data may also be output from a printer server computer 551 as disclosed herein in a ninth embodiment according to the present invention.

In this ninth embodiment, the interface controller of the printer server computer communicates directly with the controller of the printer.

The features of the fifth to eighth embodiments of the present invention are described in further detail below with reference to FIGS. 17, 19, 21 and other figures as required.

That is, in these embodiments of the invention, there is provided a printing apparatus capable of communicating with a data processing apparatus via a predetermined communication medium (including a network and an interface), the printing apparatus comprising: a plurality of paper feeding mechanisms (paper feeding device including a plurality of paper feeding units (not shown) adapted to be attached in an one-on-another fashion to an engine of the printer 503, 509, or 552) for feeding a recording medium; definition means (control panel (not shown) of the printer 503, 509, or 552) for defining paper feeding slot data for each paper feeding slot of each paper feeding mechanism; storage means (nonvolatile memory (such as an NVRAM) of the printer 503, 509, or 552) for storing the paper feeding slot data defined by the definition means for each paper feeding slot; acquisition means (controller 531, 591, or 521 of the printer 503, 509, or 552) for acquiring the paper feeding slot data associated with each paper feeding slot stored in the storage means (for example NVRAM); and notification means (controller 531, 591, or 521) for sending the paper feeding slot data acquired by the acquisition means to the data processing apparatus (printer server computer 502, 508, or 551). This feature makes it possible to acquire the updated paper feeding slot data and supply it to the data processing apparatus as required.

Preferably, the notification means (controller 531, 591, or 521) sends the paper feeding slot data stored in the storage means to the data processing apparatus, in response to an acquisition request from the data processing apparatus (client computer 501 or 550 or printer server computer 551) so that the updated paper feeding slot data is acquired and supplied to the data processing apparatus as required.

Furthermore, there is also provided a data processing apparatus capable of communicating with a printing apparatus via a predetermined communication medium (including a network and an interface), the data processing apparatus comprising: issuing means (the interface controller 522 of the printer server computer 508) for issuing an acquisition request to the printing apparatus to acquire the paper feeding slot data defined for the paper feeding mechanism of the printing apparatus; and control means (printer driver UI 582) for analyzing the paper feeding slot data transferred from the printing apparatus (printer 583) in response to the request for acquisition of the paper feeding slot data issued by the issuing means, and displaying paper resource information on a display device (not shown). This feature makes it possible to acquire the updated paper feeding slot data defined for the paper feeding mechanism of the printer and display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded.

The paper resource information may include paper name data and paper attribute data defined for each paper feeding slot, so that it is possible to display the paper names defined for the respective paper feeding slots and also the paper attributes (type of recording medium (transparency film, cut sheet), color, thickness, size, etc.) thereby ensuring that the user can easily select a paper feeding slot in which a desired recording medium is loaded.

Furthermore, there is also provided a printing system including a data processing apparatus (printer server computer 508) and a printing apparatus (printer 509) capable of communicating with each other via a predetermined communication medium (including a network and an interface), the printing apparatus (printer 509) comprising: a plurality of paper feeding mechanisms (paper feeding device including a plurality of paper feeding units (not shown) adapted to be attached in an one-on-another fashion to an engine of the printer 509) for feeding a recording medium; definition means (control panel of the printer 509) for defining paper feeding slot data for each paper feeding slot of each paper feeding mechanism; storage means (nonvolatile memory such as an NVRAM (not shown)) for storing the paper feeding slot data defined by the definition means for each paper feeding slot; acquisition means for acquiring the paper feeding slot data associated with each paper feeding slot stored in the storage means (the data is acquired by the controller 591 from the engine 592); notification means for sending each paper feeding slot data acquired by the acquisition means to the data processing apparatus in response to the acquisition request issued by the data processing apparatus (the controller 591 sends the data to the interface controller 583); the data processing apparatus comprising: issuing means for issuing an acquisition request to the printing apparatus to acquire the paper feeding slot data defined for the paper feeding mechanism of the printing apparatus (the interface controller 583 issues the acquisition request to the controller 591); and control means (printer driver UI 582) for analyzing the paper feeding slot data transferred from the printing apparatus in response to the request for acquisition of the paper feeding slot data issued by the issuing means, and displaying paper resource information on a display device (the paper feeding data list generation unit 585 analyzes the paper feeding slot data and generates the paper feeding slot data list). This feature makes it possible for the data processing apparatus used by the user to acquire the updated paper feeding slot data defined for the paper feeding mechanism of the printer and display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded.

Furthermore, there is also provided a printing system including a data processing apparatus (client computer 501 or 550), a printing apparatus (printer 503 or 552), and a printer server (printer server computer 502 or 551), the data processing apparatus being capable of communicating with the printing apparatus via the printer server, the printer apparatus (printer 503 or 552) comprising: a plurality of paper feeding mechanisms for feeding a recording medium; definition means (control panel of the printer 503 or 553) for defining paper feeding slot data for each paper feeding slot of each paper feeding mechanism; storage means (nonvolatile memory (NVRAM) provided in the printer 503 or 552) for storing the paper feeding slot data defined by the definition means for each paper feeding slot; acquisition means for acquiring the paper feeding slot data associated with each paper feeding slot stored in the storage means; (the data is acquired from the controller 531 of the printer 503 or from the engine 532 of the controller 521 of the printer 552); and notification means (controller 531 of the printer 503) for sending the paper feeding slot data acquired by the acquisition means to the printer server in response to the acquisition request issued by the printer server, the printer server comprising: storage means (storage medium 521) for storing the paper feeding slot data received from the printing apparatus; judgment means for judging whether there is an updating request to update the paper feeding slot data stored in the storage means, when the request for acquisition of the paper feeding slot data is issued by the data processing apparatus; (the judgment is made by the interface controller 522); and returning means (interface controller 522) for returning the updated paper feeding slot data to the data processing apparatus, depending on the result of judgment made by the judgment means in terms of whether there is an updating request, the data processing apparatus comprising: issuing means (interface controller 513) for issuing an acquisition request to the printer server to acquire the paper feeding slot data defined for the paper feeding mechanism of the printing apparatus; and control means for analyzing the paper feeding slot data transferred from the printer server in response to the request for acquisition of the paper feeding slot data issued by the issuing means, and displaying paper resource information on a display device. (the data is displayed on the display device (not shown) by the printer driver UI 512). This feature makes it possible for the data processing apparatus used by the user to acquire via the printer server the updated paper feeding slot data defined for the paper feeding mechanism of the printer controlled by the printer server, and manage the acquired paper feeding slot data and furthermore display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded. Furthermore, it also becomes possible to reduce the data traffic in the process of requiring the paper feeding slot data.

Furthermore, there is also provided a printing system including a data processing apparatus and a plurality of printing apparatus, the data processing apparatus being capable of communicating with the plurality of printing apparatus via a predetermined communication medium (including a network and an interface), each printing apparatus comprising: a plurality of paper feeding mechanisms (paper feeding device including a plurality of paper feeding units (not shown) adapted to be attached in an one-on-another fashion to an engine 509 of the printer 509 or other printers (not shown)) for feeding a recording medium; definition means (control panel of the printer 508 or other printers) for defining paper feeding slot data for each paper feeding slot of each paper feeding mechanism; storage means (nonvolatile memory medium such as an NVRAM of the printer 508 or other printers) for storing the paper feeding slot data defined by the definition means for each paper feeding slot; acquisition means for acquiring the paper feeding slot data associated with each paper feeding slot stored in the storage means; (the controller 591 of the printer 508 or the controller of another printer acquires the data from the corresponding engine); and notification means for sending each paper feeding slot data acquired by the acquisition means to the data processing apparatus in response to the acquisition request issued by the data processing apparatus, (the controller 591 of the printer 508 or the controller of another printer sends the data to the interface controller 583); the data processing apparatus comprising: issuing means (interface controller 583 of the printer server computer 509) for issuing an acquisition request to the printing apparatus to acquire the paper feeding slot data defined for the paper feeding mechanism of each printing apparatus; and control means for analyzing the paper feeding slot data transferred from each printing apparatus in response to the request for acquisition of the paper feeding slot data issued by the issuing means, and displaying paper resource information on a display device (the data is displayed on the display device (not shown) by the printer driver UI 512). This feature makes it possible for the data processing apparatus used by the user to acquire the updated paper feeding slot data defined for the paper feeding mechanism of the printer and display the paper resource information on the display device so that the user can make a selection in terms of the paper resources. That is, it becomes possible to build a printing resource environment in which the user can visually see the status of the paper resources of each printer according to the paper feeding slot data and thus the user can easily select a paper feeding slot in which a desired recording medium is loaded.

Furthermore, there is also provided a printing system including a data processing apparatus (client computer 501 or 550), a plurality of printing apparatus (printer 503 and other printers not shown), and a printer server (printer server computer 502 or 551), the data processing apparatus being capable of communicating via the printer server with the plurality of printing apparatus via a predetermined communication medium, each printing apparatus comprising: a plurality of paper feeding mechanisms for feeding a recording medium; definition means (control panel of the printer 503 or 553) for defining paper feeding slot data for each paper feeding slot of each paper feeding mechanism; storage means (NVRAM of the printer 503 or 552) for storing the paper feeding slot data defined by the definition means for each paper feeding slot; acquisition means for acquiring the paper feeding slot data associated with each paper feeding slot stored in the storage means; (the controller 531 of the printer 503 acquires the data from the engine 532); and notification means for sending the paper feeding slot data acquired by the acquisition means to the printer server in response to the acquisition request issued by the printer server, (the controller 531 of the printer 503 sends the data); the printer server (printer server computer 502) comprising: storage means for storing the paper feeding slot data received from each printing apparatus judgment means for judging whether there is an updating request to update the paper feeding slot data stored in the storage means, when the request for acquisition of the paper feeding slot data is issued by the data processing apparatus; (the judgment is made by the interface controller 522); and returning means for returning the updated paper feeding slot data to the data processing apparatus, depending on the result of judgment made by the judgment means in terms of whether there is an updating request, (the returning operation is performed by the interface controller 522); the data processing apparatus (client computer 501) comprising: issuing means for issuing an acquisition request to the printer server to acquire the paper feeding slot data defined for the paper feeding mechanism of each printing apparatus; (the issuing process is performed by the interface controller 513); and control means for analyzing the paper feeding slot data transferred from the printer server in response to the request for acquisition of the paper feeding slot data issued by the issuing means, and displaying paper resource information on a display device (the data is displayed on the display device (not shown) by the printer driver UI 512). This feature makes it possible for the data processing apparatus used by the user to acquire via the printer server the updated paper feeding slot data defined for the paper feeding mechanism of the plurality of printers controlled by the printer server, and manage the acquired paper feeding slot data and furthermore display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded. Furthermore, it also becomes possible to reduce the data traffic in the process of requiring the paper feeding slot data.

The printer server (printer server computer 502) may comprise updating means (interface controller 522) for, when the judgment means judges that there is an updating request, acquiring the newest paper feeding slot data from each printing apparatus and updating the paper feeding slot data stored in the storage means (storage medium 521). Thus the paper feeding slot data is acquired when the paper feeding slot data of each printer is updated. In other words, it is not necessary to acquire the paper feeding slot data unless the paper feeding slot data of some printer is updated. This allows a reduction in the data traffic in the process of acquiring the paper feeding slot data. Furthermore, it becomes possible to immediately display the newest paper feeding slot data on the display device of the data processing apparatus.

The paper resource information may include paper name data and paper attribute data defined for each paper feeding slot, so that it is possible to display the paper names defined for the respective paper feeding slots and also the paper attributes (type of recording medium (transparency film, cut sheet), color, thickness, size, etc.) thereby ensuring that the user can easily select a paper feeding slot in which a desired recording medium is loaded.

Other features are described below with reference to the flowcharts shown in FIGS. 18 and 20.

That is, there is also provided a method of processing data in a printing apparatus capable of communicating with a data processing apparatus via a predetermined communication medium (including a network and an interface) and a storage medium on which a program readable by a computer is stored, the computer being responsible for controlling a printing apparatus capable of communicating with a data processing apparatus via a predetermined communication medium, the program comprising: a definition step (not shown in the figure) in which paper feeding slot data is defined for each paper feeding slot of a plurality of paper feeding mechanisms for feeding a recording medium; a storage step (not shown in the figure) in which the paper feeding slot data defined in the definition step for each paper feeding slot is stored into a memory; an acquisition step (not shown in the figure) in which the paper feeding slot data of each paper feeding slot stored in the storage step is acquired; and a notification step (not shown in the figure) in which the paper feeding slot data acquired in the acquisition step is sent to the data processing apparatus. Thus it is possible to acquire the updated paper feeding slot data and supply it to the data processing apparatus whenever it is required.

Preferably, in the notification step, the paper feeding slot data stored in the storage step is sent to the data processing apparatus in response to an acquisition request from the data processing apparatus so that the updated paper feeding slot data is acquired and supplied to the data processing apparatus as required.

Furthermore, there is also provided a method of processing data in a data processing apparatus capable of communicating with a printing apparatus via a predetermined communication medium (including a network and an interface), and a storage medium on which a program readable by a computer is stored, the computer being responsible for controlling a data processing apparatus capable of communicating with a printing apparatus via a predetermined communication medium, the program comprising: an issuing step (step 3 in FIG. 18 or step 2 in FIG. 20) in which an acquisition request is issued to the printing apparatus to acquire the paper feeding slot data defined for the paper feeding mechanism of the printing apparatus; and a display step (step 8 shown in FIG. 18 or step 7 shown in FIG. 20) in which an analysis is made on the paper feeding slot data transferred from the printing apparatus in response to the request of acquisition of the paper feeding slot data issued in the issuing step, and paper resource information is displayed on a display device. This feature makes it possible to acquire the updated paper feeding slot data defined for the paper feeding mechanism of the printer and display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded.

The paper resource information may include paper name data and paper attribute data defined for each paper feeding slot, so that it is possible to display the paper names defined for the respective paper feeding slots and also the paper attributes (type of recording medium (transparency film, cut sheet), color, thickness, size, etc.) thereby ensuring that the user can easily select a paper feeding slot in which a desired recording medium is loaded.

Furthermore, there is also provided a method of processing data in a printing system including a data processing apparatus and a printing apparatus capable of communicating with each other via a predetermined communication medium (network, interface), and a storage medium on which a program readable by a computer is stored, the computer being responsible for controlling a printing system including a data processing apparatus and a printing apparatus capable of communicating with each other via a predetermined communication medium, the program comprising: a definition step (not shown in the figure) in which paper feeding slot data is defined for each paper feeding slot of a plurality of paper feeding mechanisms for feeding a recording medium; a storage step (not shown in the figure) in which the paper feeding slot data defined in the definition step for each paper feeding slot is stored into a memory; an issuing step (not shown in the figure) in which an acquisition request is issued to the printing apparatus to acquire the paper feeding slot data defined for the paper feeding mechanism of the printing apparatus; an acquisition step (not shown in the figure) in which the paper feeding slot data of each paper feeding slot stored into the memory (nonvolatile storage medium such as an NVRAM of the printer apparatus) in the storage step is acquired; a notification step (step 3 in FIG. 18) in which the paper feeding slot data acquired in the acquisition step is sent to the data processing apparatus, in response to the acquisition request issued in the issuing step; and a displaying step (step 8 in FIG. 18) in which an analysis is made on the paper feeding slot data supplied in the notification step and paper resource information is displayed on a display device. This feature makes it possible for the data processing apparatus used by the user to acquire the updated paper feeding slot data defined for the paper feeding mechanism of the printer and display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded.

Furthermore, there is also provided a method of processing data in a printing system including a data processing apparatus, a printing apparatus, and a printer server, the data processing apparatus being capable of communicating via the printer server with the printing apparatus via a predetermined communication medium, and a storage medium on which a program readable by a computer is stored, the computer being responsible for controlling a printing system including a data processing apparatus, a printing apparatus, and a printer server, the data processing apparatus being capable of communicating via the printer server with the printing apparatus via a predetermined communication medium, the program comprising: a definition step (not shown in the figure) in which paper feeding slot data is defined for each paper feeding slot of a plurality of paper feeding mechanisms for feeding a recording medium; a storage step (not shown in the figure) in which the paper feeding slot data defined in the definition step for each paper feeding slot is stored into a memory (nonvolatile storage medium such as an NVRAM); an acquisition step (not shown in the figure) in which the paper feeding slot data of each paper feeding slot stored into the memory in the storage step is acquired; a notification step (not shown in the figure) in which the paper feeding slot data acquired in the acquisition step is sent to the data processing apparatus in response to the acquisition request issued via the printer server; a storage step (not shown in the figure) in which the paper feeding slot data returned from the printing apparatus is stored into a memory; an issuing step (not shown in the figure) in which an acquisition request is issued to the printer server to acquire the paper feeding slot data defined for the paper feeding mechanism of the printing apparatus; a judgment step (not shown in the figure) in which when the request for acquisition of the paper feeding slot data is issued in the issuing step, a judgment is made as to whether there is an updating request to update the paper feeding slot data stored in the memory in the storage step; a returning step (step 6 in FIG. 18) in which the newest paper feeding slot data is returned to the data processing apparatus via the printer server, depending on the result of the judgment made in the judgment step as to whether there is an updating request; and a display step (step 8 in FIG. 18) in which paper feeding slot data returned in the returning step is analyzed and paper resource information is displayed on a display device provided in the data processing apparatus. This feature makes it possible for the data processing apparatus used by the user to acquire via the printer server the updated paper feeding slot data defined for the paper feeding mechanism of the printer controlled by the printer server, and manage the acquired paper feeding slot data and furthermore display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded. Furthermore, it also becomes possible to reduce the data traffic in the process of requiring the paper feeding slot data.

Furthermore, there is also provided a method of processing data in a printing system including a data processing apparatus and a plurality of printing apparatus, the data processing apparatus being capable of communicating with the plurality of printing apparatus via a predetermined communication medium (including a network and an interface), and a storage medium on which a program readable by a computer is stored, the computer being responsible for controlling a printing system including a data processing apparatus and a plurality of printing apparatus (printers 503, 509, 552 and other printers not shown in the figure), the data processing apparatus being capable of communicating with the plurality of printing apparatus via a predetermined communication medium, the method or program comprising: a definition step (not shown in the figure) in which paper feeding slot data is defined for each paper feeding slot of a plurality of paper feeding mechanisms for feeding a recording medium; a storage step (not shown in the figure) in which the paper feeding slot data defined in the definition step for each paper feeding slot is stored into a memory; an acquisition step (not shown in the figure) in which the paper feeding slot data of each paper feeding slot stored into the memory in the storage step is acquired; an issuing step (step 3 in FIG. 18 or step 3 in FIG. 20) in which an acquisition request is issued to each printing apparatus to acquire the paper feeding slot data defined for the paper feeding mechanism of each printing apparatus; a notification step (step 7 in FIG. 18 or step 6 in FIG. 20) in which the paper feeding slot data of each paper feeding slot acquired in the acquisition step is sent to the data processing apparatus in response to the acquisition request issued in the issuing step; and a display step (step 8 in FIG. 18 or step 7 in FIG. 20) in which the paper feeding slot data supplied in the notification step is analyzed and paper resource information is displayed on a display device of the data processing apparatus. This feature makes it possible for the data processing apparatus used by the user to acquire the updated paper feeding slot data defined for the paper feeding mechanism of the printer and display the paper resource information on the display device so that the user can make a selection in terms of the paper resources. That is, it becomes possible to build a printing resource environment in which the user can visually see the status of the paper resources of each printer according to the paper feeding slot data and thus the user can easily select a paper feeding slot in which a desired recording medium is loaded.

Furthermore, there is also provided a method of processing data in a printing system including a data processing apparatus, a plurality of printing apparatus, and a printer server, the data processing apparatus being capable of communicating via the printer server with the plurality of printing apparatus via a predetermined communication medium (including a network and an interface), and a storage medium on which a program readable by a computer is stored, the computer being responsible for controlling a printing system including a data processing apparatus, a plurality of printing apparatus (printers 503, 509, 552, and other printers not shown in the figure), and a printer server, the data processing apparatus being capable of communicating via the printer server with the plurality of printing apparatus via a predetermined communication medium, the method or program comprising: a definition step (not shown in the figure) in which paper feeding slot data is defined for each paper feeding slot of a plurality of paper feeding mechanisms for feeding a recording medium; a storage step (not shown in the figure) in which the paper feeding slot data defined in the definition step for each paper feeding slot is stored into a memory; an acquisition step (not shown in the figure) in which the paper feeding slot data of each paper feeding slot stored into the memory in the storage step is acquired; a notification step (not shown in the figure) in which the paper feeding slot data acquired in the acquisition step is sent to the data processing apparatus in response to the acquisition request issued via the printer server; a storage step (step 5 in FIG. 18) in which the paper feeding slot data returned from each printing apparatus is stored into a memory; an issuing step (step 1 in FIG. 18) in which an acquisition request is issued to the printer server to acquire the paper feeding slot data defined for the paper feeding mechanism of each printing apparatus; a judgment step (not shown in the figure) in which when the request for acquisition of the paper feeding slot data is issued in the issuing step, a judgment is made as to whether there is an updating request to update the paper feeding slot data stored in the memory in the storage step; a returning step (step 6 in FIG. 18) in which the newest paper feeding slot data is returned to the data processing apparatus via the printer server, depending on the result of the judgment made in the judgment step as to whether there is an updating request; and a display step (step 8 in FIG. 18) in which paper feeding slot data returned in the returning step is analyzed and paper resource information is displayed on a display device provided in the data processing apparatus. This feature makes it possible for the data processing apparatus used by the user to acquire via the printer server the updated paper feeding slot data defined for the paper feeding mechanism of the plurality of printers controlled by the printer server, and manage the acquired paper feeding slot data and furthermore display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded. Furthermore, it also becomes possible to reduce the data traffic in the process of requiring the paper feeding slot data.

Preferably, the printer server comprises updating means for, when the judgment means judges that there is an updating request, acquiring the newest paper feeding slot data from each printing apparatus and updating the paper feeding slot data stored in the storage means. Thus the paper feeding slot data is acquired when the paper feeding slot data of each printer is updated. In other words, it is not necessary to acquire the paper feeding slot data unless the paper feeding slot data of some printer is updated. This allows a reduction in the data traffic in the process of acquiring the paper feeding slot data. Furthermore, it becomes possible to immediately display the newest paper feeding slot data on the display device of the data processing apparatus.

Preferably, the paper resource information includes paper name data and paper attribute data defined for each paper feeding slot, and thus it is possible to display the paper names defined for the respective paper feeding slots and also the paper attributes (type of recording medium (transparency film, cut sheet), color, thickness, size, etc.) thereby ensuring that the user can easily select a paper feeding slot in which a desired recording medium is loaded.

Referring now to the memory map shown in FIG. 22, a data processing program is described below which is stored in a readable fashion on a storage medium and read in the printing system according to the present invention.

FIG. 22 is a schematic representation of a memory map of a storage medium for storing various data processing programs readable by a printing system including a data processing apparatus according to the present invention;

Although not shown in the figures, management information, such as version data or the name of a programmer, associated with programs stored on the storage medium is also stored. Furthermore, information required by the OS on which the program runs, such as an icon indicating the program, may also be stored.

Various data associated with programs may also be stored and managed in the above directory. In some cases, a decompression program for decompressing a compressed program is also stored.

The functions of the present embodiment, shown in FIGS. 13, 14, 15, 18, and 20, may also be implemented by installing a program onto a host computer from an external device and executing it. In this case, information including a program according to the present invention may be supplied to an output device from a storage medium such as a CD-ROM, a flush memory, or an FD, or from an external storage medium via a network.

The objects of the present invention may also be achieved by supplying a storage medium, on which a software program according to any embodiment of the invention is stored, to a system or an apparatus so that a computer (or a CPU or an MPU) provided in the system or the apparatus reads the program codes from the storage medium and executes them.

In this case, the novel functions according to the present invention are realized by the program codes read from the storage medium and thus the storage medium on which the program codes are stored falls within the scope of the present invention.

As for the storage medium on which the program codes are stored, a floppy disk, a hard disk, an optical disk, a magneto-optical disk, a DVD, a CD-ROM, a CR-R, a magnetic tape, a nonvolatile memory card, a ROM, an EEPROM, etc., may be employed.

Instead of simply executing the program codes on the computer, a part of or the whole of the process may also be executed by an OS (operating system) running on the computer in accordance with the program codes thereby realizing the functions according to the present invention. This, technique. also falls within the scope of the invention.

Furthermore, the program codes read from the storage medium may be written into a memory provided on an expansion board inserted into the computer or an expansion unit connected to the computer, and a part of or the whole of process may be executed by a CPU or the like provided on the expansion board or the expansion unit thereby realizing the functions according to the invention. This technique also falls within the scope of the invention.

As can be understood from the above description, the present invention has various advantages. That is, according to an aspect of the present invention, there is provided a printing apparatus capable of communicating with a data processing apparatus via a predetermined communication medium, the printing apparatus comprising: a plurality of paper feeding mechanisms for feeding a recording medium; definition means for defining paper feeding slot data for each paper feeding slot of each paper feeding mechanism; storage means for storing the paper feeding slot data defined by the definition means for each paper feeding slot; acquisition means for acquiring the paper feeding slot data associated with each paper feeding slot stored in the storage means; and notification means for sending the paper feeding slot data acquired by the acquisition means to the data processing apparatus. Thus it is possible to acquire the updated paper feeding slot data and supply it to the data processing apparatus whenever it is required.

Preferably, the notification means sends the paper feeding slot data stored in the storage means to the data processing apparatus, in response to an acquisition request from the data processing apparatus so that the updated paper feeding slot data is acquired and supplied to the data processing apparatus as required.

According to another aspect of the invention, there is provided a data processing apparatus capable of communicating with a printing apparatus via a predetermined communication medium, the data processing apparatus comprising: issuing means for issuing an acquisition request to the printing apparatus to acquire the paper feeding slot data defined for the paper feeding mechanism of the printing apparatus; and control means for analyzing the paper feeding slot data transferred from the printing apparatus in response to the request for acquisition of the paper feeding slot data issued by the issuing means, and displaying paper resource information on a display device. This feature makes it possible to acquire the updated paper feeding slot data defined for the paper feeding mechanism of the printer and display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded.

Preferably, the paper resource information includes paper name data and paper attribute data defined for each paper feeding slot so that it is possible to display the paper names defined for the respective paper feeding slots and also the paper attributes (type of recording medium (transparency film, cut sheet), color, thickness, size, etc.) thereby ensuring that the user can easily select a paper feeding slot in which a desired recording medium is loaded.

According to sill another aspect of the invention, there is provided a printing system including a data processing apparatus and a printing apparatus capable of communicating with each other via a predetermined communication medium, the printing apparatus comprising: a plurality of paper feeding mechanisms for feeding a recording medium; definition means for defining paper feeding slot data for each paper feeding slot of each paper feeding mechanism; storage means for storing the paper feeding slot data defined by the definition means for each paper feeding slot; acquisition means for acquiring the paper feeding slot data associated with each paper feeding slot stored in the storage means; and notification means for sending each paper feeding slot data acquired by the acquisition means to the data processing apparatus in response to the acquisition request issued by the data processing apparatus, the data processing apparatus comprising: issuing means for issuing an acquisition request to the printing apparatus to acquire the paper feeding slot data defined for the paper feeding mechanism of the printing apparatus; and control means for analyzing the paper feeding slot data transferred from the printing apparatus in response to the request for acquisition of the paper feeding slot data issued by the issuing means, and displaying paper resource information on a display device. This feature makes it possible for the data processing apparatus used by the user to acquire the updated paper feeding slot data defined for the paper feeding mechanism of the printer and display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded.

According to still another aspect of the invention, there is provided a printing system including a data processing apparatus, a printing apparatus, and a printer server, the data processing apparatus being capable of communicating with the printing apparatus via the printer server, the printing apparatus comprising: a plurality of paper feeding mechanisms for feeding a recording medium; definition means for defining paper feeding slot data for each paper feeding slot of each paper feeding mechanism; storage means for storing the paper feeding slot data defined by the definition means for each paper feeding slot; acquisition means for acquiring the paper feeding slot data associated with each paper feeding slot stored in the storage means; and notification means for sending the paper feeding slot data acquired by the acquisition means to the printer server in response to the acquisition request issued by the printer server, the printer server comprising: storage means for storing the paper feeding slot data received from the printing apparatus; judgment means for judging whether there is an updating request to update the paper feeding slot data stored in the storage means, when the request for acquisition of the paper feeding slot data is issued by the data processing apparatus; and returning means for returning the updated paper feeding slot data to the data processing apparatus, depending on the result of judgment made by the judgment means in terms of whether there is an updating request, the data processing apparatus comprising: issuing means for issuing an acquisition request to the printer server to acquire the paper feeding slot data defined for the paper feeding mechanism of the printing apparatus; and control means for analyzing the paper feeding slot data transferred from the printer server in response to the request for acquisition of the paper feeding slot data issued by the issuing means, and displaying paper resource information on a display device. This feature makes it possible for the data processing apparatus used by the user to acquire via the printer server the updated paper feeding slot data defined for the paper feeding mechanism of the printer controlled by the printer server, and manage the acquired paper feeding slot data and furthermore display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded. Furthermore, it also becomes possible to reduce the data traffic in the process of requiring the paper feeding slot data.

According to still another aspect of the invention, there is provided a printing system including a data processing apparatus and a plurality of printing apparatus, the data processing apparatus being capable of communicating with the plurality of printing apparatus via a predetermined communication medium, each printing apparatus comprising: a plurality of paper feeding mechanisms for feeding a recording medium; definition means for defining paper feeding slot data for each paper feeding slot of each paper feeding mechanism; storage means for storing the paper feeding slot data defined by the definition means for each paper feeding slot; acquisition means for acquiring the paper feeding slot data associated with each paper feeding slot stored in the storage means; and notification means for sending each paper feeding slot data acquired by the acquisition means to the data processing apparatus in response to the acquisition request issued by the data processing apparatus, the data processing apparatus comprising: issuing means for issuing an acquisition request to the printing apparatus to acquire the paper feeding slot data defined for the paper feeding mechanism of each printing apparatus; and control means for analyzing the paper feeding slot data transferred from each printing apparatus in response to the request for acquisition of the paper feeding slot data issued by the issuing means, and displaying paper resource information on a display device. This feature makes it possible for the data processing apparatus used by the user to acquire the updated paper feeding slot data defined for the paper feeding mechanism of the printer and display the paper resource information on the display device so that the user can make a selection in terms of the paper resources. That is, it becomes possible to build a printing resource environment in which the user can visually see the status of the paper resources of each printer according to the paper feeding slot data and thus the user can easily select a paper feeding slot in which a desired recording medium is loaded.

According to still another aspect of the invention, there is provided a printing system including a data processing apparatus, a plurality of printing apparatus, and a printer server, the data processing apparatus being capable of communicating via the printer server with the plurality of printing apparatus via a predetermined communication medium, each printing apparatus comprising: a plurality of paper feeding mechanisms for feeding a recording medium;

definition means for defining paper feeding slot data for each paper feeding slot of each paper feeding mechanism; storage means for storing the paper feeding slot data defined by the definition means for each paper feeding slot; acquisition means for acquiring the paper feeding slot data associated with each paper feeding slot stored in the storage means; and notification means for sending the paper feeding slot data acquired by the acquisition means to the printer server in response to the acquisition request issued by the printer server, the printer server comprising: storage means for storing the paper feeding slot data received from each printing apparatus judgment means for judging whether there is an updating request to update the paper feeding slot data stored in the storage means, when the request for acquisition of the paper feeding slot data is issued by the data processing apparatus; and returning means for returning the updated paper feeding slot data to the data processing apparatus, depending on the result of judgment made by the judgment means in terms of whether there is an updating request, the data processing apparatus comprising: issuing means for issuing an acquisition request to the printer server to acquire the paper feeding slot data defined for the paper feeding mechanism of each printing apparatus; and control means for analyzing the paper feeding slot data transferred from the printer server in response to the request for acquisition of the paper feeding slot data issued by the issuing means, and displaying paper resource information on a display device. This feature makes it possible for the data processing apparatus used by the user to acquire via the printer server the updated paper feeding slot data defined for the paper feeding mechanism of the plurality of printers controlled by the printer server, and manage the acquired paper feeding slot data and furthermore display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded. Furthermore, it also becomes possible to reduce the data traffic in the process of requiring the paper feeding slot data.

Preferably, the printer server comprises updating means for, when the judgment means judges that there is an updating request, acquiring the newest paper feeding slot data from each printing apparatus and updating the paper feeding slot data stored in the storage means. Thus the paper feeding slot data is acquired when the paper feeding slot data of each printer is updated. In other words, it is not necessary to acquire the paper feeding slot data unless the paper feeding slot data of some printer is updated. This allows a reduction in the data traffic in the process of acquiring the paper feeding slot data. Furthermore, it becomes possible to immediately display the newest paper feeding slot data on the display device of the data processing apparatus.

Preferably, the paper resource information includes paper name data and paper attribute data defined for each paper feeding slot and thus it is possible to display the paper names defined for the respective paper feeding slots and also the paper attributes (type of recording medium (transparency film, cut sheet), color, thickness, size, etc.) thereby ensuring that the user can easily select a paper feeding slot in which a desired recording medium is loaded.

According to still another aspect of the invention, there are also provided a method of processing data in a printing apparatus capable of communicating with a data processing apparatus via a predetermined communication medium, and a storage medium on which a program readable by a computer is stored, the computer being responsible for controlling a printing apparatus capable of communicating with a data processing apparatus via a predetermined communication medium, the method or program comprising: a definition step in which paper feeding slot data is defined for each paper feeding slot of a plurality of paper feeding mechanisms for feeding a recording medium; a storage step in which the paper feeding slot data defined in the definition step for each paper feeding slot is stored into a memory; an acquisition step in which the paper feeding slot data of each paper feeding slot stored in the storage step is acquired; and a notification step in which the paper feeding slot data acquired in the acquisition step is sent to the data processing apparatus. Thus it is possible to acquire the updated paper feeding slot data and supply it to the data processing apparatus whenever it is required.

Preferably, in the notification step, the paper feeding slot data stored in the storage step is sent to the data processing apparatus in response to an acquisition request from the data processing apparatus so that the updated paper feeding slot data is acquired and supplied to the data processing apparatus as required.

According to still another aspect of the invention, there are provided a method of processing data in a data processing apparatus capable of communicating with a printing apparatus via a predetermined communication medium, and a storage medium on which a program readable by a computer is stored, the computer being responsible for controlling a data processing apparatus capable of communicating with a printing apparatus via a predetermined communication medium, the method or program comprising: an issuing step in which an acquisition request is issued to the printing apparatus to acquire the paper feeding slot data defined for the paper feeding mechanism of the printing apparatus; and a display step in which an analysis is made on the paper feeding slot data transferred from the printing apparatus in response to the request of acquisition of the paper feeding slot data issued in the issuing step, and paper resource information is displayed on a display device. This feature makes it possible to acquire the updated paper feeding slot data defined for the paper feeding mechanism of the printer and display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded.

Preferably, the paper resource information includes paper name data and paper attribute data defined for each paper feeding slot so that it is possible to display the paper names defined for the respective paper feeding slots and also the paper attributes (type of recording medium (transparency film, cut sheet), color, thickness, size, etc.) thereby ensuring that the user can easily select a paper feeding slot in which a desired recording medium is loaded.

According to still another aspect of the invention, there are provided a method of processing data in a printing system including a data processing apparatus and a printing apparatus capable of communicating with each other via a predetermined communication medium, and a storage medium on which a program readable by a computer is stored, the computer being responsible for controlling a printing system including a data processing apparatus and a printing apparatus capable of communicating with each other via a predetermined communication medium, the method or program comprising: a definition step in which paper feeding slot data is defined for each paper feeding slot of a plurality of paper feeding mechanisms for feeding a recording medium; a storage step in which the paper feeding slot data defined in the definition step for each paper feeding slot is stored into a memory; an issuing step in which an acquisition request is issued to the printing apparatus to acquire the paper feeding slot data defined for the paper feeding mechanism of the printing apparatus; an acquisition step in which the paper feeding slot data of each paper feeding slot stored into the memory in the storage step is acquired; a notification step in which the paper feeding slot data acquired in the acquisition step is sent to the data processing apparatus, in response to the acquisition request issued in the issuing step; and a displaying step in which an analysis is made on the paper feeding slot data supplied in the notification step and paper resource information is displayed on a display device. This feature makes it possible for the data processing apparatus used by the user to acquire the updated paper feeding slot data defined for the paper feeding mechanism of the printer and display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded.

According to still another aspect of the invention, there are provided a method of processing data in a printing system including a data processing apparatus, a printing apparatus, and a printer server, the data processing apparatus being capable of communicating via the printer server with the printing apparatus via a predetermined communication medium, and a storage medium on which a program readable by a computer is stored, the computer being responsible for controlling a printing system including a data processing apparatus, a printing apparatus, and a printer server, the data processing apparatus being capable of communicating via the printer server with the printing apparatus via a predetermined communication medium, the method or program comprising: a definition step in which paper feeding slot data is defined for each paper feeding slot of a plurality of paper feeding mechanisms for feeding a recording medium; a storage step in which the paper feeding slot data defined in the definition step for each paper feeding slot is stored into a memory; an acquisition step in which the paper feeding slot data of each paper feeding slot stored into the memory in the storage step is acquired; a notification step in which the paper feeding slot data acquired in the acquisition step is sent to the data processing apparatus in response to the acquisition request issued via the printer server; a storage step in which the paper feeding slot data returned from the printing apparatus is stored into a memory; an issuing step in which an acquisition request is issued to the printer server to acquire the paper feeding slot data defined for the paper feeding mechanism of the printing apparatus; a judgment step in which when the request for acquisition of the paper feeding slot data is issued in the issuing step, a judgment is made as to whether there is an updating request to update the paper feeding slot data stored in the memory in the storage step; a returning step in which the newest paper feeding slot data is returned to the data processing apparatus via the printer server, depending on the result of the judgment made in the judgment step as to whether there is an updating request; and a display step in which paper feeding slot data returned in the returning step is analyzed and paper resource information is displayed on a display device provided in the data processing apparatus. This feature makes it possible for the data processing apparatus used by the user to acquire via the printer server the updated paper feeding slot data defined for the paper feeding mechanism of the printer controlled by the printer server, and manage the acquired paper feeding slot data and furthermore display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded. Furthermore, it also becomes possible to reduce the data traffic in the process of requiring the paper feeding slot data.

According to still another aspect of the invention, there are provided a method of processing data in a printing system including a data processing apparatus and a plurality of printing apparatus, the data processing apparatus being capable of communicating with the plurality of printing apparatus via a predetermined communication medium, and a storage medium on which a program readable by a computer is stored, the computer being responsible for controlling a printing system including a data processing apparatus and a plurality of printing apparatus, the data processing apparatus being capable of communicating with the plurality of printing apparatus via a predetermined communication medium, the method or program comprising: a definition step in which paper feeding slot data is defined for each paper feeding slot of a plurality of paper feeding mechanisms for feeding a recording medium; a storage step in which the paper feeding slot data defined in the definition step for each paper feeding slot is stored into a memory; an acquisition step in which the paper feeding slot data of each paper feeding slot stored into the memory in the storage step is acquired; an issuing step in which an acquisition request is issued to each printing apparatus to acquire the paper feeding slot data defined for the paper feeding mechanism of each printing apparatus; a notification step in which the paper feeding slot data of each paper feeding slot acquired in the acquisition step is sent to the data processing apparatus in response to the acquisition request issued in the issuing step; and a display step in which the paper feeding slot data supplied in the notification step is analyzed and paper resource information is displayed on a display device of the data processing apparatus. This feature makes it possible for the data processing apparatus used by the user to acquire the updated paper feeding slot data defined for the paper feeding mechanism of the printer and display the paper resource information on the display device so that the user can make a selection in terms of the paper resources. That is, it becomes possible to build a printing resource environment in which the user can visually see the status of the paper resources of each printer according to the paper feeding slot data and thus the user can easily select a paper feeding slot in which a desired recording medium is loaded.

According to still another aspect of the invention, there are provided a method: of processing data in a printing system including a data processing apparatus, a plurality of printing apparatus, and a printer server, the data processing apparatus being capable of communicating via the printer server with the plurality of printing apparatus via a predetermined communication medium, and a storage medium on which a program readable by a computer is stored, the computer being responsible for controlling a printing system including a data processing apparatus, a plurality of printing apparatus, and a printer server, the data processing apparatus being capable of communicating via the printer server with the plurality of printing apparatus via a predetermined communication medium, the method or program comprising: a definition step in which paper feeding slot data is defined for each paper feeding slot of a plurality of paper feeding mechanisms for feeding a recording medium; a storage step in which the paper feeding slot data defined in the definition step for each paper feeding slot is stored into a memory; an acquisition step in which the paper feeding slot data of each paper feeding slot stored into the memory in the storage step is acquired; a notification step in which the paper feeding slot data acquired in the acquisition step is sent to the data processing apparatus in response to the acquisition request issued via the printer server; a storage step in which the paper feeding slot data returned from each printing apparatus is stored into a memory; an issuing step in which an acquisition request is issued to the printer server to acquire the paper feeding slot data defined for the paper feeding mechanism of each printing apparatus; a judgment step in which when the request for acquisition of the paper feeding slot data is issued in the issuing step, a judgment is made as to whether there is an updating request to update the paper feeding slot data stored in the memory in the storage step; a returning step in which the newest paper feeding slot data is returned to the data processing apparatus via the printer server, depending on the result of the judgment made in the judgment step as to whether there is an updating request; and a display step in which paper feeding slot data returned in the returning step is analyzed and paper resource information is displayed on a display device provided in the data processing apparatus. This feature makes it possible for the data processing apparatus used by the user to acquire via the printer server the updated paper feeding slot data defined for the paper feeding mechanism of the plurality of printers controlled by the printer server, and manage the acquired paper feeding slot data and. furthermore display the paper resource information on the display device so that the user can make a selection in terms of the paper resources. That is, it becomes possible to build a printing resource environment in which the user can visually see the status of the paper resources according to the paper feeding slot data and thus the user can easily select a paper feeding slot in which a desired recording medium is loaded. Furthermore, it also becomes possible to reduce the data traffic in the process of requiring the paper feeding slot data.

Preferably the printer server comprises updating means for, when the judgment means judges that there is an updating request, acquiring the newest paper feeding slot data from each printing apparatus and updating the paper feeding slot data stored in the storage means. Thus the paper feeding slot data is acquired when the paper feeding slot data of each printer is updated. In other words, it is not necessary to acquire the paper feeding slot data unless the paper feeding slot data of some printer is updated. This allows a reduction in the data traffic in the process of acquiring the paper feeding slot data. Furthermore, it becomes possible to immediately display the newest paper feeding slot data on the display device of the data processing apparatus.

Preferably the paper resource information includes paper name data and paper attribute data defined for each paper feeding slot so that it is possible to display the paper names defined for the respective paper feeding slots and also the paper attributes (type of recording medium (transparency film, cut sheet), color, thickness, size, etc.) thereby ensuring that the user can easily select a paper feeding slot in which a desired recording medium is loaded.

According to still another aspect of the invention, there is provided a printing operation control apparatus for controlling the operation of transferring printing information by communicating via a predetermined communication medium with a plurality of printing apparatus each having a paper feeding slot to which a paper name may be assigned, the printing operation control apparatus comprising: first display control means for displaying, on a display device, a printing operation control screen including a paper name selection box used to select a paper name; acquisition means for examining and acquiring information about available resources of the printing apparatus, in response to a print request from an application program; first generation means for generating a paper name information table by analyzing the information of resources of each printing apparatus acquired by the acquisition means; second generation means for generating a paper name list to be displayed on the printing operation control screen in accordance with the paper name information table generated by the first generation means; second display control means for displaying, on the printing operation control screen, a list of selectable paper names according to the paper name list generated by the second generation means, in response to indication of the paper name selection box displayed on the printing operation control screen; and setting means for retrieving, from the paper name information table, a printing apparatus assigned the desired paper name selected from the list of selectable paper names and setting the retrieved printing apparatus as the designation to which the printing information is output. This technique makes it possible to build a networked printing system having the paper name designation capability in which it is possible to perform a printing operation on desired paper using a printer in which the desired paper is available simply by designating a desired paper name in a similar manner to that employed in the conventional paper name designation technique, without having to know which paper name is assigned to which printer on the network.

Preferably, the second display control means displays, on the printing operation control screen, the paper name located at the top of the paper name list as a current paper name. Thus, the current paper name is automatically set.

Preferably, the printing operation control apparatus further comprises: designation means for designating a selection rule of selecting a printing apparatus from a plurality of printing apparatus assigned the same paper name in a competitive fashion; judgment means for judging whether a paper name is a competitive paper name assigned to a plurality of printing apparatus in a competitive fashion; determination means that, when the judgment means judges that the selected paper name is a competitive paper name, determines a printing apparatus which should be set by the setting means as the destination to which the printing information is output, in accordance with the selection rule designated by the designation means. This feature makes it possible to designate an optimum printer satisfying conditions desired by a user as an output destination even in a networked printing system including a plurality of printers assigned the same paper name. That is, printing information is output using the optimum printer and thus printing is performed in a highly efficient manner without performing an useless operation.

Preferably, the plurality of printing apparatus include a printing apparatus connected in an one-to-one fashion to a particular data processing apparatus. This makes it possible to realize a printing system having the paper name designation capability even in a networked printing system including a local printer.

According to still another aspect of the invention, there are provided a printing operation controlling method of controlling the operation of transferring printing information by communicating via a predetermined communication medium with a plurality of printing apparatus each having a paper feeding slot to which a paper name may be assigned, and a storage medium on which a program readable by a computer is stored, the computer being responsible for controlling the operation of transferring printing information by communicating via a predetermined communication medium with a plurality of printing apparatus each having a paper feeding slot to which a paper name may be assigned, the method of program comprising: a first displaying step in which a printing operation control screen is displayed on a display device, the printing operation control screen including a paper name selection box used to select a paper name; an acquisition step in which in response to a print request from an application program, information about available resources of the printing apparatus is examined and acquired; a first generation step in which a paper name information table is generated by analyzing the acquired information about resources of each printing apparatus; a second generation step in which a paper name list to be displayed on the printing operation control screen is generated in accordance with the generated paper name information table; a second display step in which a list of selectable paper names generated according to the paper name list is displayed on the printing operation control screen in response to indication of the paper name selection box displayed on the printing operation control screen; a setting step in which a printing apparatus assigned the desired paper name selected from the list of selectable paper names is retrieved from the paper name information table, and the retrieved printing apparatus is set as the designation to which the printing information is output. This technique makes it possible to build a networked printing system having the paper name designation capability in which it is possible to perform a printing operation on desired paper using a printer in which the desired paper is available simply by designating a desired paper name in a similar manner to that employed in the conventional paper name designation technique, without having to know which paper name is assigned to which printer on the network.

According to still another aspect of the invention, there are provided a printing operation controlling method of controlling the operation of transferring printing information by communicating via a predetermined communication medium with a plurality of printing apparatus each having a paper feeding slot to which a paper name may be assigned, and a storage medium on which a program readable by a computer is stored, the computer being responsible for controlling the operation of transferring printing information by communicating via a predetermined communication medium with a plurality of printing apparatus each having a paper feeding slot to which a paper name may be assigned, the method or program comprising: a judgment step in which, in response to a print request from an application program, a judgment is made as to whether there is an available printing apparatus connected to the predetermined communication medium; a first storage step in which the network information about the available printing apparatus obtained in the judgment step is stored in a memory; a setting step in which the network information stored in the memory is analyzed and the number of printing apparatus with the paper name designation capability to be examined is set; an examination step in which an examination is made on as many printing apparatus as the number set in the setting step as to whether each the printing apparatus has the capability of selecting a paper feeding slot in accordance with a paper name; and a second storage step in which if the examination step concludes that the printing apparatus has the capability of selecting a paper feeding slot in accordance with a paper name, the paper name assigned to each paper feeding slot is acquired and stored in the memory. This technique makes it possible to automatically acquire, from each available printing apparatus, the paper names to be displayed on the printing operation control screen so as to obtain updated paper names.

According to still another aspect of the invention, there are provided a printing operation controlling method of controlling the operation of transferring printing information by communicating via a predetermined communication medium with a plurality of printing apparatus each having a paper feeding slot to which a paper name may be assigned, and a storage medium on which a program readable by a computer is stored, the computer being responsible for controlling the operation of transferring printing information by communicating via a predetermined communication medium with a plurality of printing apparatus each having a paper feeding slot to which a paper name may be assigned, the method or program comprising: a judgment step in which a judgment is made as to whether the data stored in a memory includes a paper name acquired from a printing apparatus having the capability of selecting a paper feeding slot according to a paper name; a generation step in which if the judgment step concludes that the paper name is included in the data stored in the memory, the memory is searched to generate a paper name list to be displayed in the paper name selection box of the printing operation control screen displayed on a display device; and a displaying step in which a current paper name is displayed in the paper name selection box in accordance with the generated paper name list. This technique makes it possible to automatically set the paper name to be displayed as the current paper name.

According to still another aspect of the invention, there is provided a printing operation controlling method of controlling the operation of transferring printing information by communicating via a predetermined communication medium with a plurality of printing apparatus each having a paper feeding slot to which a paper name may be assigned, the method comprising: a first judgment step in which a judgment is made as to the selection status of the paper name selection box of the printing operation control screen displayed on a display device; a displaying step in which if the first judgment step concludes that the paper name selection box of the printing operation control screen displayed on the display device is selected, a paper name list is displayed on the printing operation control screen of the display device in accordance with the paper name list stored in a memory; a second judgment step in which a judgment is made as to whether a paper name different from the current paper name is selected from the displayed paper name list; a first setting step in which if the second judgment step concludes that a paper name different from the current paper name is selected from the displayed paper name list, the selected paper name is set as the current paper name; a third judgment step in which a judgment is made as to whether a print start command or a print cancel command is issued; a second setting step in which if the third judgment step concludes that a print start command has been issued, the destination to which printing information is output is set by referring to the paper name information stored in the memory corresponding to the current paper name; a transmission step in which the printing information is transmitted to the printing apparatus set as the output destination in the second setting step. Thus it is possible to automatically transmit printing data to a printer corresponding to a selected paper name simply by selecting a desired paper name from the paper name list displayed on the printing operation control screen without having to have knowledge about networked printers.

This technique makes it possible to build a networked printing system having the paper name designation capability in which it is possible to perform an optimum printing operation on desired paper using a printer in which the desired paper is available simply by designating a desired paper name in a similar manner to that employed in the conventional paper name designation technique, without having to know which paper name is assigned to which printer on the network.

What is claimed is:

1. A method of processing data in a printing apparatus, comprising:
   a definition step in which paper feeding slot data is defined for each paper feeding slot of a plurality of paper feeding mechanisms for feeding a recording medium, the paper feeding slot data including logical paper name information;
   a storage step in which the paper feeding slot data defined in said definition step for each paper feeding slot is stored into a memory;
   an acquisition step in which the paper feeding slot data of each paper feeding slot stored in said storage step is acquired; and
   a notification step in which the paper feeding slot data acquired in said acquisition step is sent to a data processing apparatus in order that the data processing apparatus can indicate the paper feeding slot by using the logical paper name information included in the paper feeding slot data.

2. A method of processing data according to claim 1, wherein in said notification step, the paper feeding slot data stored in said storage step is sent to the data processing apparatus in response to an acquisition request from said data processing apparatus.

3. A method of processing data in a data processing apparatus for generating print data to be printed in a printing apparatus, comprising:
   an issuing step in which an acquisition request is issued to the printing apparatus to acquire the paper feeding slot data defined for the paper feeding mechanism of said printing apparatus, the paper feeding slot data including logical paper feeding name information; and
   a display control step in which an analysis is made on the paper feeding slot data transferred from the printing apparatus in response to the request of acquisition of the paper feeding slot data issued in said issuing step, and the data processing apparatus is controlled to display the logical paper name information defined for the paper feeding mechanism of the printing apparatus on a display device.

4. A method of processing data according to claim 3, wherein said paper resource information includes the logical paper name information and a paper attribute information defined for each paper feeding slot.

5. A method of processing data in a data processing system for generating print data to be printed in a printing apparatus, comprising:
   a definition step in which paper feeding slot data is defined for each paper feeding slot of a plurality of paper feeding mechanisms for feeding a recording medium, the paper feeding slot data including logical paper name information;
   a storage step in which the paper feeding slot data defined in said definition step for each paper feeding slot is stored into a memory;
   an issuing step in which an acquisition request is issued to a printing apparatus to acquire the paper feeding slot data defined for the paper feeding mechanism of the printing apparatus;
   an acquisition step in which the paper feeding slot data of each paper feeding slot stored into the memory in said storage step is acquired;
   a notification step in which the paper feeding slot data acquired in said acquisition step is sent to a data processing apparatus, in response to the acquisition request issued in said issuing step in order that the data processing apparatus can indicate a particular one of the paper feeding slots by using the logical paper name information included in the paper feeding slot data; and
   a display control step in which an analysis is made on the paper feeding slot data supplied in said notification step and the data processing apparatus is controlled to display the logical paper name information defined for the paper feeding mechanism of the printing apparatus, having the particular paper feeding slot, on a display device.

6. A method of processing data in a data processing system for generating print data to be printed in a printing apparatus, comprising:
   a definition step in which paper feeding slot data is defined for each paper feeding slot of a plurality of paper feeding mechanisms for feeding a recording medium, the paper feeding slot data including logical paper name information;
   a storage step in which the paper feeding slot data defined in said definition step for each paper feeding slot is stored into a memory;
   an acquisition step in which the paper feeding slot data of each paper feeding slot stored into the memory in said storage step is acquired;
   a notification step in which the paper feeding slot data acquired in said acquisition step is sent to a data processing apparatus in response to the acquisition request issued via a printer server in order that the data processing apparatus can indicate a particular one of the paper feeding slots by using the logical paper name information included in the paper feeding slot data;
   a storage step in which the paper feeding slot data returned from the printing apparatus is stored into a memory;
   an issuing step in which an acquisition request is issued to the printer server to acquire the paper feeding slot data defined for the paper feeding mechanism of said printing apparatus;
   a judgment step in which, when the request for acquisition of the paper feeding slot data is issued in said issuing step, a judgment is made as to whether there is an updating request to update the paper feeding slot data stored in said memory in said storage step;
   a returning step in which the newest paper feeding slot data is returned to the data processing apparatus via the printer server, depending on the result of the judgment made in said judgment step as to whether there is an updating request; and a display control step in which paper feeding slot data returned in said returning step is analyzed and the data processing apparatus is controlled to display the logical paper name information defined for the paper feeding mechanism of the printing apparatus, having the particular paper feeding slot, on a display device provided in the data processing apparatus.

7. A method of processing data in a data processing system for generating print data to be printed in a printing apparatus, comprising:

a definition step in which paper feeding slot data is defined for each paper feeding slot of a plurality of paper feeding mechanisms for feeding a recording medium, the paper feeding slot data including logical paper name information;

a storage step in which the paper feeding slot data defined in said definition step for each paper feeding slot is stored into a memory;

an acquisition step in which the paper feeding slot data of each paper feeding slot stored into the memory in said storage step is acquired;

an issuing step in which an acquisition request is issued to each printing apparatus to acquire the paper feeding slot data defined for the paper feeding mechanism of each printing apparatus;

a notification step in which the paper feeding slot data of each paper feeding slot acquired in said acquisition step is sent to a data processing apparatus in response to the acquisition request issued in said issuing step in order that the data processing apparatus can indicate the paper feeding slot of a particular one of the printing apparatus by using the logical paper name information included in the paper feeding slot data; and a display control step in which the paper feeding slot data supplied in said notification step is analyzed and the particular one of the data processing apparatus is controlled to display the logical paper name information defined for the paper feeding mechanism of that printing apparatus on a display device of said data processing apparatus.

8. A method of processing data in a data processing system for generating print data to be printed in a printing apparatus, comprising:

a definition step in which paper feeding slot data is defined for each paper feeding slot of a plurality of paper feeding mechanisms for feeding a recording medium, the paper feeding slot data including logical paper name information;

a storage step in which the paper feeding slot data defined in said definition step for each paper feeding slot is stored into a memory;

an acquisition step in which the paper feeding slot data of each paper feeding slot stored into the memory in said storage step is acquired;

a notification step in which the paper feeding slot data acquired in said acquisition step is sent to a data processing apparatus in response to the acquisition request issued via a printer server in order that the data processing apparatus can indicate a particular paper feeding slot by using the logical paper name information included in the paper feeding slot data;

a storage step in which the paper feeding slot data returned from each printing apparatus is stored into a memory;

an issuing step in which an acquisition request is issued to the printer server to acquire the paper feeding slot data defined for the paper feeding mechanism of each printing apparatus;

a judgment step in which, when the request for acquisition of the paper feeding slot data is issued in said issuing step, a judgment is made as to whether there is an updating request to update the paper feeding slot data stored in said memory in said storage step;

a returning step in which the newest paper feeding slot data is returned to said data processing apparatus via the printer server, depending on the result of the judgment made in said judgment step as to whether there is an updating request; and a display control step in which paper feeding slot data returned in said returning step is analyzed and the data processing apparatus is controlled to display the logical paper name information defined for the paper feeding mechanism of the printing apparatus, which includes the particular paper feeding slot, on a display device provided in said data processing apparatus.

9. A method of processing data according to claim 6 or 8, wherein said printer server comprising updating means for, when said judgment means judges that there is an updating request, acquiring the newest paper feeding slot data from each printing apparatus and updating the paper feeding slot data stored in said storage means.

10. A method of processing data according to any of claims 5 to 8, wherein said paper resource information includes the logical paper name information and a paper attribute information defined for each paper feeding slot.

11. A method of controlling a printing operation, comprising:

a first displaying step in which a printing operation control screen is displayed on a display device, said printing operation control screen including a paper name selection box used to select a paper name;

an acquisition step in which in response to a print request from an application program, information about available resources of the printing apparatus is examined and acquired;

a first generation step in which a paper name information table is generated by analyzing said acquired information about resources of each printing apparatus;

a second generation step in which a paper name list to be displayed on the printing operation control screen is generated in accordance with said generated paper name information table;

a second display step in which a list of selectable paper names generated according to said paper name list is displayed on the printing operation control screen in response to indication of the paper name selection box displayed on the printing operation control screen; and a setting step in which a printing apparatus assigned the desired paper name selected from said list of selectable paper names is retrieved from said paper name information table, and the retrieved printing apparatus is set as the designation to which said printing information is output.

12. A method of controlling a printing operation in a data processing apparatus for generating print data to be printed in a printing apparatus, comprising:

a judgment step in which, in response to a print request from an application program, a judgment is made as to whether there is an available printing apparatus connected to a predetermined communication medium;

a first storage step in which the network information about the available printing apparatus obtained in said judgment step is stored in a memory;

a setting step in which said network information stored in the memory is analyzed and the number of printing apparatus with a logical paper name designation capability to be examined is set;

an examination step in which an examination is made on as many printing apparatus as the number set in said setting step as to whether each of those printing apparatus has the capability of selecting a paper feeding slot in accordance with the logical paper name; and a second storage step in which if it is concluded in said examination step that a particular one of those printing apparatus has the capability of selecting a paper feeding slot in accordance with the logical paper name, the logical paper name assigned to each paper feeding slot in that printing apparatus is acquired and stored in said memory.

13. A method of controlling a printing operation in a data processing apparatus for generating print data to be printed in a printing apparatus, comprising:

a judgment step in which a judgment is made as to whether the data stored in a memory includes a logical paper name acquired from a printing apparatus having the capability of selecting a paper feeding slot according to a logical paper name;

a generation step in which, if it is concluded in said judgment step that the logical paper name is included in the data stored in the memory, the memory is searched to generate a logical paper name list to be displayed in the logical paper name selection box of the printing operation control screen on a display device; and a displaying step in which a current logical paper name is displayed in the logical paper name selection box in accordance with said generated logical paper name list.

14. A method of controlling a printing operation in a data processing apparatus for generating print data to be printed in a printing apparatus, comprising:

a first judgment step in which a judgment is made as to the selection status of the logical paper name selection box of the printing operation control screen displayed on a display device;

a display step in which, if it is concluded in said first judgment step that the logical paper name selection box of the printing operation control screen displayed on the display device is selected, a logical paper name list is displayed on the printing operation control screen of the display device in accordance with the logical paper name list stored in a memory;

a second judgment step in which a judgment is made as to whether a logical paper name different from the current paper name is selected from the displayed paper name list is instructed to be changed on the basis of said displayed logical paper name list;

a first setting step in which, if it is concluded in said second judgment step that a logical paper name different from the current paper name is selected from the displayed paper name list, the selected paper name is set as the current logical paper name;

a third judgment step in which a judgment is made as to whether a print start command or a print cancel command is issued;

a second setting step in which, if it is concluded in said third judgment step that a print start command has been issued, the destination to which printing information is output is set by referring to the logical paper name information stored in the memory corresponding to the current logical paper name; and a transmission step in which the printing information is transmitted to the printing apparatus set as the output destination in said second setting step.

15. A method of processing data in a printing apparatus, comprising:

a storage step in which paper feeding slot data defined for each paper feeding slot of a plurality of paper feeding mechanisms for feeding a recording medium is stored into a memory, the paper feeding slot data including a logical paper name information; and a notification step in which the paper feeding slot data of each paper feeding slot stored in said storage step is sent to a data processing apparatus in order that the data processing apparatus can indicate the paper feeding slot by using the logical paper name information included in the paper feeding slot data.

16. A method of processing data in a printing apparatus, comprising:

a storage step in which paper feeding slot data defined for each paper feeding slot of a plurality of paper feeding mechanisms for feeding a recording medium is stored into a memory, the paper feeding slot data including a logical paper name information; and a notification step in which the paper feeding slot data of each paper feeding slot stored in said storage step is sent to a server apparatus in order that a data processing apparatus can indicate the paper feeding slot by using the logical paper name information included in the paper feeding slot data, which the data processing apparatus obtains from the server apparatus.

17. A method of processing data in a data processing apparatus for generating print data to be print in a printing apparatus, comprising:

an issuing step in which an acquisition request is issued to a server apparatus to acquire the paper feeding slot data defined for the paper feeding mechanism of the printing apparatus, the paper feeding slot data including a logical paper feeding name information and stored in the server apparatus; and a display control step in which an analysis is made on the paper feeding slot data transferred from the server apparatus in response to the request of acquisition of the paper feeding slot data issued in said issuing step, and the data processing apparatus is controlled to display the logical paper name information defined for the paper feeding mechanism of the printing apparatus on a display device.

18. A method of processing data in a server apparatus for communicating with a data processing apparatus and a printing apparatus, comprising:

an issuing step in which an acquisition request is issued to the printing apparatus to acquire the paper feeding slot data defined for the paper feeding mechanism of the printing apparatus, the paper feeding slot data including a logical paper feeding name information; and a storage step in which paper feeding slot data transferred from the printing apparatus in response to the request of acquisition of the paper feeding slot data issued in said issuing step is stored into a memory; and a notification step in which the paper feeding slot data of each paper feeding slot stored in said storage step is sent to the data processing apparatus in order that the data processing apparatus can indicate the paper feeding slot by using the logical paper name information included in the paper feeding slot data.

19. A method of processing data, comprising:

a judgment step in which a judgment is made as to whether there is an available printing apparatus on a network;

a first storage step in which the network information about the available printing apparatus according to said judgment into a memory;

an examination step in which an analyses is executed for the network information stored in said memory, and an examination is made as to whether each printing apparatus has the capability of selecting a paper feeding slot in accordance with the logical paper name; and a second storage step in which if it is concluded in said examination step that a particular one of those printing apparatus has the capability of selecting a paper feeding slot in accordance with the logical paper name, the logical paper name assigned to each paper feeding slot in that printing apparatus is acquired and stored in said memory.

* * * * *

UNITED STATES PATENT AND TRADEMARK OFFICE
CERTIFICATE OF CORRECTION

PATENT NO.   : 6,447,184 B2
DATED        : September 10, 2002
INVENTOR(S)  : Kimura et al.

It is certified that error appears in the above-identified patent and that said Letters Patent is hereby corrected as shown below:

<u>Title page,</u>
Item [*] Notice, change Term Adjustment from "0 days" to -- 29 days --

Signed and Sealed this

Twenty-third Day of November, 2004

JON W. DUDAS
*Director of the United States Patent and Trademark Office*